US010887270B1

(12) United States Patent
Adamski et al.

(10) Patent No.: US 10,887,270 B1
(45) Date of Patent: Jan. 5, 2021

(54) REVEALING INFORMATION BASED ON USER INTERACTION

(71) Applicant: JigTalk App Limited, Manchester (GB)

(72) Inventors: Max Adamski, Manchester (GB);
Alexander Durrant, Great Yarmouth (GB)

(73) Assignee: JigTalk App Limited, Manchester (GB)

( * ) Notice: Subject to any disclaimer, the term of this patent is extended or adjusted under 35 U.S.C. 154(b) by 0 days.

(21) Appl. No.: 16/740,076

(22) Filed: Jan. 10, 2020

(30) Foreign Application Priority Data

Jun. 19, 2019 (GB) .................. 1908772.5

(51) Int. Cl.
| | |
|---|---|
| *H04L 12/58* | (2006.01) |
| *G06F 16/9536* | (2019.01) |
| *G06F 16/54* | (2019.01) |
| *G06Q 50/00* | (2012.01) |
| *G06T 3/00* | (2006.01) |
| *G06K 9/00* | (2006.01) |

(52) U.S. Cl.
CPC ............ *H04L 51/32* (2013.01); *G06F 16/54* (2019.01); *G06F 16/9536* (2019.01); *G06K 9/00255* (2013.01); *G06Q 50/01* (2013.01); *G06T 3/0093* (2013.01); *H04L 51/10* (2013.01); *H04L 51/16* (2013.01); *G06K 9/00671* (2013.01)

(58) Field of Classification Search
CPC ......... H04L 51/32; H04L 51/10; H04L 51/16; G06F 16/54; G06F 16/9536; G06K 9/00255; G06K 9/00671
See application file for complete search history.

(56) References Cited

U.S. PATENT DOCUMENTS

| | | |
|---|---|---|
| 5,950,200 A | 9/1999 | Sudai et al. |
| 6,685,479 B1 | 2/2004 | Ghaly |
| | (Continued) | |

FOREIGN PATENT DOCUMENTS

WO    WO 2008039172     4/2008

OTHER PUBLICATIONS

Ask Men, "Facebook Dating Review," retrieved from URL <https://www.askmen.com/dating/online-dating-sites/mainstream/facebook-dating-review.html> via Wayback Machine, available on or before Dec. 16, 2019, 10 pages.

(Continued)

*Primary Examiner* — Viet D Vu
(74) *Attorney, Agent, or Firm* — Fish & Richardson P.C.

(57) ABSTRACT

In general, the subject matter described in this disclosure can be embodied in methods, systems, and program products. A computing system receives, from a first computing device logged into a first user account, a request to view an image that was provided by a second user account. The computing system provides, for receipt by the first computing device, first information to cause the first computing device to present the image with an object in the image obscured. The computing system receives an indication that the first user account and the second user account interacted. The computing system provides, for receipt by the first computing device, second information to cause the first computing device to present the image with the particular object at the particular portion of the image unobscured.

20 Claims, 22 Drawing Sheets

(56) References Cited

U.S. PATENT DOCUMENTS

| | | | |
|---|---|---|---|
| 9,076,231 B1* | 7/2015 | Hill | G06T 3/4023 |
| 9,413,845 B2 | 8/2016 | Bustamente | |
| 9,418,057 B2 | 8/2016 | de Zeeuw et al. | |
| 9,449,282 B2 | 9/2016 | Diaz et al. | |
| 9,495,391 B1 | 11/2016 | Koh et al. | |
| 9,537,934 B2* | 1/2017 | Flynn, III | H04L 67/10 |
| 9,560,156 B1 | 1/2017 | Rana et al. | |
| 9,609,072 B2 | 3/2017 | Louis et al. | |
| 9,715,532 B1 | 7/2017 | Hall et al. | |
| 9,733,811 B2 | 8/2017 | Rad et al. | |
| 9,753,948 B2 | 9/2017 | Lo | |
| 9,774,372 B1* | 9/2017 | Goodwin | H04B 5/0031 |
| 9,824,123 B2 | 11/2017 | Ochandio et al. | |
| 9,959,023 B2 | 5/2018 | Rad et al. | |
| 2004/0128152 A1 | 7/2004 | Austin et al. | |
| 2006/0059130 A1 | 3/2006 | Weiss et al. | |
| 2006/0104426 A1 | 5/2006 | Cataldi | |
| 2008/0010598 A1 | 1/2008 | Smilowitz et al. | |
| 2008/0140681 A1 | 6/2008 | Ajibade | |
| 2011/0202968 A1* | 8/2011 | Nurmi | G06F 21/10 726/1 |
| 2012/0054116 A1 | 3/2012 | Wallin | |
| 2014/0297379 A1 | 10/2014 | Bicanic et al. | |
| 2016/0080155 A1* | 3/2016 | Arat | G06F 21/6209 380/28 |
| 2016/0173429 A1* | 6/2016 | Krug | H04L 51/10 715/752 |
| 2020/0082588 A1* | 3/2020 | Fink | G06K 9/726 |

OTHER PUBLICATIONS

Crook, "S'More is a new dating app that looks to suspend physical attraction for something more," Tech Crunch, Nov. 12, 2019, retrieved from URL <https://techcrunch.com/2019/11/12/smore-is-a-new-dating-app-that-looks-to-suspend-physical-attraction-for-something-more/>, 2 pages.

Fulton, "Love at first type: meet the messaging-led dating app taking on Tinder," TechRadar, Jan. 23, 2017, retrieved from URL <https://www.techradar.com/uk/news/love-at-first-type-meet-the-personality-led-dating-app-taking-on-tinder>, 5 pages.

OkCupid, "Why OkCupid is changing how you message," retrieved from URL <https://theblog.okcupid.com/why-okcupid-is-changing-how-you-message-f14d492e7853>, Dec. 11, 2017, 6 pages.

Thomsen, "Who can it be now? Smore is a new dating app that blurs out photos of potential matches to encourage users to bond over common interests instead of looks," Daily Mail, Nov. 12, 2019, retrieved from URL <https://www.dailymail.co.uk/sciencetech/article-7677377/New-dating-app-blurs-photos-potential-matches-encourage-users-not-focus-looks.html>, 4 pages.

Vida Select, "What is bumble & how's it work? Bumble explained! (2020)," retrieved from URL <https://www.vidaselect.com/what-is-bumble/>, 2020, 7 pages.

Wikipedia, "Match.com," retrieved from URL <https://en.wikipedia.org/wiki/Match.com> via Wayback Machine, available on or before Oct. 14, 2019, 5 pages.

Wikipedia, "OkCupid," retrieved from URL <https://en.wikipedia.org/wiki/OkCupid> via Wayback Machine, available on or before Nov. 22, 2019, 8 pages.

Wikipedia, "Tinder (app)," retrieved from URL <https://en.wikipedia.org/wiki/Tinder_(app)> via Wayback Machine, available on or before Dec. 17, 2019, 18 pages.

* cited by examiner

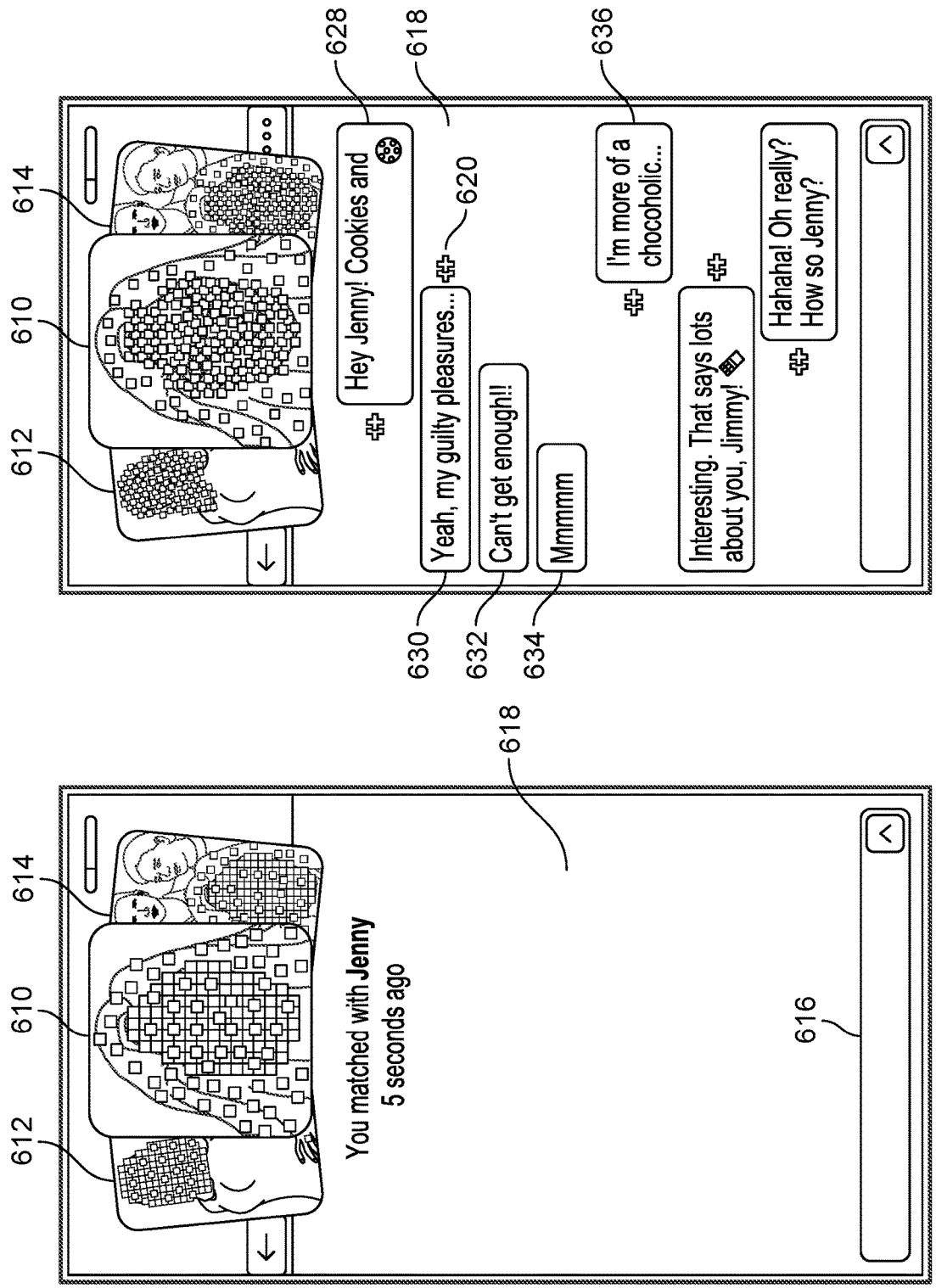

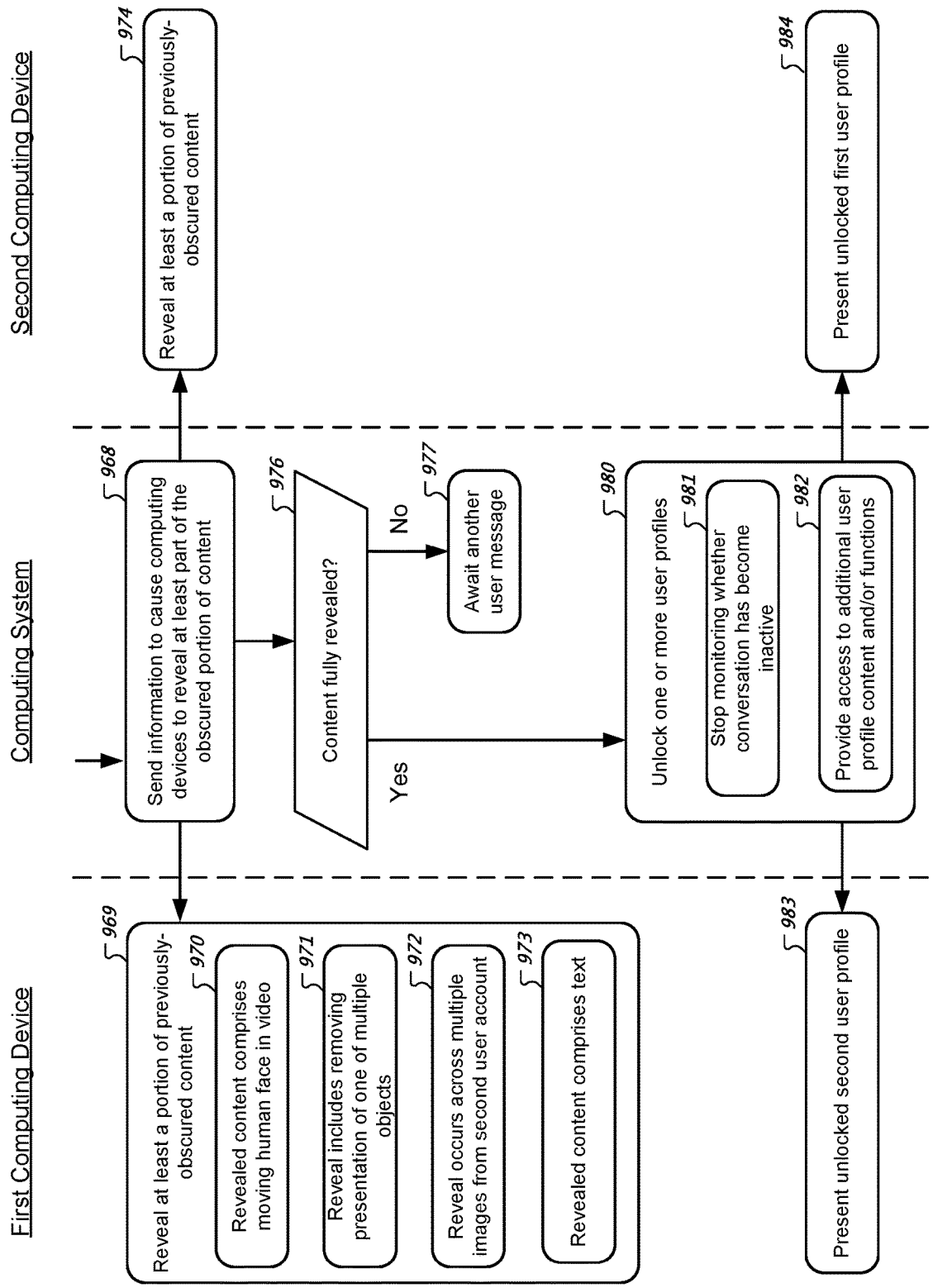

REVEALING INFORMATION BASED ON USER INTERACTION

CROSS-REFERENCE TO RELATED APPLICATION

This application claims priority to GB Application Serial No. 1908772.5, filed on Jun. 19, 2019.

TECHNICAL FIELD

This document generally relates to revealing information based on user interaction.

BACKGROUND

Online communities, such as those facilitated by dating websites or application programs, allow users to search for and communicate with other users. Some such communities include many users with a wide variety of interests. A large number of users can provide an individual with a great deal of choice in finding someone with whom to chat and potentially meet in the real word. Still, a tradeoff to having a large community of users is that interactions among members of the community may be less personable. For example, some individuals may decide whether or not to message another user without meaningfully evaluating information that the other user has posted as part of a profile page. As such, user decisions regarding whether to message other users may become based on superficial characteristics, such as a single picture or a limited amount of demographic information.

SUMMARY

This document describes techniques, methods, systems, and other mechanisms for revealing information based on user interaction. In general, this disclosure relates to a computing system that facilitates communication between members of an online community, such as a computing system that supports a dating website or a dating application program designed for mobile devices. The computing system may allow users to upload profiles of themselves and view profiles of other users, and the computing system may initially obscure at least some of the information in those user profiles (e.g., pictures or demographic information). The obscured information may be revealed once various criteria are met, such as two users having exchanged messages.

As an illustration, suppose that a user named Sam creates a user account with a dating application program and thereafter completes a user profile that provides various information on himself, including pictures, demographic information, and biographical narratives. Sam may then use the dating application to browse profiles created by other users, or the dating application may begin showing Sam profiles of other users, one at a time. These profiles of other users may show faces of the respective users obscured so that so that Sam cannot initially see their faces.

Suppose that one of these user profiles is for a user named Mary. While Mary's face in her profile picture may be covered by a puzzle, Sam may be intrigued by other information contained in Mary's profile, such as information that shows that she is located near Sam, likes running, and has cats.

Intrigued by Mary's profile, Sam may send a text message to Mary that expresses his interest in cats, and that asks where she likes to run. Mary may receive the message and, before responding to Sam, may view information on Sam's profile in order to learn more about him. Sam's profile may show that he is located near Mary and also likes running. As with Mary's profile picture, Sam's face in his profile picture is shown to Mary as being covered by a puzzle. Mary is likewise intrigued, and responds to Sam's message.

The computing system that hosts user profiles and facilitates communications between users of the dating system may monitor certain aspects of Sam and Mary's communications, such as how many messages the users have sent to each other (the content of the messages may be protected and not accessible to the computing system). Upon the computing system determining that Mary has responded to Sam's message, the computing system may remove a single puzzle piece from the puzzles that cover Sam and Mary's faces in their profile pictures.

In this example, the dating system may only remove puzzle pieces when users exchange messages. For example, Mary's response to Sam's message may cause the computing system to remove a puzzle piece from each user's profile picture, but Sam could not have messaged Mary five times in a row to remove five of the puzzle pieces from her face. Similarly, Mary cannot message Sam five times in a row to remove five of the puzzle pieces from his face. Rather, the computing system may remove a puzzle piece each time one of the users responds to a message that was sent by the other user.

Sam and Mary continue to message each other until the computing system has removed all the puzzle pieces from their faces. At this point, the computing system "unlocks" each of their profiles, which can provide each user access to additional profile information that was not previously presented to the users. Moreover, once a user has unlocked another user's profile, that profile may remain accessible to the user after the users have ended their initial conversation. For example, should Sam and Mary have chatted for a while and decided to end their conversation for the day, each user may be able to return the next day and view each other's full user profile without having to once again send messages back and forth to unlock profile content.

In some examples, the computing system obscures video content in addition to or instead of obscuring static images. For example, before Sam and Mary have unlocked each other's profiles, they may decide to participate in a video chat session. A camera at Sam's computer may capture video of Sam and transmit it for display on Mary's computer, and a camera at Mary's computer may capture video of Mary and transmit it for display on Sam's computer. The computer system may analyze the video streams that are sent back and forth between Sam and Mary's computers, identify the face of each user in the video streams, and cause the video streams to present a puzzle over each user's face. The identification of each user's face and the placement of a puzzle of their faces may be performed by the computing system with each frame of the video feed, such that the puzzle moves in the video feeds to track the location of each user's face.

Like with the text message communication session, the computing system may cause the puzzle pieces to disappear as Sam and Mary communicate in the video chat session. For example, the computing system may determine when Sam and Mary exchange statements in the video chat session, and with each exchange may remove a puzzle piece from their faces. In another example, the computing system may count the number of words spoken by the users and remove a puzzle piece each time a threshold number of words has been spoken (e.g., every thirty words).

The computing system may obscure information using techniques other than presenting a puzzle over user faces. For example, user faces can be obscured by distorting user faces (e.g., with blurring or pixelating), or by applying a filter to animate or warp a user face (e.g., by adding clip art dog ears, a dog nose, and a dog tongue to a user's face in a profile picture or video feed). In some examples, the obscured content is not only the portion of an image that shows a user's face, but can include the entire image. For example, puzzle pieces may cover the entire image or video feed, or the entire image or video feed may be blurred or pixelated.

In some examples, user content other than images and video is obscured. For example, user profiles may include demographic information that is presented with text, such as user name, age, height, location, and religion. User profiles may also include biographical entries typed by users, such as user answers to template questions such as "What is your favorite memory?" or "What are you looking for in a partner?". Some of this text-based profile content may be obscured, and selectively revealed as users communicate. For example, Sam and Mary may not initially be able to see each other's age, height, and religion, and the computing system may reveal this information to Sam and Mary once the users have exchanged a certain number of messages in a text or video chat session.

As discussed above, there are various different techniques to "obscure" content. There are also many different triggers that can cause content to transition from an obscured state to an unobscured or revealed state. A trigger already discussed is that of users exchanging messages. This exchange of messages can cause the system to reveal content to both users, or may cause the system to reveal content to only the user that just received a reply to their message. Another example trigger is based on the number of words exchanged during a conversation, either typed or spoken. Once a certain number of words have been exchanged, the system may reveal content to both users. Other triggers are discussed throughout this disclosure.

Should a conversation between two users become inactive, the computing system may begin to re-obscure content. For example, should Sam and Mary not exchange messages for sixty seconds, the computing system may re-introduce a puzzle piece that had previously been removed from their profile pictures. This re-introduction of a puzzle piece every sixty seconds may continue until Sam and Mary resume their conversation or both users' faces are once again completely covered with puzzle pieces, at which point the computing system may terminate the conversation between Sam and Mary. In some examples, a conversation between users is deemed inactive after other criteria are satisfied, for example, when one of the users in the conversation messages another user or navigates away from the conversation to browse profiles of other users.

Particular implementations can, in certain instances, realize one or more of the following advantages. Limiting the amount of profile information that is initially shown to users can encourage user interaction. As such, users may be more likely to not only communicate with each other, but are likely to communicate with each other for an extended period of time. An increase in the volume and length of conversations can lead to greater participation among users of an along community. Moreover, increased length of conversations can lead to more substantive relationships among users of the online community. Users may be more likely to evaluate each other based on substantive characteristics, and may be less likely to evaluate each other based on initial reactions to profile pictures or other profile information.

The computing system may reveal information to users in stages, allowing the users to slowly take in information and gain a better understanding of the individuals with whom they are communicating. Further, the piece-wise revelation of information may more closely track interactions in the physical world, in which people typically do not immediately know a great deal of information about other individuals and typically gain familiarity with others through conversation. With the system described herein, users not only learn more about each other through conversations themselves, but users are able to view additional profile content the longer the conversation lasts.

As additional description to the embodiments described below, the present disclosure describes the following embodiments.

Embodiment A1 is a computer-implemented method for revealing obscured image content as users communicate. The method includes receiving, by a computing system and from a first computing device logged into a first user account of the computing system, a request to view an image that was provided by a second user account of the computing system. The method includes determining, by the computing system, that the image depicts a particular object at a particular portion in the image. The method includes providing, by the computing system and for receipt by the first computing device, first information to cause the first computing device to present the image with the particular object at the particular portion of the image obscured while other portions of the image that do not depict the particular object are left unobscured. The method includes receiving, by the computing system, an indication that the first user account and the second user account interacted. The method includes providing, by the computing system and for receipt by the first computing device, second information to cause the first computing device to present the image with the particular object at the particular portion of the image unobscured, as a result of the first user account and the second user account having interacted.

Embodiment A2 is the computer-implemented method of embodiment A1, wherein: the particular object comprises a human face; and providing the first information includes providing information to cause the first computing device to present the image with the human face obscured while other portions of the image that do not depict the human face are left unobscured.

Embodiment A3 is the computer-implemented method of embodiment A1, wherein: the image depicts a first human face and a second human face; the particular object comprises the first human face; the method further comprises determining, by the computing system, that the first human face depicts a face of a creator of the second user account and that the second human face does not depict the face of the creator of the second user account; and providing the first information includes providing information to cause the first computing device to present the image with the first human face obscured while other portions of the image that do not depict the first human face, including a portion of the image that depicts the second human face, are left unobscured.

Embodiment A4 is the computer-implemented method of embodiment A1, wherein: the image comprises a frame in a video captured by a second computing device logged into the second user account; and the method further comprises providing, by the computing system and for receipt by the first computing device, information to cause the first computing device to present the video with the particular object obscured as the video plays while other portions of the video that do not depict the particular object are left unobscured, the particular object moving among frames of the video such that the particular portion of the video at which the video is obscured moves among frames of the video.

Embodiment A5 is the computer-implemented method of embodiment A1, further comprising, after the computing system provides the first information to cause the first computing device to present the image with the particular object obscured and before the computing system receives the indication that the first user account and the second user account interacted: receiving, by the computing system, an intermediary indication that the first user account and the second user account interacted; and providing, by the computing system and for receipt by the first computing device, intermediary information to cause the first computing device to present the image with the particular object partially obscured while other portions of the image that do not depict the particular object are left unobscured, responsive to having received the intermediary indication that the first user account and the second user account interacted.

Embodiment A6 is the computer-implemented method of embodiment A5, further comprising, after the computing system provides the first information to cause the first computing device to present the image with the particular object obscured and before the computing system receives the indication that the first user account and the second user account interacted: receiving, by the computing system and from the first computing device, a request to view a second image that was provided by the second user account, wherein the second image depicts the particular object; and providing, by the computing system and for receipt by the first computing device, second intermediary information to cause the first computing device to present the second image with the particular object partially obscured while other portions of the second image that do not depict the particular object are left unobscured.

Embodiment A7 is the computer-implemented method of embodiment A6, wherein: presenting the image with the particular object partially obscured comprises a region of the particular object being unobscured in the image; and presenting the second image with the particular object partially obscured comprises same said region of the particular object being unobscured in the second image.

Embodiment A8 is the computer-implemented method of embodiment A5, wherein: the particular object being obscured includes the particular object being covered with multiple different interface elements; the particular object being partially obscured includes the particular object being covered with a subset of the multiple different interface elements such that the particular object is no longer covered with some of the multiple different interface elements; and the particular object being unobscured includes the particular object being covered with none of the multiple different objects.

Embodiment A9 is the computer-implemented method of embodiment A1, further comprising, after the computing system provides the first information to cause the first computing device to present the image with the particular object obscured and before the computing system receives the indication that the first user account and the second user account interacted: receiving, by the computing system, indications of multiple intermediary interactions between the first user account and the second user account; and providing, by the computing system and for receipt by the first computing device, intermediary information to cause the first computing device to present at least three iterations of the particular object becoming less obscured until the particular object is unobscured, each of the at least three iterations responsive to the computing system receiving an indication of an interaction between the first user account and the second user account.

Embodiment A10 is the computer-implemented method of embodiment A1, receiving, by the computing system and from the second computing device while the second computing device is logged into the second user account, a request to view a different image that was provided by the first user account; determining, by the computing system, that the different image depicts a different object; providing, by the computing system and for receipt by the second computing device, third information to cause the second computing device to present the different image with the different object obscured while other portions of the different image that do not depict the different object are left unobscured providing, by the computing system and for receipt by the second computing device as a result of the computing system having received the indication that the first user account and the second user account interacted, fourth information to cause the second computing device to present the different image with the different object unobscured.

Embodiment A11 is the computer-implemented method of embodiment A1, wherein the indication that the first user account and the second user account interacted comprises an indication that the first user account sent a user-authored message to the second user account, and the second user account replied by sending a user-authored message to the first user account.

Embodiment A12 is the computer-implemented method of embodiment A11, wherein: the user-authored message that the first user account sent to the second user account comprises user-typed text; and the user-authored message that the second user account sent to the first user account comprises user-typed text.

Embodiment B1 is a computer-implemented method. The method includes receiving, by a computing system and from a first computing device at which a first user account has logged into the computing system, a request to view content associated with a second user account of the computing system. The method includes sending, by the computing system and for receipt by the first computing device, first information to cause the first computing device to present at least part of the content associated with the second user account obscured. The method includes receiving, by the computing system, an indication that the first computing device and the second computing device exchanged user-authored messages, including a first message that was authored by user input at the first computing device being transmitted for presentation at the second computing device, and a second message that was authored by user input at the second computing device being transmitted for presentation at the first computing device. The method includes sending, by the computing system and for receipt by the first computing device, second information to cause the first computing device to present the content associated with the second user account unobscured, responsive to the computing system having received the indication that the first computing device and the second computing device exchanged user-authored messages.

Embodiment B2 is the computer-implemented method of embodiment B1, wherein the content associated with the second user account comprises an image uploaded through use of the second user account.

Embodiment B3 is the computer-implemented method of embodiment B2, wherein: the presentation of the at least part of the content associated with the second user account being obscured includes a presentation of multiple objects covering at least part of the image; and the presentation of the content associated with the second user account being unobscured includes a presentation of the image without the multiple objects covering the at least part of the image.

Embodiment B4 is the computer-implemented method of embodiment B3, wherein: the content associated with the second user account comprises an additional image uploaded through use of the second user account; the presentation of the at least part of the content associated with the second user account being obscured includes a presentation of the multiple objects covering at least part of the additional image in a same manner as the multiple objects cover the at least part of the image; the presentation of the content associated with the second user account being unobscured includes a presentation of the additional image without the multiple objects covering the at least part of the additional image.

Embodiment B5 is the computer-implemented method of embodiment B3, further comprising, between the computing system sending the first information and the computing system receiving the indication that the first computing device and the second computing device exchanged user-authored messages: receiving, by the computing system, an indication that the first computing device and the second computing device exchanged intermediary user-authored messages; and sending, by the computing system and for receipt by the first computing device, intermediary information to cause the first computing device to present a lesser portion of the content associated with the second user account obscured, responsive to the computing system having received the indication that the first computing device and the second computing device exchanged the intermediary user-authored messages, wherein the lesser portion of the content being obscured involves a subset of the multiple objects covering the at least part of the image.

Embodiment B6 is the computer-implemented method of embodiment B1, wherein: the content associated with the second user account comprises first text content uploaded by the second user account for display as part of a profile of the second user account that is accessible to other user accounts of the computing system; the presentation of the at least part of the content associated with the second user account as obscured includes a presentation by the first computing device of the profile of the second user account without presentation of the first text content; the presentation of the content associated with the second user account unobscured includes a presentation by the first computing device of the profile of the second user account that includes presentation of the first text content.

Embodiment B7 is the computer-implemented method of embodiment B6, wherein: the second user account was authored by a second user; and the first text content comprises an item selected from a group consisting of a height of the second user, an age of the second user, a geographic location of the second user, a profession of the second user a relationship status of the second user, a sexual orientation of the second user, a religion of the second user, a biographical description of the second user, an ethnicity of the second user, a body type of the second user, whether the second user smokes, whether the second user drinks alcohol, whether the second user does drugs, an educational level of the second user, and a language spoken by the second user.

Embodiment B8 is the computer-implemented method of embodiment B7, further comprising: receiving, by the computing system after the first computing device presented the first text content as part of the profile of the second user account, an indication that the first computing device and the second computing device exchanged a second set of user-authored messages; sending, by the computing system and for receipt by the first computing device responsive to the computing system receiving the indication that the first computing device and the second computing device exchanged the second set of user-authored messages, third information to cause the first computing device to update the presentation by the first computing device of the profile of the second user account to add the second text content, which had not previously been presented by the first computing device as part of the profile of the second user account, the second text content comprising a different item selected from the group; receiving, by the computing system, after the first computing device presented the first text content and the second text content as part of the profile of the second user account, an indication that the first computing device and the second computing device exchanged a third set of user-authored messages; and sending, by the computing system and for receipt by the first computing device responsive to the computing system receiving the indication that the first computing device and the second computing device exchanged the third set of user-authored messages, fourth information to cause the first computing device to update the presentation by the first computing device of the profile of the second user account to add the third text content, which had previously been presented by the first computing device as part of the profile of the second user account, the third text content comprising another different item selected from the group.

Embodiment B9 is the computer-implemented method of embodiment B1, wherein the user-authored messages are user-typed messages, such that the first message comprises user-typed text and the second message comprises user-typed text.

Embodiment B10 is the computer-implemented method of embodiment B1, further comprising: establishing, by the computing system, a video-chat session between the first user account and the second user account that concurrently streams a first video captured by a camera of the first computing device for presentation by the second computing device and a second video captured by a camera of the second computing device for presentation by the first computing device; wherein the user-authored messages that are exchanged between the first computing device and the second computing device comprise first audio captured by a microphone of the first computing device that is transmitted for audible playback by the second computing device and second audio captured by a microphone of the second computing device that is transmitted for audible playback by the first computing device, the first audio and second audio captured as part of the video-chat session.

Embodiment B11 is the computer-implemented method of embodiment B10, further comprising: counting, by the computing system, a number of spoken words within the first audio, the second audio, or both the first audio and the second audio; and determining, by the computing system, that the number of spoken words has satisfied a threshold number of spoken words, wherein the computing system sends the second information to cause the first computing device to present the content associated with the second user account unobscured, responsive to the computing system having determined that the number of spoken words has satisfied the threshold number of spoken words.

Embodiment B12 is the computer-implemented method of embodiment B10, wherein: the content associated with the second user account comprises the second video captured by the camera of the second computing device; the presentation by the first computing device of the at least part of the content associated with the second user account obscured includes a presentation of at least part of the second video by the first computing device being obscured; and the presentation by the first computing device of the content associated with the second user account being unobscured includes a presentation of the second video by the first computing device being unobscured.

Embodiment B13 is the computer-implemented method of embodiment B12, wherein: the presentation by the first computing device of the at least part of the content associated with the second user account being obscured includes a presentation of the second video by the first computing device that obscures a portion of the second video that represents a human face while other portions of the second video that do not represent the human face remain unobscured; the human face moves in a scene depicted by the second video as the second video plays; and the portion of the second video that obscures the human face moves as the second video plays to track a position of the human face that moves in the scene.

Embodiment B14 is the computer-implemented method of embodiment B1, further comprising, between the computing system sending the first information and the computing system receiving the indication that the first computing device and the second computing device exchanged user-authored messages: receiving, by the computing system, an indication that the first computing device and the second computing device exchanged intermediary user-authored messages; sending, by the computing system and for receipt by the first computing device, intermediary information to cause the first computing device to present a lesser portion of the content associated with the second user account obscured, responsive to the computing system having received the indication that the first computing device and the second computing device exchanged the intermediary user-authored messages, wherein the lesser portion of the content being obscured represents less of the content being obscured than the at least part of the content being obscured; determining, by the computing system after the computing system has sent the intermediary information and before the computing system sends the second information, that an exchange of user-authored messages between the first computing device and the second computing device has become inactive; and sending, by the computing system and for receipt by the first computing device, responsive to the computing system having determined that the exchange of user-authored messages between the first computing device and the second computing device has become inactive, additional intermediary information to cause the first computing device to present the at least part of the content associated with the second user account obscured, such that more of the content associated with the second user account has become obscured as a result of the computing system determining that the exchange of user authored messages between the first computing device and the second computing device has become inactive.

Embodiment B15 is the computer-implemented method of embodiment B14, wherein determining that the exchange of user-authored messages between the first computing device and the second computing device has become inactive comprises the computing system determining that the first computing device and the second computing device have not exchanged messages for a threshold amount of time.

Embodiment C is directed to one or more computer-readable devices having instructions stored thereon, that when executed by one or more processors, cause the performance of actions according to the method of any one of embodiments A1 through A12 and B1 through B15.

Embodiment D is directed to a computing system that comprises one or more processors; and one or more computer-readable devices that include therein instructions that, when executed by the one or more processors, perform the method of any one of embodiments A1 through A12 and B1 through B15.

The details of one or more implementations are set forth in the accompanying drawings and the description below. Other features, objects, and advantages will be apparent from the description and drawings, and from the claims.

DESCRIPTION OF DRAWINGS

FIGS. 6A-D show a user interface during another example conversation between two users.

FIGS. 9A-G show a flow chart of processes used to implement the technologies described in this disclosure.

Like reference symbols in the various drawings indicate like elements.

DETAILED DESCRIPTION

This document generally describes revealing information based on user interaction.

A computing system that facilitates interactions between users of an online community may allow users to create profiles that describe themselves, view profiles of other users, and message various users. The computing system, however, may be configured so that at least some of the information on user profiles is hidden from view or otherwise obscured to viewing users. For example, some images may not be presented to a viewing user and/or those images that are presented to a viewing user may be modified in whole or part to obscure content in the image. As another example, certain user data such as age, height, and name may not be initially presented to the viewing user.

This initially-obscured content may remain obscured to a viewing user until the viewing user satisfies certain criteria, such as messaging the individual that created the user profile. For example, some profile information may remain obscured until the two users send text-based messages back and forth or engage in a video-chat session. Once the users have begun to communicate, a user's face in a picture that had been initially blurred may come into focus; additional user pictures may be presented; and/or user data that had not been shown may be revealed.

The manner in which the computing system obscures user content and selectively reveals that content as users communicate incentives individuals to communicate. Moreover, obscuring some content shifts user focus to non-obscured content, which can lead to deeper understanding of community members. Various different aspects of this type of system are described with reference to the figures, beginning with a discussion of FIG. 1 and various physical components of the system.

Figure 1:
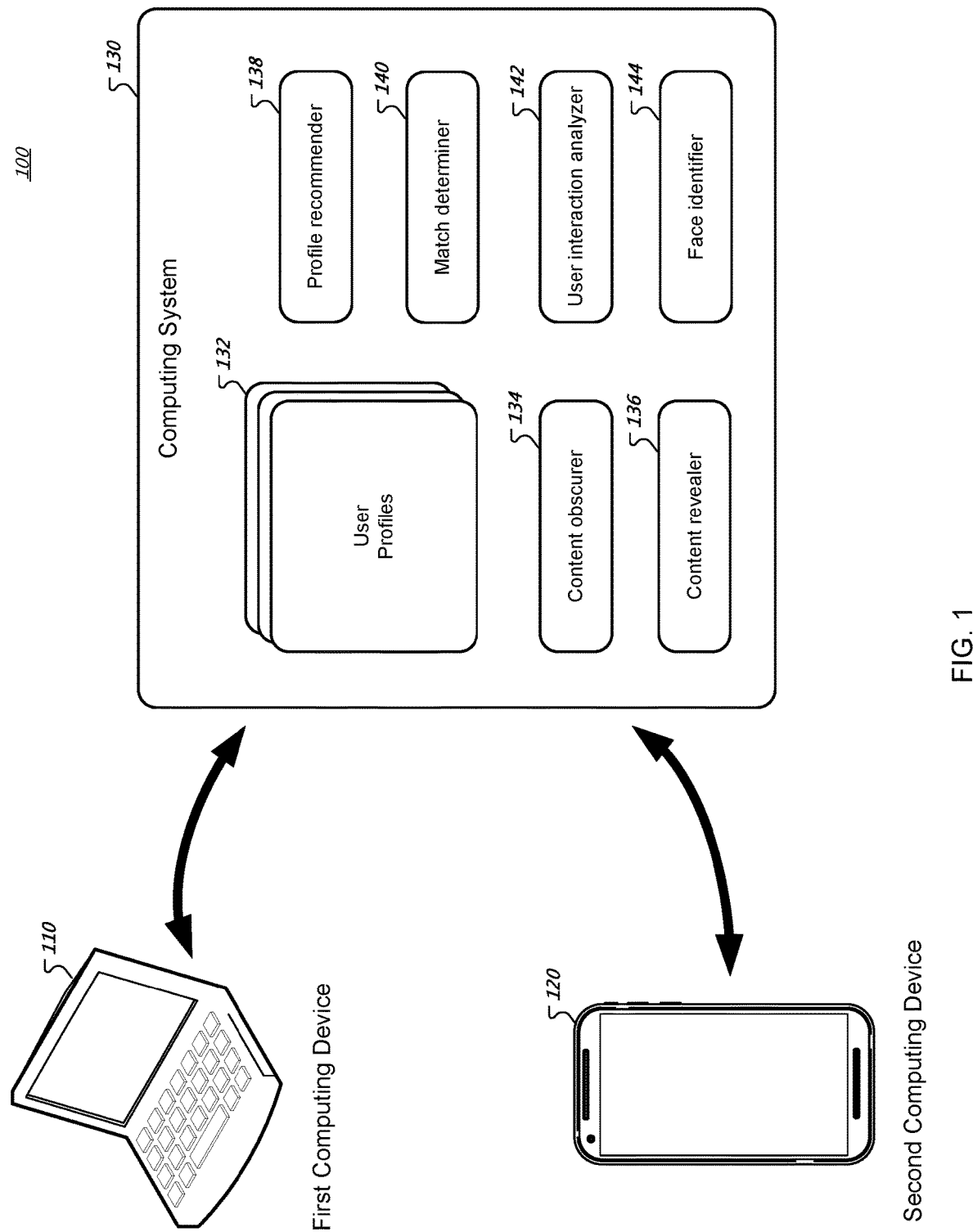
FIG. 1 shows an example system that can be used to implement the technologies described in this disclosure.

FIG. 1 shows an example system that can be used to implement the technologies described in this disclosure. The system 100 includes a computing system 130, which represents one or more computers that work together to perform various operations. In some implementations, the computing system 130 represents a "cloud" computing system that communicates with various client computing devices at which users of the online community access the online community.

A first computing device 110 and a second computing device 120 represent two of potentially thousands of client computing devices that communicate with the computing system 130 over a network, such as the internet. For example, a first user may use the first computing device 110 to create a user profile, browse other users' profiles, and communicate with other users. A second user may use the second computing device 120 for similar activities. The first computing device 110 is illustrated as a laptop computer and the second computing device 120 is illustrated as a mobile phone, but the first and second computing devices 110 and 120 can be implemented as various different types of computing devices, such as desktop computers and tablet computers.

The computing system 130 stores data representing multiple different user profiles 132. The data for each user profile may have been specified by an owner or creator of the respective user profile. For example, each user profile may include, or at least be capable of including, a profile picture, additional user pictures, demographic information (e.g., age, location, height, relationship status), and biographical narratives. Users of the online community can use a client computing device (e.g., device 110 or 120) to modify their own profiles through interaction with the computing system 130 over a network.

The computing system 130 also includes various different components that implement different functions of the online community, such as a profile recommender 138, a match determiner 140, a content obscurer 134, a face identifier 144, a content revealer 136, a user interaction analyzer 142, and a face identifier 144. Each of these components represents computer code that is configured to perform various functions, and that actively performs those functions when the computing system 130 is operating. These components are described in turn.

The profile recommender 138 is configured to recommend a subset of the user profiles 132 to a user either automatically or based on user-requested search criteria. As a first example, a user of the online community may select a "Browse user profiles" interface element and be prompted to specify search criteria that the profile recommender 138 will use to select a subset of the user profiles 132 that pertain to the search criteria. For example, an example female user may specify that she would like to view profiles of men aged 20-30 that are located within 50 miles of New York, N.Y. In response, the profile recommender 138 may identify a subset of the user profiles 132 that meet her criteria, may rank the subset of user profiles 132, and may present the subset of user profiles 132 to the female user in a ranked order.

The profile recommender 138 may also automatically recommend user profiles. For example, the same female user may click a "View suggested profiles" user interface element. In response, the profile recommender 138 may generate a list of user profiles that the profile recommender 138 determines to be of potential interest to the female user, for example, based on similarity to user profiles that the female user has been viewing and or has messaged, and/or based on the user profiles representing people similarly aged to the female user, geographically near to the female user, having interests similar to those of the female user, etc.

The match determiner 140 may analyze interactions between two users of the computing system 130, to determine whether those two users have formed a "match." User may match after each user has performed an action that indicates favorable opinion of the other user, for example when the users have sent a message to each other, the users have liked each other, or a combination of the two. The match determiner 140 may determine that mutual interaction between the users has occurred, notify the users that they have therefore matched, and enable functionality that otherwise would not have been available to the users, such as an ability to video chat with each other and/or enter a conversation.

The content obscurer 134 is configured to obscure user profile content, for example, by limiting the amount of information on a user profile that is initially shown to another individual that is viewing that user profile. The content obscurer 134 can obscure content in various different manners, for example, by pixelating a user's face within an image, or by limiting which demographic information is initially presented as part of a user's profile.

The content obscurer 134 may request that the face identifier 144 identify a portion of an image that includes a face, so that the content obscurer 134 may obscure only the portion of the image that corresponds to the user's face. The identification may be automatic based on facial recognition processes, or may involve the computing system 130 requesting that a user to identify in an image that the user has uploaded any portion of that image that shows the user's face. In some examples, the face identifier 144 analyzes one or more pictures that a user has identified as illustrating that user's face, and the face identifier 144 uses that results of that analysis to automatically identify the user's face in another image (e.g., potentially among multiple faces in an image). Various techniques for obscuring content are described throughout this disclosure, for example, with reference to FIG. 2.

A user interaction analyzer 142 is configured to determine when users that are communicating with each other have satisfied criteria that prompts the system to reveal previously-obscured user profile content. Various techniques for determining when user profile content should be revealed are described throughout this disclosure, for example, with reference to FIG. 3.

The computing system 130 also includes a content revealer 136, which is configured to reveal previously-obscured user profile content, for example, by de-pixelating a user's face within an image, or by presenting demographic information that had initially been omitted from a user's profile. Various techniques for revealing obscured user profile content are described throughout this disclosure, for example, with reference to FIGS. 4A-B.

Figure 2:
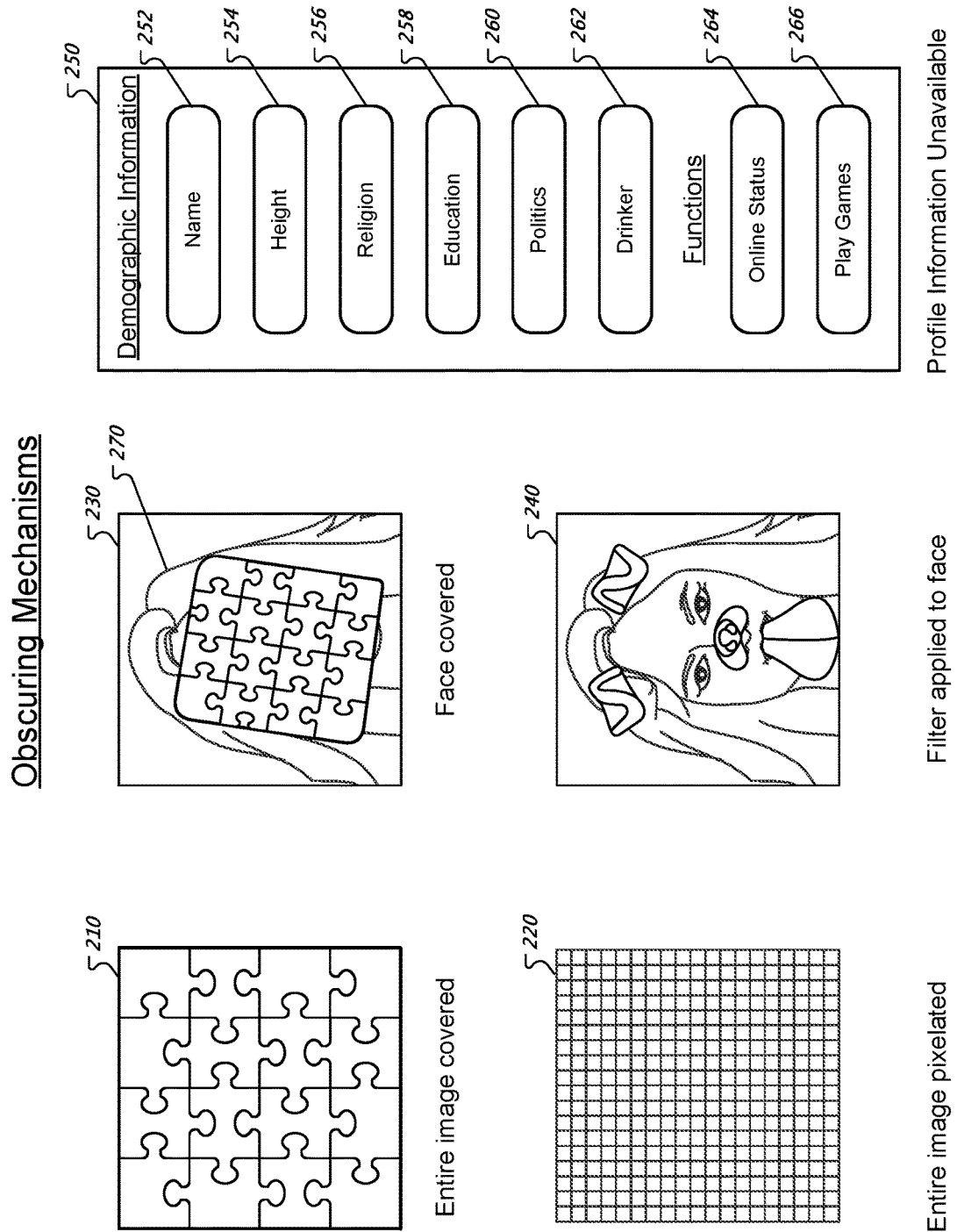
FIG. 2 shows different mechanisms for obscuring user profile content.

FIG. 2 shows different mechanisms for obscuring user profile content. Images 210 and 220 represent images of a user 270 that are entirely obscured. For example, image 210 represents an image of the user 270 that has been entirely covered with a puzzle that comprises sixteen interlocking puzzle pieces. Image 220 represents the image of the user 270 that has been entirely pixelated (e.g., by reducing a resolution of a portion of the image so that content in the image 220 is largely unrecognizable). The computing system 130 may also distort the content of an entire image in other manners, for example, by darkening the entire image, blurring the entire image, or swirling content of the entire image.

Images 230 and 240 represent images of the user 270 that are partially obscured. In each image, only a portion of the image may be obscured, for example a portion of the image that has been identified as representing a human face. In such examples, the face identifier 144 may have analyzed the images 230 and 240 to identify a location of a face of the user 270, and may provide information to a client device (e.g., device 110 or 120) to present the image of the user 270 with the face obscured (e.g., by providing the image 230 or 240 with the face obscured, or by providing the image 230 or 240 without the face obscured but with coordinates that indicate a portion of the image 230 or 240 that the client device is to obscure).

Image 230 represents an image of the user 270 in which the user's face is covered with a puzzle that comprises sixteen interlocking puzzle pieces and other portions of the image are not covered with puzzle pieces or otherwise obscured. The puzzle may be angled or otherwise oriented (e.g., tilted and/or skewed) to represent an orientation of the user's face in the image 230. Image 240 represents an image in which a filter has been applied to a face of the user 270. Applying the filter to the face can involve the face identifier 144 identifying locations of various facial features of the user 270 (e.g., the user's mouth, the user's nose, and a top of the head of the user). The face identifier 144 may add, to the image 240, objects at the locations of the various features (e.g., a dog tongue at the location of the user's mouth, a dog nose at the location of the user's nose, and dog ears at the top of the head of the user).

User interface screen 250 shows non-photographical user profile content that is able to be obscured. Example non-photographical content includes demographic information 252-262 and functions 264-266. A first type of demographic content is a name of the user 252. For example, a user profile may initially be shown without showing any name for the user, or may only show a nickname for the user without showing the person's first name or full name. Other types of demographic information include a height 254 of the user, a religion 256 of the user, an education level 258 of the user (e.g., high school graduate, college graduate, professional school graduate), political preference 260 of the user, and whether the user drinks alcohol 262.

Other types of non-photographical user content that may be obscured in the presentation of a user profile include a gender of an individual with whom the user is interested in forming a relationship, an age of an individual with whom the user is interested in forming a relationship, a geographical region of an individual with whom the user is interested in forming a relationship, whether the user has kids, whether the user wants kids, a body type of the user, whether the user smokes cigarettes, an ethnicity of the user, a gender of the user, hobbies of the user, hair color of the user, eye color of the user, a profession of the user, an astrological sign of the user, a weight of the user, a birthday of the user, an email address of the user, and a phone number of the user.

Each of these portions of demographic information 252-262 may represent a field that the user completed when he or she created and/or edited his or her user profile. For example, the user may be prompted when creating his or her user profile to enter a name 252, a height, 252, etc. Some fields may be completed by the user with a typed text entry (e.g., a typed name). Other fields may be completed with user selection of only one of multiple choices that are provided (e.g., a pull down menu may allow the user to select one of multiple delineated heights, and a set of radio buttons may allow the user to select one of multiple delineated types of religion).

The demographic information 252-262 may be obscured in various different ways. In some examples, a user interface element is placed at a location at which the obscured information will eventually show if revealed. For example, instead of the user profile showing the name "Mary," the user profile may show the "Name" button 252. In some examples, the obscured information is not shown with a placeholder element. For example, displayed user profile content may include a blank space (e.g., no text, but with background content) at a location at which the user's height will be eventually shown if revealed. Alternatively, user profile content may be reordered once content is revealed, such that a portion of user profile content is initially shown at a location at which the user's height will appear once the user's height is revealed. For example, the user's geographical location may be shown at a certain location in the user's profile, and then after the user's "height" is revealed, the user's location may be moved down in the presentation of the user profile content and the height may be shown where the user's location had originally been shown.

The computing system 130 may also obscure various different types of functions, such as an online status 264 of a user and an ability of an individual to play games 266 with the user. These functions may represent functionality of the online community that is unavailable until two users have begun to message, in contrast to data that the user has specified as part of the profile-creation process. Other example functions that may be conditionally unavailable include an ability to video chat with the user, an ability to leave voice messages for the user, and an ability to send images to the user as part of a text messaging session. These functions, when obscured, may be illustrated by user interface elements that are "grayed out" or otherwise inactive, or may not be shown in conjunction with a presentation of user profile content.

Figure 3:
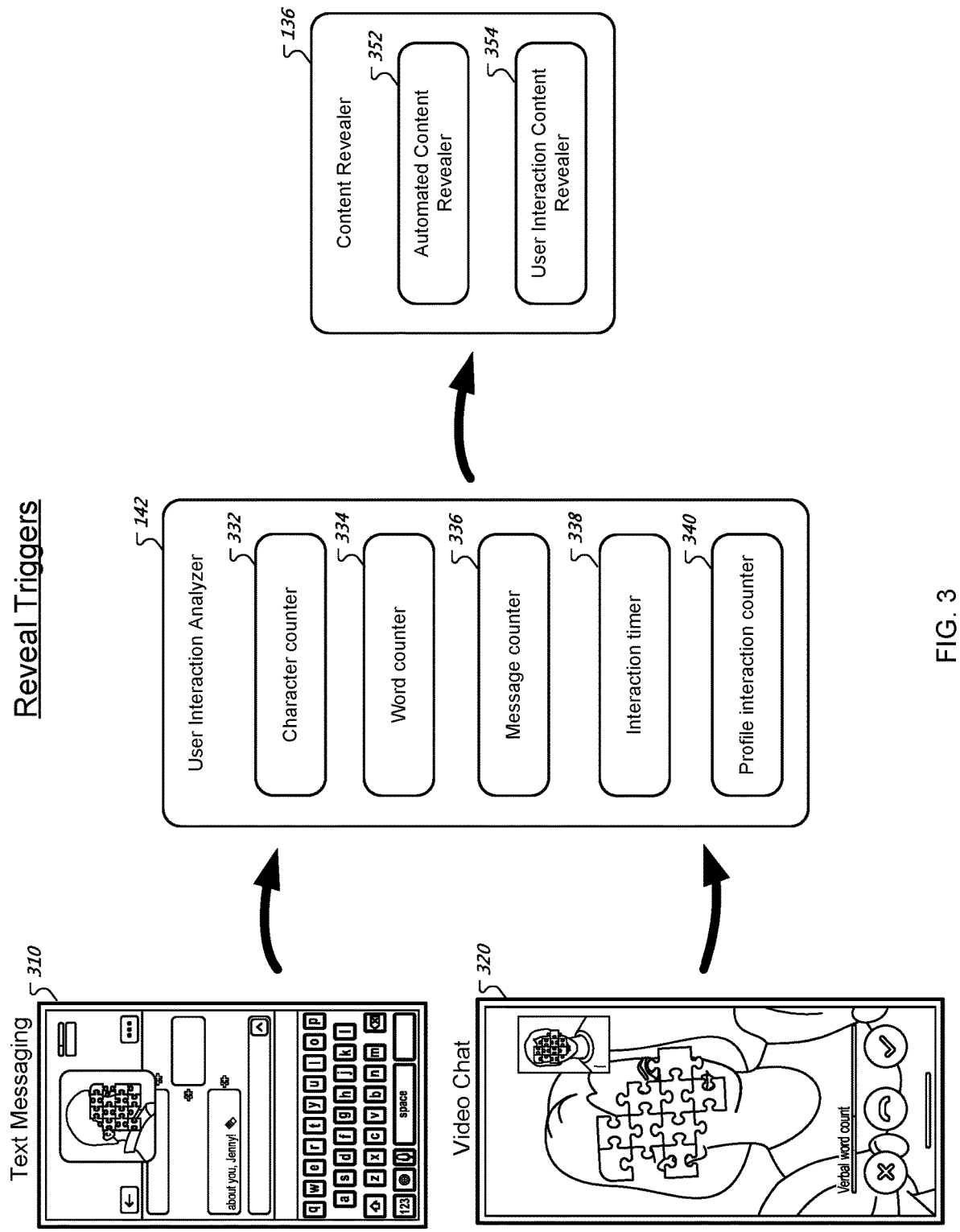
FIG. 3 illustrates different triggers that can prompt a client device to reveal obscured content.

FIG. 3 illustrates different triggers that can prompt a client device to reveal obscured content. In this illustration, users satisfy the conditions of various different triggers by communicating with each other, for example, during a text messaging session 310 or during a video chat session 320. The user interaction analyzer 142 that was introduced with reference to FIG. 1 may include various different types of components that monitor interaction between the users. The user interaction analyzer 142 may monitor data generated by one or more of these different components to determine whether a trigger for revealing content has been satisfied.

These different components and associated trigger conditions are discussed here below in turn.

A character counter 332 counts a number of characters typed by the users in the text messaging session 310. This information may be used by the user interaction analyzer 142 to determine whether a condition for triggering a content reveal has been satisfied. For example, once the number of characters typed exceeds a threshold value (two hundred characters), the user interaction analyzer 142 may trigger a content reveal and then re-start counting the number of characters typed again until criteria for another content reveal is satisfied. In another example, each of two users in a text messaging session 310 must type a threshold amount of characters for criteria to be satisfied. For example, each of the users must type one hundred characters to cause a content reveal. In another example, the ability for a user to trigger a content reveal bounces back and forth between the users, with each user having to type a threshold number of characters to cause a reveal. For example, a first user may need to type one hundred characters to trigger a reveal of the first user's profile information, then a second user may need to type one hundred characters to trigger a reveal of the second user's profile information, and so on.

A word counter 334 counts a number of words communicated by each of the users in either the text messaging session 310 or the video chat session 320. For video chats or other audio communications, the word counter 334 may analyze spoken content with speech recognition processes to count the number of words spoken in the conversation. The word counter 334 may be able to identify which user spoke each word, based either on differences in tone and/or the audio being part of different channels (e.g., one channel sourced at a first user's microphone, and a second channel sourced at a second user's microphone). The user interaction analyzer 142 may trigger a content reveal when the total number of words satisfies certain criteria regardless of which user has spoken the words, or the ability to trigger a content reveal may bounce back and forth between users, as described with respect to the character counter 332.

A message counter 336 identifies when users have sent messages back and forth in either the text messaging session 310 or the video chat session 320, and may count the number of messages sent the users. In a text messaging session 310, a message may represent a collection of content that is sent from a first user to a second user at a certain point in time, for example, when the first user has pressed the "Enter" key to send text to the other user, or has provided input to send an image to the other user. In a video chat session, the message counter 336 may analyze content of the conversation using speech recognition processes to determine when control of the conversation has switched from a first user to a second user, and may identify the switch in control of the conversation from the first user to the second as an end of a message communicated by the first user.

The message counter 336 may trigger a content reveal every time the conversation switches from one user to the other. For example, should a first user send five messages to a second user before the second user responds to the first user, the user interaction analyzer 142 may only identify this portion of the conversation as involving a single mutual message exchange because there was only one message between the two users that was responsive to a message sent by the other user.

A single mutual message exchange may result in the user interaction analyzer 142 triggering a content reveal on both user's profiles, or only on the profile of the user that reciprocated the exchange (e.g., content on the second user's profile is revealed to the first user due to the second user having responded to the first user). In some implementations, a message needs to be responsive to a message sent by another user in order to trigger a content reveal, such that an initial message typed by one user to another user may not cause any content to be revealed on either user's profile.

In some examples, the user interaction analyzer 142 requires that users exchange multiple messages before profile content is revealed. For example, the users may need to accumulate four of the above-described message exchanges before profile content is revealed. In some examples, the user interaction analyzer 142 does not monitor whether messages are exchanged, and rather triggers a content reveal when the cumulative number of messages exceeds a threshold number. For example, the user interaction analyzer 142 may trigger a content reveal once ten messages have been sent, regardless whether those ten messages have been sent by one user or both users.

The interaction timer 338 monitors an amount of time that users have been communicating. The amount of time that is monitored may be an amount of time that both users are present in the text messaging session 310 or the video chat session 320 (an amount of time that the text messaging session 310 or the video chat session 320 is in "focus" on both user's computer interfaces), or may be an amount of time that users actively communicate in any such session (e.g., an amount of time that the users actively speak or type content). Once the user have been communicating a threshold amount of time, the user interaction analyzer 142 may trigger a content reveal.

The profile interaction counter 340 identifies when one user has interacted with another user's profile, and vice versa, and may count a number of these interactions. Profile interaction can include "liking" another user's profile, liking individual items on that other user's profile (e.g., pictures, demographic information, biographical entries), commenting on items on that other user's profile, and viewing items on that other user's profile (e.g., selecting a link to view a picture or a biographical entry typed by that other person). Similar to the mechanisms described above, the user interaction analyzer 142 may trigger a content reveal when the total amount of profile interactions exceeds a threshold number of interactions (e.g., one or more), when there is a mutual exchange of profile interactions, etc.

Upon one or more conditions being satisfied to trigger a content reveal, the user interaction analyzer 142 may send an instruction to the content revealer 136 to cause the content revealer 136 to partially or fully reveal one or more items of content. The content revealer 136 may either invoke an automated content revealer 352 to automatically reveal content, or can invoke a user interaction content revealer 354 to prompt one of the users to a conversation to select which content should be revealed. Both options are described below.

In a first option, the automated content revealer 352 automatically selects profile content to be revealed and the users participating in a conversation do not select which content item they would like to see revealed or how that content item should be revealed (at least during the conversation, in distinction to a user potentially pre-configuring how their profile content is obscured and how it may be revealed in a yet-to-be started conversation). As such, this automated process can involve the automated content revealer 352 both selecting the content item to be revealed and selecting how much of that content item should be revealed. As an illustration, suppose that a user's face is obscured by a jigsaw puzzle in a profile picture and multiple other images. In this situation, the automated content revealer 352 may determine that the user's face in the profile picture should be revealed, that one puzzle piece should be removed from that image, and that the puzzle piece to be removed should be the upper-left-most puzzle piece.

In some implementations, there is no need to select which image to reveal because only one image is obscured. In those situations in which multiple images are obscured, the computing system may remove a puzzle piece from only one of the images (e.g., the image that a user is currently viewing, or the image that is identified as most prominent, such as the profile picture), or each image may be revealed at the same time and in the same manner (e.g., the same puzzle piece may be removed from each image).

In some implementations, a single puzzle piece may be removed at a time, regardless how the users communicate. Still, in some implementations, multiple puzzle pieces may be removed at a same time. For example, the user interaction analyzer 142 may determine that the interaction between the users meets criteria for concurrently performing multiple reveals at the same time, either to the same image or to different images, and may instruct the content revealer 136 accordingly. Determining the number of reveals to perform at a given time may be based on a type of interaction between two users (e.g., text messaging or video messaging), a level of saliency of that interaction (e.g., a length of the messages), and a speed of interaction (e.g., how fast users respond to each other's messages). With respect to speed, quick interaction among users could be rewarded by multiple reveals at the same time, or alternatively slow interaction could trigger multiple reveals at the same time to encourage users that are messaging slowly to not give up on the conversation.

The determination of which puzzle piece to remove may be pre-determined and based on a reveal sequence stored by the system. The pre-determined reveal sequence may be a sequence by which puzzle pieces are removed from every puzzle pattern. In some examples, the determination of which puzzle piece to remove is random, and therefore changes among different user interactions. In some examples, the system prioritizes removal of puzzle pieces that do not reveal significant image or facial characteristics. For example, when the face is obscured, the first puzzle pieces removed may be those at the periphery of the face, and the last puzzle pieces revealed may be those that cover the eyes, nose, and mouth. When the entire image is obscured, the first puzzle pieces removed may be those determined to not cover the person's face, and the last puzzle pieces removed may be those determined by the face identifier 144 to cover the person's face.

When the system is configured so that a first user participating in a conversation with a second user is able to view multiple images that the second user uploaded, the system may reveal each of the second user's images in the same manner. For example, the upper-left puzzle piece may disappear from not only the second user's profile picture, but the same upper-left puzzle piece may also disappear from each of the second user's other images. The multiple images uploaded by the second user may be presented to the first user simultaneously, or may be presented on different user interface screens. For example, should the first user see that the upper-left puzzle piece has disappeared from the second user's profile picture, the first user may click through the rest of the second user's pictures to see what those pictures look like with the upper-left puzzle piece removed.

The above description of the manner in which images are revealed has focused on the removal of puzzle pieces from an image, but similar principles can guide the reveal of images that are obscured in different manners. For example, when a filter is applied to a face (e.g., as shown in image 240, see FIG. 2), the order in which objects are removed from the user's face may be pre-determined or random; and objects may be removed one at a time, or the number of objects removed at a time may differ based on characteristics of interaction between the users. In another example, when an entire image or a user's face is distorted by blurring or pixilation, the degree to which the resolution of the image or face improves may always proceed according to the same pre-determined sequence of steps, or the system may improve the image resolution by multiple steps due to characteristics of interaction between the users, such as those described above.

In those implementations in which the obscured content comprises non-photographical profile information such as demographic content or profile functions (e.g., items 252-256, see FIG. 2), the order in which content is revealed may be pre-determined, may be random, or may be based on characteristics of the interaction between the users. With respect to this last option in which the characteristics of the interaction between users affects which items are revealed, the system may select to reveal "valuable" content such as the user's name 252 before less-valuable content when users are communicating robustly in order to incentivize robust conversation (or alternatively when users are not communicating often or with great substance, in order to keep the users from giving up on the conversation).

A second option in which content revealer 136 can determine which content to reveal is to involve a user in the content selection process, rather than having the reveal be automatically processed by the system. In such implementations, the user interaction content revealer 354 would prompt a user to select which content item to reveal. In some examples, a first user in a conversation with a second user would select the content item that he or she wants to be revealed of the second user's profile content. For example, the first user may select a puzzle piece that is covering part of an image uploaded by the second user, and that puzzle piece would disappear. Or, the first user may select one of multiple images that the second user uploaded and that are blurred or pixelated to be partially or fully revealed. Or the first user may select an item of non-photographical content of the second user's profile content for reveal (e.g., the second user's age).

In some examples, the first user would select a content item to be revealed not from the second user's profile content but from the first user's own profile content. In this manner, rather than users having control over what they get to see revealed from other persons' profile content, users are able to control how their own content is revealed to other persons. For example, the first user may select which puzzle piece to reveal to a second user from a display of the first user's own profile picture. Or the first user may select which of the first user's own images that are blurred or pixelated should be partially or fully revealed. Or, the first user may select which item of non-photographical profile content from the first user's own profile content should be shared with the second user.

A user that is given a choice regarding which content item to reveal (either on their own profile or another persons' profile) may be given a time limit to make that decision. Should the user not select an item for reveal within a certain amount of time, the system may either not reveal any item or may automatically select content for reveal (e.g., as discussed with respect the automated content revealer 352).

As described throughout this disclosure, the system may be configured so that two users participating in a conversation with each other either get to see the other user's content revealed at the same time, or content reveals may alternate between users. Regardless which manner the system is configured, content items may either be revealed in the same manner (e.g., such that each user sees the same puzzle pieces missing) or may be revealed differently (e.g., such that each user sees different puzzle pieces missing).

Figure 4A:
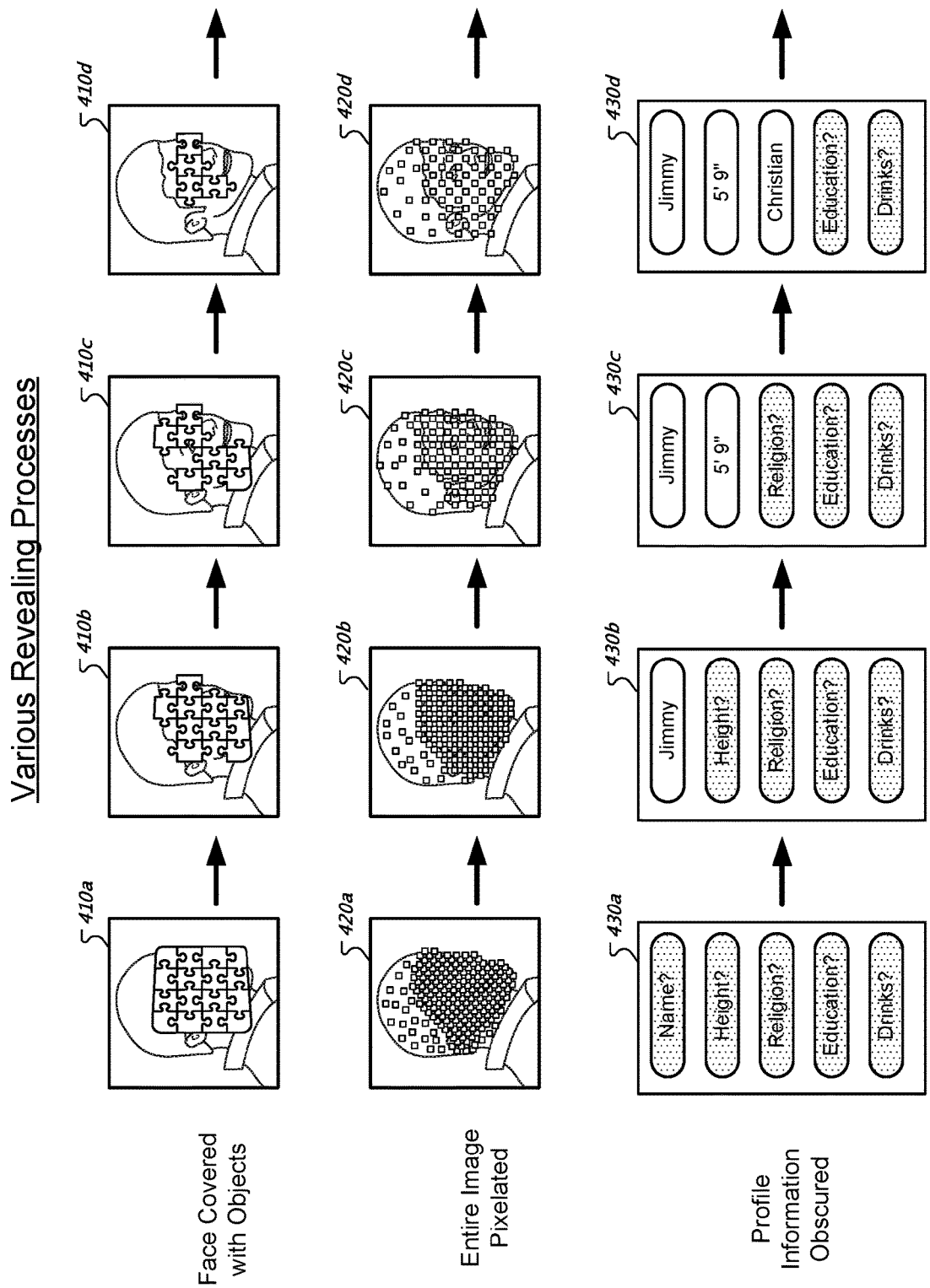
FIGS. 4A-B show sequences in which content is revealed.
Figure 4B:
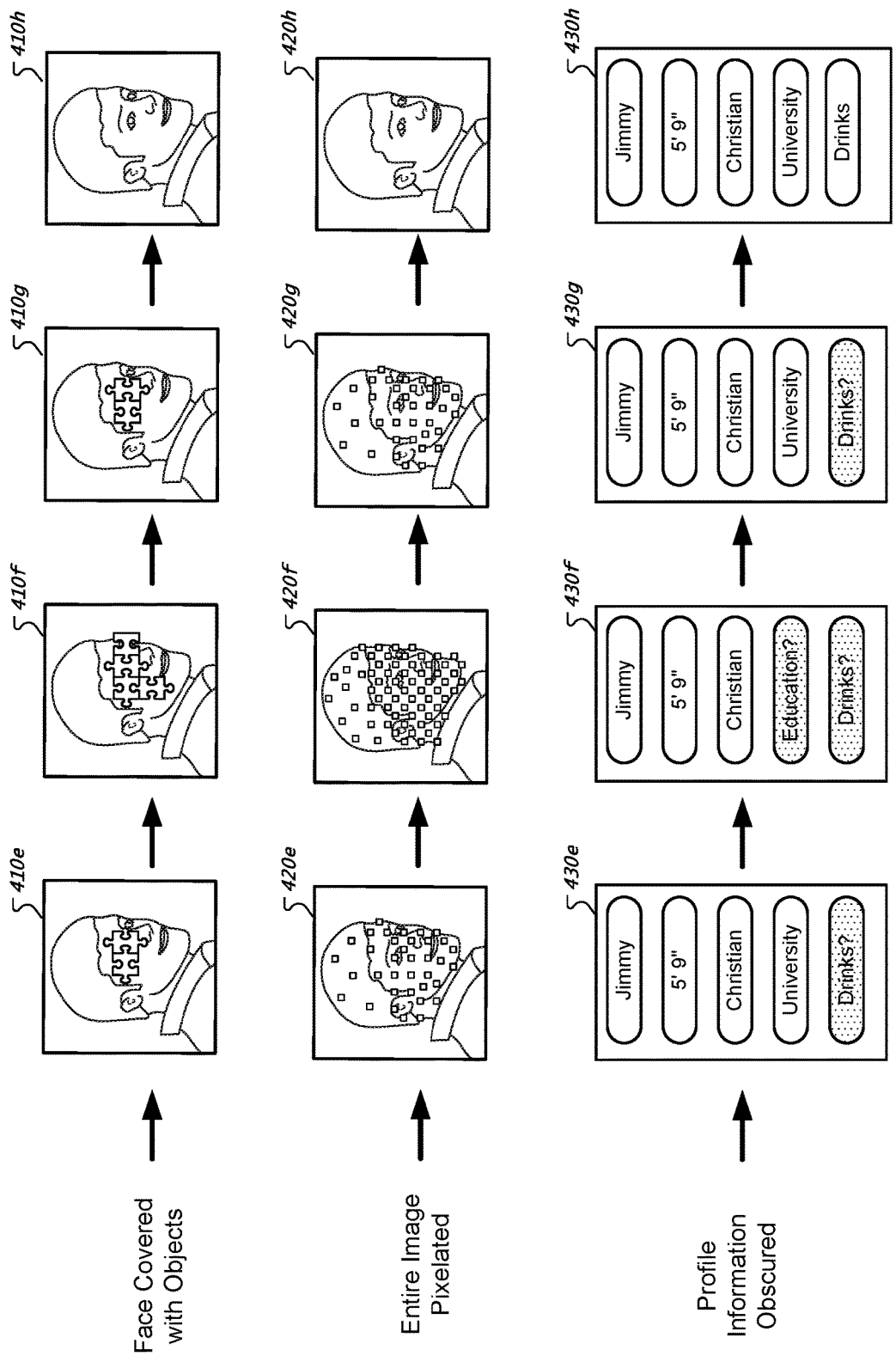

FIGS. 4A-B show sequences in which user profile content is revealed. In particular, FIGS. 4A-B show three such sequences: (1) a first sequence of images 410a-h in which a user's face is covered with a jigsaw puzzle, and puzzle pieces are stepwise removed to reveal the user's face, (2) a second sequence of images 420a-h in which an entire image is pixelated, and resolution of the image is stepwise increased until the image is shown at high resolution, and (3) a third sequence of screens 430a-h in which demographic information is obscured and stepwise revealed. These three different sequences are discussed in turn.

The first sequence discussed is illustrated by images 410a-h, in which a user's face is covered with a jigsaw puzzle, and puzzle pieces are stepwise removed to reveal the user's face. This process begins with image 410a, which shows user "Jimmy" with his face obscured by a complete puzzle. The image 410a represents Jimmy's profile picture, which may be the most prominent image (e.g., largest, first shown, etc.) that is shown to another user when that other user views information on Jimmy. In this illustration, a user named "Jenny" is engaged in a conversation with Jimmy (as illustrated in FIGS. 5A-6D), and the content obscurer 134 and face identifier 144 have performed operations that use a puzzle to obscure the portion of Jimmy's profile picture that represents his face.

As discussed throughout this disclosure (e.g., with respect to FIG. 3), Jimmy and Jenny may be conversing through a text message session or a video chat session and the context of their conversation may satisfy conditions for removing a puzzle piece. The second image 410b illustrates Jimmy's profile picture after such conditions have been satisfied. This second image 410b shows the same image of Jimmy, but at a later point in time after six puzzle pieces have been removed from his profile picture. This second image 410b could represent a single content reveal in which six puzzle pieces are removed from the image, could represent six reveals that each removed a single puzzle piece from the image, or could represent an implementation between these two implementations, in which at least one of the reveals involves the reveal of multiple puzzle pieces.

This trend of puzzle pieces being removed from Jimmy's profile picture continues with the third image 410c (eight pieces removed, and therefore eight of the sixteen pieces left), the fourth image 410d (four pieces left), and the fifth image 410e (two pieces left). At this stage, the conversation between Jimmy and Jenny becomes inactive, for example, because Jenny steps away from her computer to talk to a roommate. Once this inactivity has continued for a certain length of time (e.g., 90 seconds), the system may perform operations to at least partially re-obscure Jimmy's face. This re-obscuring is illustrated with the sixth image 410f (four pieces remaining), which illustrates two puzzle pieces being added back onto Jimmy's face.

Jenny may return to her computer and, seeing Jimmy's face covered with more puzzle pieces than when she left her computer, re-start the conversation and apologize to Jimmy for stepping away from her computer. After criteria for removing a puzzle piece has again been satisfied (e.g., Jenny sending her message to Jimmy, or Jimmy responding to Jenny's message), the system may remove one or more puzzle pieces. The seventh image 410g (two pieces left) illustrates another depiction of Jimmy's profile picture being partially obscured, before the final puzzle pieces are removed and Jimmy's entire face is shown, as illustrated in the eighth image 410h. Once Jimmy's entire face has been revealed, Jimmy's profile may be "unlocked" to Jenny and his profile picture may remain unobscured even if Jenny again leaves the room.

In this illustration, Jimmy's sixth image 410f is the same as Jimmy's fourth image 410d, showing how the re-obscuring process may place puzzle pieces back on Jimmy's face in the same order that those puzzle pieces were removed. This need not be the case, as different puzzle pieces could be placed back on Jimmy's face in different locations. Furthermore, after determining that the conversation has gone inactive, the system could entirely re-obscure Jimmy's face rather than placing puzzle pieces back on Jimmy's face one at a time.

This sequence of images 410a-h show only Jimmy's face, but Jenny's face may be obscured and revealed in the same manner and at the same time. For example, when conversation between Jimmy and Jenny satisfies the relevant criteria for a puzzle piece to be removed, a puzzle piece may be removed at the same time from both the image of Jimmy that Jenny is viewing and the image of Jenny that Jimmy is viewing. In other words, the same set of puzzle pieces may obscure both user's faces, so that each user is exposed to the same portion of the other user's face. In some implementations, the users see the exact same orientation of puzzle pieces covering each other's faces, although in other implementations the users see the same number of puzzle pieces covering each other's faces, but the locations of those puzzle pieces may differ.

In some implementations, the process for revealing puzzle pieces is user specific, such that Jenny may see a puzzle piece disappear from Jimmy's face while Jimmy may see no such change to Jenny's picture. This one-at-a-time revealing process may occur in those implementations in which revealing criteria are person specific (e.g., Jenny sees a reveal when Jimmy responds one of her messages, and Jimmy sees a reveal when Jenny responds to one of his messages).

The revealing sequence that is illustrated in images 410a-h and the discussion thereof applies not only to puzzle pieces, but to other implementations in which multiple objects cover at least a portion of the image. For example, similar techniques could apply to an image that is entirely covered with puzzle pieces (see image 210, FIG. 2) or a face that is partially or entirely covered with objects from a filter (see image 240, FIG. 2).

A second sequence in which user profile content is revealed is illustrated by images 420a-h, in which an entire image of Jimmy is pixelated and the image is stepwise sharpened to reveal Jimmy's face. This process begins with image 410a, which shows Jimmy with his face completely distorted with pixilation. The second image 420b, the third image 420c, the fourth image 420d, and the fifth image 420e represent stepwise increases in resolution of Jimmy's picture. Although difficult to illustrate with a patent illustration, a process of "revealing" content that is pixelating can include the size of the pixels that together comprise the picture getting smaller and the number of pixels that together comprise the picture increasing. As such, each increase in pixels and reduction in pixel size would bring the image of Jimmy more into focus. The pixilation that is shown in images 420a-h does not explicitly illustrate this change in size of pixels, although the reduced number of pixels is intended to show how Jimmy's picture becomes more clear as the pixilation decreases.

This second sequence of images 420a-h illustrates, with the sixth FIG. 420f, another manner in which a user's image can become re-obscured due to inactivity. While FIG. 410f showed puzzle pieces being placed back on Jimmy's face, FIG. 420f shows the resolution of the Jimmy's profile picture decreasing. The decrease in resolution (reduction in number of pixels and increase in pixel size) is temporary, as illustrated by the seventh image 420g, which shows how Jimmy's profile picture comes back into focus. The final image 420h shows Jimmy's profile picture unobscured.

While the second sequence of images 420a-h shows an entire image that has been pixelated and how that image stepwise becomes more clear, similar revealing operations may occur with other obscuring mechanisms, such as pictures that are obscured by blurring, swirling, or darkening. These various different obscuring mechanisms may apply to the entire image, or may be limited to the portion of an image that represents a user's face.

A third sequence in which user profile content is revealed is illustrated by screens 430a-h, in which Jimmy's demographic profile content is stepwise revealed to Jenny. The sequence begins with a first user interface screen 430a, which shows user interface elements that respectively include the words "Name?", "Height?", "Religion?", "Education?", and "Drinks?". These user interface elements are placeholder elements that show the type of information that will be revealed if Jimmy and Jenny converse with each other.

After the conversation between Jimmy and Jenny has satisfied criteria for profile content to be revealed, one portion of Jimmy's demographic information is revealed to Jenny, as shown by the second screen 430b in which the interface element that had previously included the word "Name?" changes to list the word "Jimmy". That same interface element also changes in shade (e.g., to a lighter color) to indicate that the relevant content has been revealed.

This stepwise process for revealing demographic information continues with the third screen 430c (revealing that Jimmy's height is 5' 9"), the fourth screen 430d (revealing that Jimmy is Christian), and the fifth screen 430e (revealing that Jimmy is university educated). At this point, the conversation between Jimmy and Jenny goes inactive as previously described with respect to sequences 410a-h and 420a-h, and the system re-obscures some of Jimmy's profile information. In particular, the sixth screen 430f shows how the interface element that previously indicated that Jimmy has a "University" education has changed back to listing the word "Education?".

The conversation between Jenny and Jimmy eventually resumes, and the user interface element that includes the word "Education" once again changes back to indicate that Jimmy has a "University" education. The sixth screen 430h represents a presentation of Jimmy's demographic information after Jenny has unlocked his profile. This final screen shows that Jimmy listed that he drinks alcohol.

As described elsewhere in this disclosure, revealing text-based profile information (in contrast to photograph- or pictorial-based profile information) need not involve a placeholder user interface element that indicates the type of information that is hidden (e.g., a user interface element that includes the word "Height?"). Rather, Jimmy's profile may initially show a limited amount of demographic information (or none at all), and as he communicates with Jenny, additional demographic information may appear for display as part of his profile content. The newly-shown demographic information may appear where no information had been shown previously, or previously-shown information may be moved to a different location to make room for the newly-revealed information.

The newly-revealed information may be shown to Jenny in various different manners. For example, the information may appear as part of Jimmy's profile page, and Jenny may need to navigate away from the user interface that shows her text conversation or video chat to view the newly-revealed information. Alternatively or additionally, the profile content may appear within the text or video conversation user interface, either with a message in a text-based chat window or a pop-up element that temporarily overlays other content (e.g., a bubble that comes into focus and that states "His name is Jimmy!" before that bubble disappears).

FIGS. 5A-8D show four different sets of user interface screens that illustrate example conversations between users of the online community described throughout this disclosure. The user interfaces for these four different conversations are described in turn.

FIGS. 5A-D show user interface screens of an example text conversation between two users. The users in this conversation are Jimmy and Jenny, and the user interface is the interface that would be shown to Jenny from her computer, for example, the first computing device 110. Jimmy's image is initially obscured during the conversation.

Figure 5B:
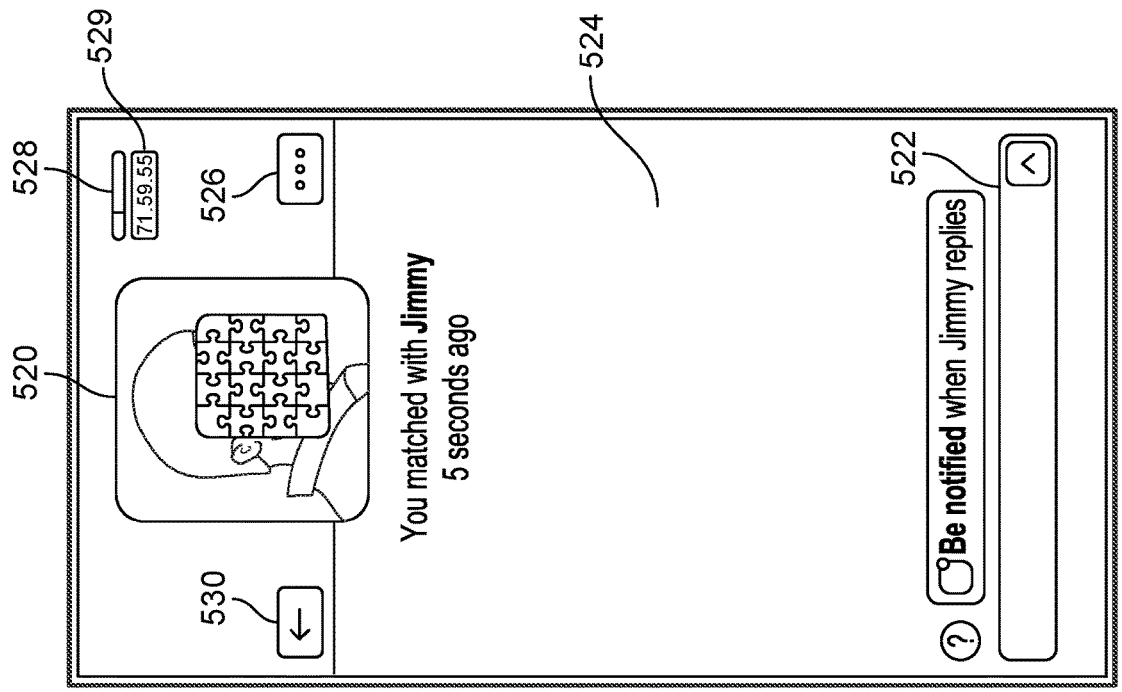
FIGS. 5A-D show a user interface during an example text conversation between two users.
Figure 5A:
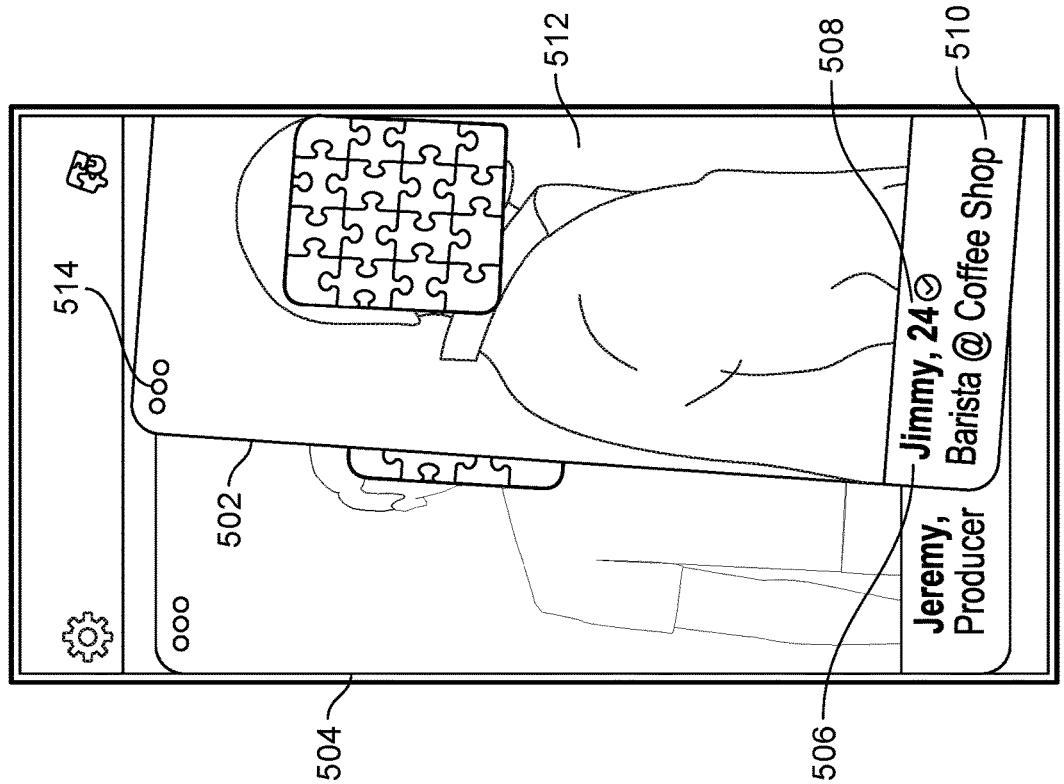

The FIG. 5A screen shows a user interface with which Jenny is able to view information of various different users, including Jimmy's profile card 502 and Jeremy's profile card 504. Both of these profiles cards 502 and 504 show the respective user's name 506, age 508, job 510, and profile picture 512. In this illustration, each profile card shows the respective profile picture partially obscured, with each user's face covered by a puzzle.

The information shown on each profile card may be enough for Jenny to determine whether she is interested in starting a conversation with the corresponding user. Still, Jenny may view additional profile information for a user by tapping or otherwise selecting the corresponding profile card (e.g., by selecting an option presented upon selection of the menu user interface element 514). Jenny's computer may show the additional profile information as part of a profile page. The additional profile information may include multiple additional pictures of the user and additional demographic information for the user (e.g., geographic location, favorite books, height). The additional pictures of the user may similarly show the user's face obscured with a puzzle. The additional demographic information may represent only a subset of the demographic information that the user specified, with a remainder of the demographic information to be revealed if Jenny engages in a conversation with the corresponding user.

Jenny may be able to select, for each profile card presented to her, whether she is interested in or otherwise has a positive impression of the corresponding user. For example, if Jenny is interested in participating in a conversation with Jimmy, she can indicate her interest by selecting an "interested" button (not shown) or by swiping Jimmy's profile card 502 to the right. If Jenny is not interested in participating in a conversation with Jimmy, she can indicate her disinterest by selecting a "not interested" button (not shown) or by swiping Jimmy's profile card 502 to the left. The FIG. 5A user interface shows Jimmy's profile card 502 in the process of being swiped to the right, indicating that Jenny is interested in starting a conversation with Jimmy.

FIG. 5B shows the user interface after Jenny has matched with Jimmy. Users may "match" in various manners described throughout this disclosure. For example, Jimmy's computer (e.g., the second computing device 120) may have previously presented a user interface similar to that of FIG. 5A, but including a profile card for Jenny. Jimmy may have indicated his interest in Jenny, for example, by swiping her profile card to the right. Jenny's subsequent "swipe right" on Jimmy's profile card indicates to the computing system 130 that the users are mutually interested in each other. As such, the computing system 130 (e.g., the match determiner 140 component thereof) determines that the two users have matched.

Responsive to the system determining that the users have matched, the interface of each user's device may change to present the text messaging interface that is illustrated in FIG. 5B (the view shown to Jimmy would be similar, but would show Jenny's picture instead of Jimmy's picture 520). The text messaging interface includes a partially-obscured picture 520 of Jimmy, a text entry box 522 into which Jenny is able to compose a message for delivery to Jimmy, a message display region 524 in which messages sent between Jenny and Jimmy are shown, and a menu user interface element 526 to access other features, such as viewing additional profile information for Jimmy and blocking Jimmy. The user interface of FIG. 5B also includes a timer element 528 that illustrates an amount of time remaining before the match expires (or until the image 520 is further obscured, if the image has been partially revealed), and also includes a back interface element 530 to allow Jenny to return to a previous user interface, for example, to browse other users' profiles.

Figure 5D:
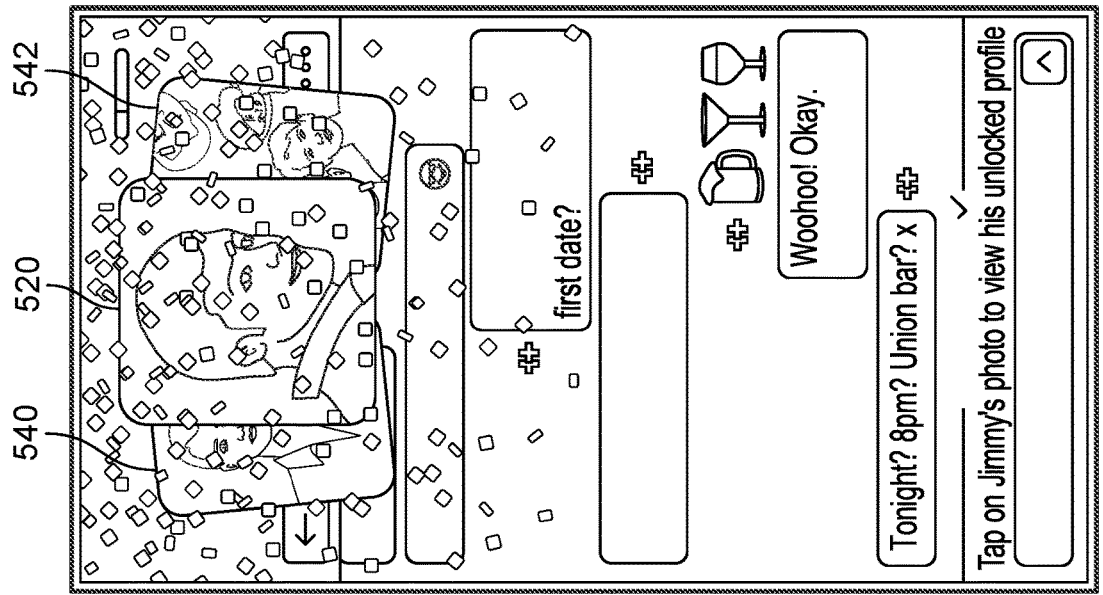
Figure 5C:
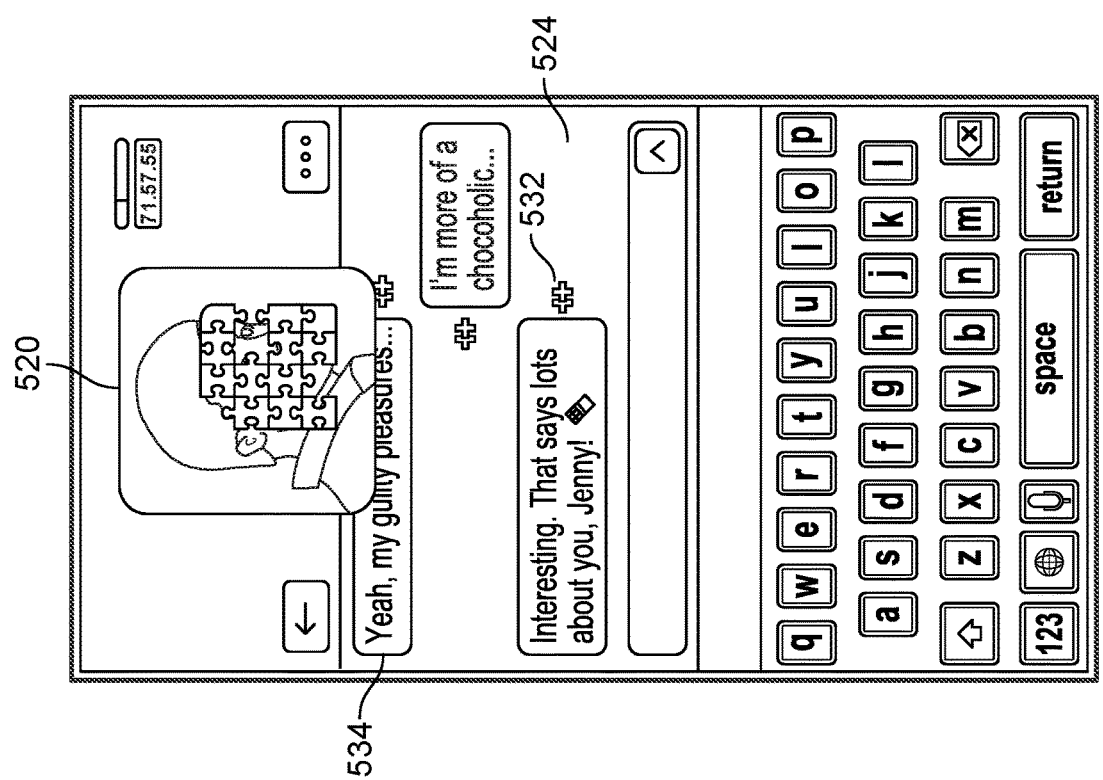

FIG. 5C shows the user interface after Jenny and Jimmy have sent several messages back and forth. The message display region 524 shows three messages sent between the users. Since each of these messages is directly responsive to a message sent by the other user, each message is accompanied by a puzzle piece element 532. This puzzle piece element 532 indicates that the message triggered removal of a puzzle piece from the user's picture 520. Accordingly, Jimmy's picture 520 is shown with at least three puzzle pieces removed.

FIG. 5D shows the user interface after Jenny has unlocked Jimmy's profile (Jimmy may obtain unlocked access to Jenny's profile at the same time). In this illustration, Jenny has unlocked Jimmy's profile because the users sent enough messages back and forth to reveal all puzzle pieces covering Jimmy's face in picture 520.

Aside from showing Jimmy's face without any puzzle pieces covering his face, unlocking Jimmy's profile can provide access to additional profile information. For example, Jenny's computing device 110 may display additional, unobscured images 540 and 542 of Jimmy. Further, Jenny may be able to select Jimmy's primary picture 520 to view his unlocked profile (e.g., by tapping on picture 520). In some examples, Jenny may not have been able to access Jimmy's profile before his profile was unlocked. In other examples, Jenny may have been able to access Jimmy's profile before his profile was unlocked, but Jenny may have been presented only a subset of profile content. In other words, some of the information on Jimmy's profile may not be available until Jenny obtains unlocked access to his profile.

FIGS. 6A-D show a user interface during another example conversation between two users. The users in this example conversation are also Jimmy and Jenny, but the user interface in this illustration is the interface that would be shown to Jimmy (in contrast to the user interface of FIGS. 5A-D, which is the interface shown to Jenny). Although the user interface of FIGS. 6A-D also represents a conversation between Jimmy and Jenny, various aspects of the conversation are different and the screens of FIGS. 6A-D are not a mirror image of the screens of FIGS. 5A-D (e.g., the messages are different, and user interface features differ).

The FIG. 6A user interface screen shows that Jimmy has matched with Jenny, and is similar to the user interface screen shown in FIG. 5B. The FIG. 6A user interface screen shows Jenny's profile picture 610, a message display region 618, and a text entry box 616. Two differences from the user interface screen of FIG. 5B include Jenny's face being obscured by pixelating rather than being obscured with a puzzle, and Jenny's profile picture 610 being accompanied by two additional images 612 and 614 of Jenny.

The presentation of three images 610, 612, and 614 in FIG. 6A illustrates how the system may obscure multiple images at the same time. Multiple simultaneously-obscured images may be concurrently presented, as shown in FIG. 6A, or the images may be shown by different screens. For example, the user interface may show only image 610, and Jimmy may have to swipe image 610 to a side to cause image 610 to be replaced with another image (e.g., image 614). In another example, Jimmy may select image 610 (e.g., by tapping on image 610) in order to view a profile page that shows the additional images 612 and 614, or via which Jimmy is able to navigate to screens that show images 612 and 614.

Another notable feature of the FIG. 6A user interface screen is that the image 614 of Jenny with her two friends only obscures Jenny's face and leaves the faces of her friends unobscured. This is because the face identifier 144 can distinguish which portion of an image to obscure. In some examples, Jenny may have uploaded multiple pictures of herself and the face identifier 144 may have performed image recognition processes to identify a face in the uploaded pictures and classified that face as representing Jenny.

Once the face identifier 144 has classified Jenny's face, the face identifier 144 may be able to analyze images subsequently uploaded by Jenny, identify her face in any of those images, and obscure only the portion of those images that represents her face. In some implementations, after Jenny has uploaded an image, the face identifier 144 asks Jenny to select a portion of the uploaded image that represents her face (e.g., by drawing a bounding box around the portion of the image that represents her face, or by selecting one of three computer-identified faces as representing her face as opposed to a face of one of her friends).

FIG. 6B shows the same user interface after Jimmy and Jenny have sent several messages back and forth. The puzzle pieces in the message display region 618 (e.g., puzzle piece 620) indicate that the corresponding messages triggered the reveal of profile content. In this illustration, the multiple puzzle pieces in the message display region 618 each caused Jenny's face in images 610, 612, and 614 to be presented with greater resolution (e.g., her face is becoming un-pixelated).

FIG. 6B also illustrates how content may only be revealed when a user sends a message that is directly responsive to a message sent by the other participant to the conversation. For example, Jenny's message 630 to Jimmy resulted in content being revealed (as illustrated by puzzle piece 620), because message 630 was directly responsive to a message 628 that Jimmy sent to Jenny. Jenny then sent multiple additional messages 632 and 634 that were not directly responsive to a message by Jimmy (e.g., because they followed a message by Jenny rather than a message by Jimmy). Because these additional messages 632 and 634 were not directly responsive to a message by Jimmy, Jenny's sending of these messages did not cause any content to be revealed (as illustrated by the lack of a puzzle piece accompanying messages 632 and 634).

Jimmy responded to Jenny with message 636, which was directly responsive to the message 634 that Jenny sent, and therefore message 636 caused profile content to be revealed and is accompanied by a puzzle piece. In such implementations, content may only be revealed when users interact with each other. A user may not be able to trigger content to be revealed by sending multiple messages to another user, without the other user reciprocating. Implementations that employ this mutual interaction requirement may incentivize users to communicate, both to learn more about each other through conversation but also to gain access to additional profile content.

Figure 6C:
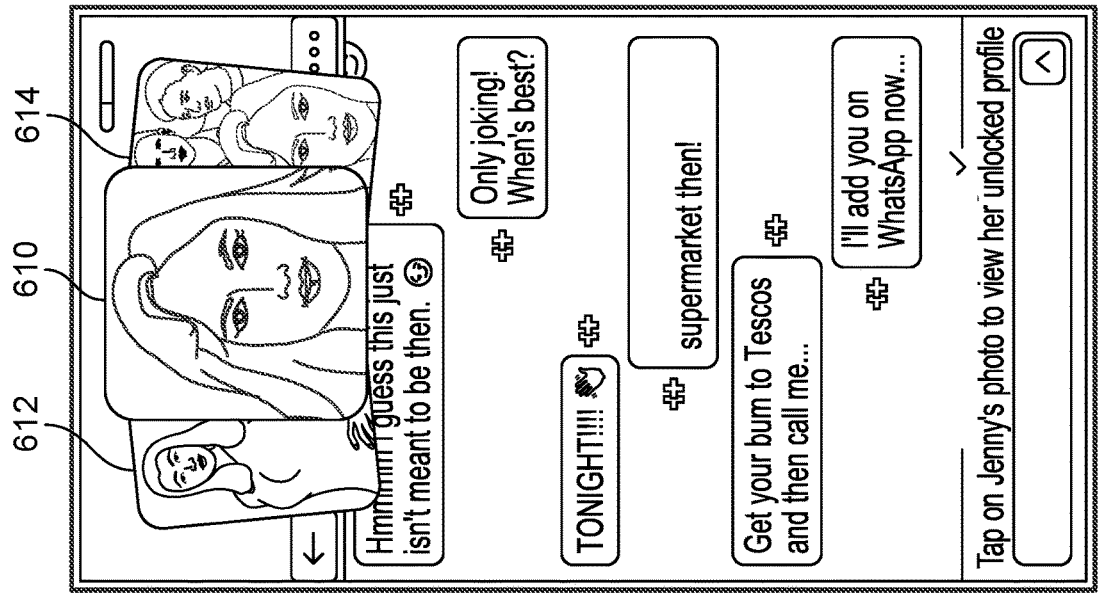

FIG. 6C shows the same conversation as that shown in FIG. 6B, but after several more messages, as illustrated by Jenny's face being shown in more detail in images 610, 612, and 614.

Figure 6D:
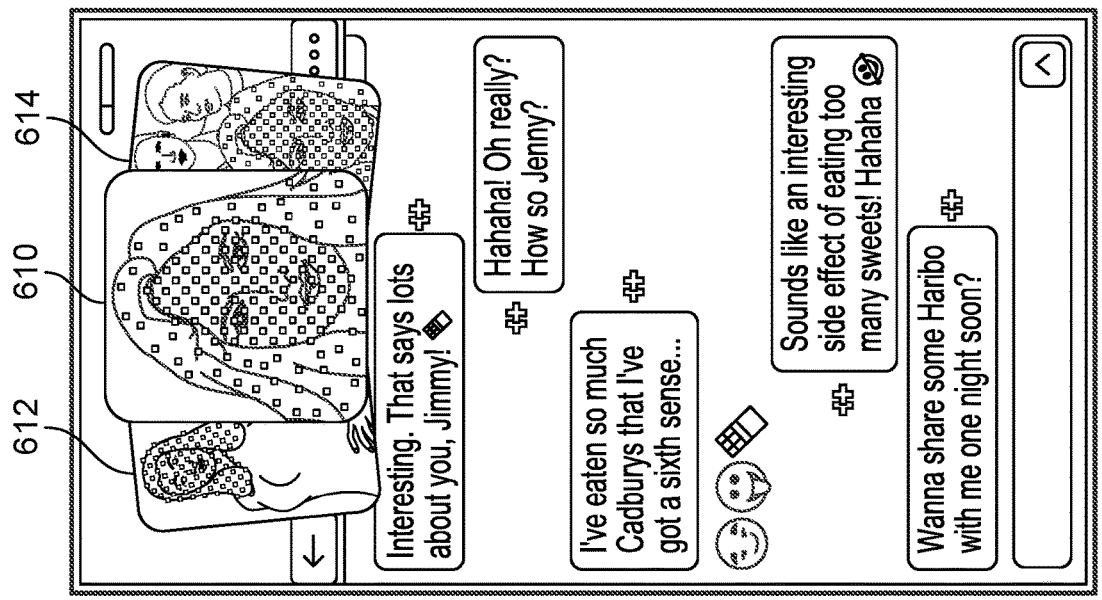

FIG. 6D shows the text messaging user interface after Jenny's face is fully revealed in images 610, 612, and 614. Jimmy may be able to select Jenny's image 610 to view Jenny's profile, including information that may not have been available before Jimmy unlocked her profile. Jenny's user profile may now be "unlocked" to Jimmy (e.g., all of her profile content may accessible to Jimmy).

FIGS. 7A-D show a user interface of an example conversation between two users that was initiated by an auto-matching process. These user interface screens show how a user may request the computing system 130 to auto-match that user with another user, and how the two users may then participate in a conversation in which their faces are initially obscured in images.

Figure 7B:
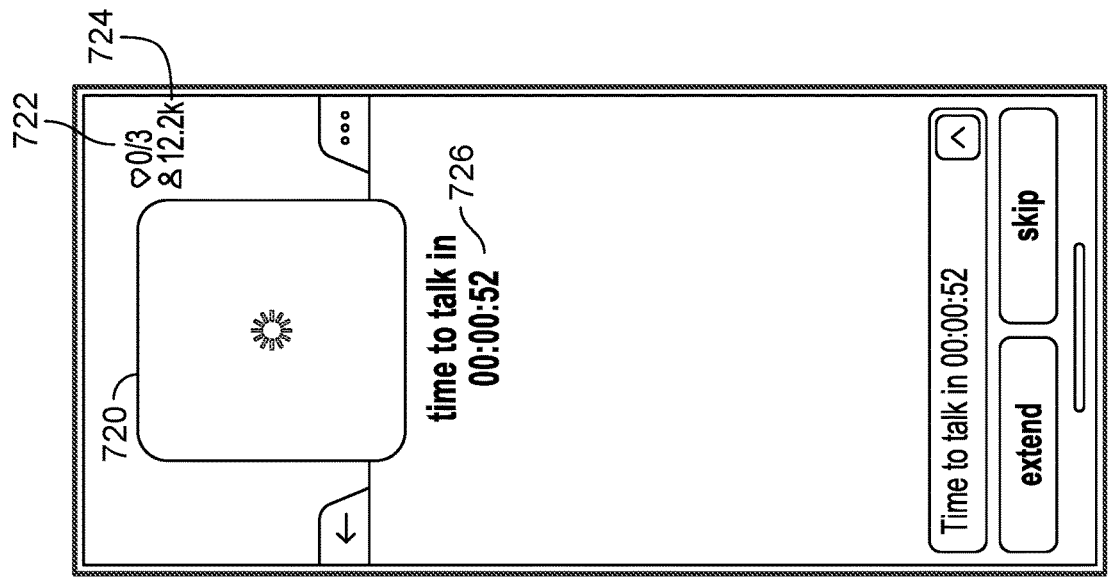
FIGS. 7A-D show a user interface during an example conversation between two users that was initiated by an auto-matching process.
Figure 7A:
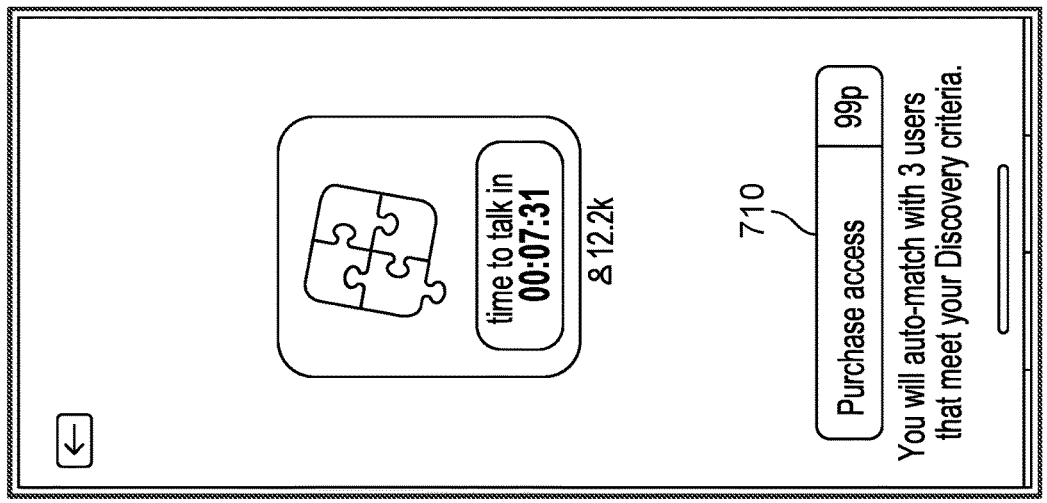

FIG. 7A shows a screen in which a first user (again Jimmy, for convenience) may select a user interface element 710 to initiate three matches automatically determined by the computing system 130. In response to user selection of element 710, the computing system 130 (e.g., the match determiner 140) may identify one or more other users with similar interests. In this illustration, Jimmy had previously specified his interests when he created his account (or thereafter by answering questions). These interests may include Jimmy's favorite adventure activities (e.g., running and rock climbing), Jimmy's favorite dates (e.g., coffee and going to the movies), and Jimmy's favorite leisure activities (e.g., reading).

The match determiner 140 may compare Jimmy's favorite activities and his demographics (e.g., age, geographic location) to similar information specified by other users, and the match determiner 140 may identify one or more other users to whom Jimmy will "auto-match." In this example, the other users may be users that have also selected the interface element 710 to engage in the auto-match process, although the system could involve other users in the process. For example, the computing system 130 could send a message to a user that is currently online but that has not selected any such element 710, and could inform that user that she has auto-matched with Jimmy. The computing system 130 would prompt that user to indicate whether she would like to chat with Jimmy. While the FIG. 7A user interface shows that auto-matching costs 99 pence, the system may implement auto-matching without requiring payment.

FIG. 7B shows a screen that is loading Jimmy's first match. As illustrated by the countdown timer 726, Jimmy is fifty-two seconds away from entering conversation with his first match. Accordingly, the image region 720 is empty and has yet to load an image of his first match. The match counter 722 shows that Jimmy is currently engaged in none of the three matches that Jimmy will obtain for his 99 pence payment. The online user counter 724 shows that twelve thousand and two hundred users are currently online.

Figure 7D:
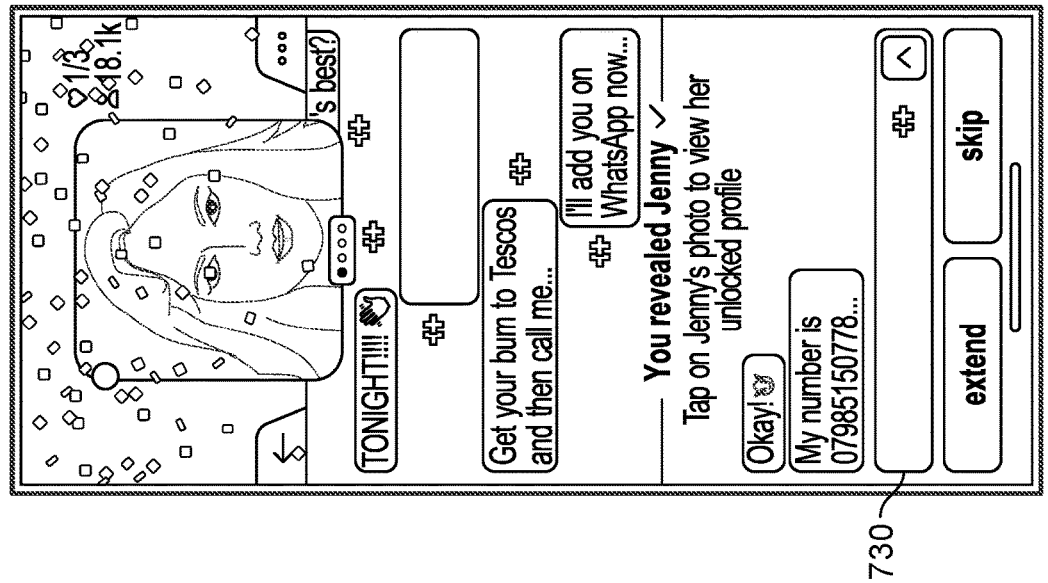
Figure 7C:
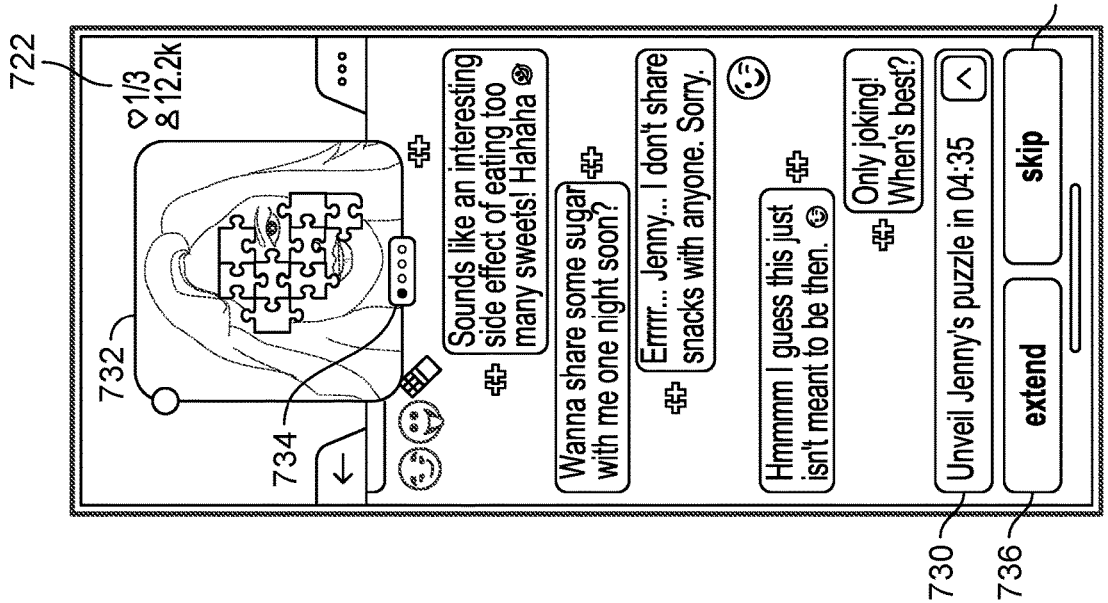

FIG. 7C shows the user interface after Jimmy and Jenny have exchanged several messages. This user interface is similar to that of FIGS. 5A-6D in many respects. Differences include text box 730 indicating a time in which Jimmy must entirely reveal Jenny's face (i.e., four minutes and thirty-five seconds). Should Jimmy not reveal Jenny's face before time has expired, the conversation may end (e.g., the text messaging session user interface may disappear from display) and the user interface may transition to Jimmy's second of three auto-matches.

Another difference from the user interfaces of FIGS. 5A-6D is that Jenny's picture 732 is atop an element 734, which indicates that Jimmy is currently viewing the first of four images that Jenny has uploaded. Jimmy may be able to swipe Jenny's picture 732 to the side to view other of her four images. All four images may show the same level of obscurity (e.g., the same puzzle pieces), although the images may be obscured in different manners in some implementations. For example, the orientation and/or number of puzzle pieces may differ in each image, or one image may be obscured by pixelating while another may be obscured by a filter that overlay's Jenny's face with cat features.

Another difference from the user interfaces of FIGS. 5A-6D is that the FIG. 7C user interface includes an extend element 736 and a skip element 738. Should the timer in text box 730 be near zero seconds but Jimmy wants more time to chat with Jenny, Jimmy may select the extend element 736 to gain more time (e.g., to add three minutes to the timer). In some examples, doing so may cost Jimmy one of his auto-matches (e.g., the match counter 722 may increase from "⅓" to "⅔"). Jimmy may alternatively select the skip element 738, which may cause the system to end the conversation with Jenny (presumably because Jimmy is no longer interested in conversation with Jenny) and start a conversation with another user.

FIG. 7D shows the user interface after Jimmy has unlocked Jenny's profile. As illustrated by the text box 730, there is no longer a time requirement in which Jimmy must match with Jenny. As such, Jenny's profile may not disappear from his list of chat sessions should he exit the messaging interface, and Jenny's profile may be added to a list of profiles that Jimmy has unlocked. As such, Jimmy is able to later find Jenny's information and resume communications with her.

Had Jimmy decided to select the skip element 738, or had the timer expired before Jimmy unlocked Jenny's profile, then the messaging interface may have disappeared and Jimmy may not have been able to re-start the conversation with Jenny. In some implementations, users may remain inaccessible and there may be no link saved or other mechanism available to message a user from a previous conversation or visit a profile page of a user from a previous conversation. In some implementations, users that have ended a conversation without unlocking each other's profiles may not be visible or otherwise surface to each other during subsequent browsing of the online community. As such, a conversation between two users may be a "now or never" opportunity to unlock each other's profile and retain the ability to communicate with each other in the future.

FIGS. 8A-D show a user interface for an example conversation between two users that are participating in a video chat. The user's faces are initially obscured in the FIG. 8*a* screen and then transition to being fully revealed as the two users verbally talk with each other.

Figure 8B:
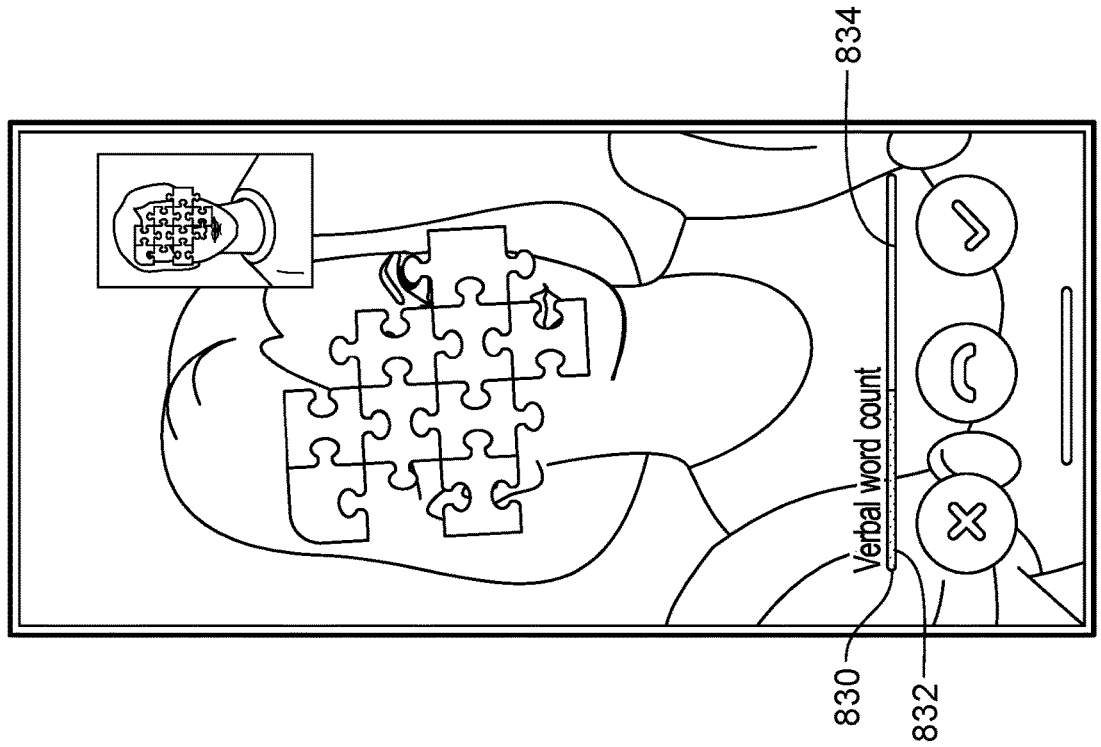
FIGS. 8A-D show a user interface during an example conversation between two users participating in a video chat.
Figure 8A:
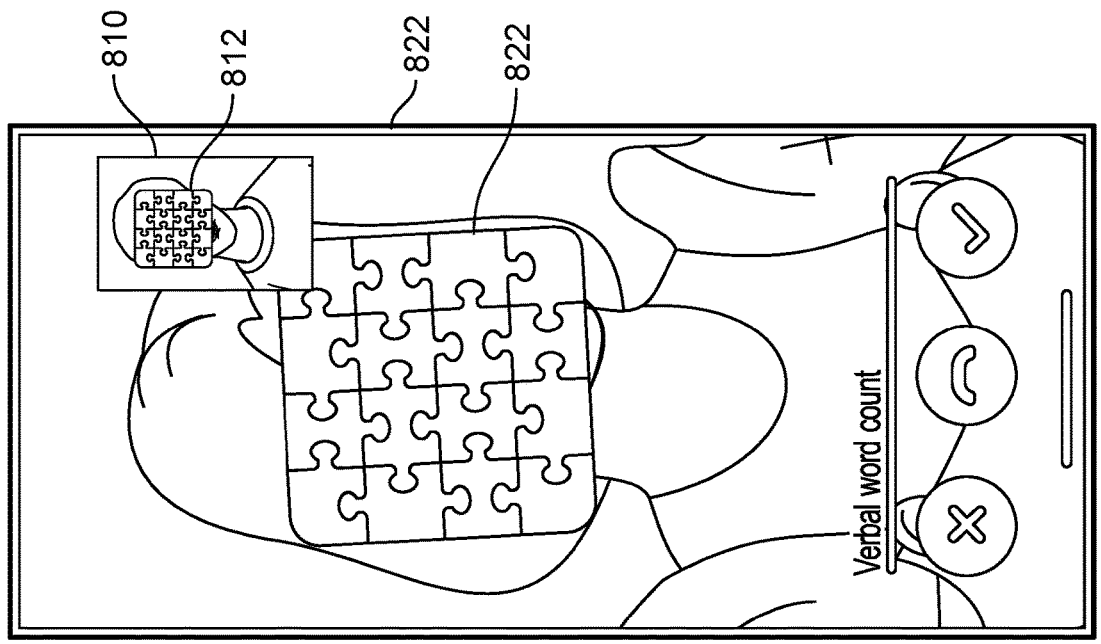

FIG. 8A shows a user interface presented to a user named Mark that is video chatting with another user named Mary. The user interface includes a first region 810 that shows a first video feed captured by a camera of Mark's computer, and a second region 820 that shows a second video feed captured by a camera of Mary's computer. Mark's face is obscured by a puzzle 812 and Mary's face is obscured by a puzzle 822.

The two users may have entered this video chat due to one of the manual or auto-matching mechanisms described throughout this disclosure. Or, one Mark may have browsed profiles, found Mary's profile, and been intrigued enough to send her a request to participate in the video chat. Mark may send the request before the two users have exchanged text messages, or the two users may transition from a text message conversation to a video-chat conversation after sending few text messages (in which case, the video chat may begin with each user's image obscured in the same manner as during the text message conversation, for example, with their faces partially but not fully revealed). Mary may have provided input acknowledging Mark's video-chat request, and in response the system may have started the duplex video and audio feed that is illustrated in FIG. 8A.

FIG. 8B shows the video chat user interface after the system has removed multiple puzzle pieces from each of Mark and Mary's faces.

Figure 8D:
Figure 8C:
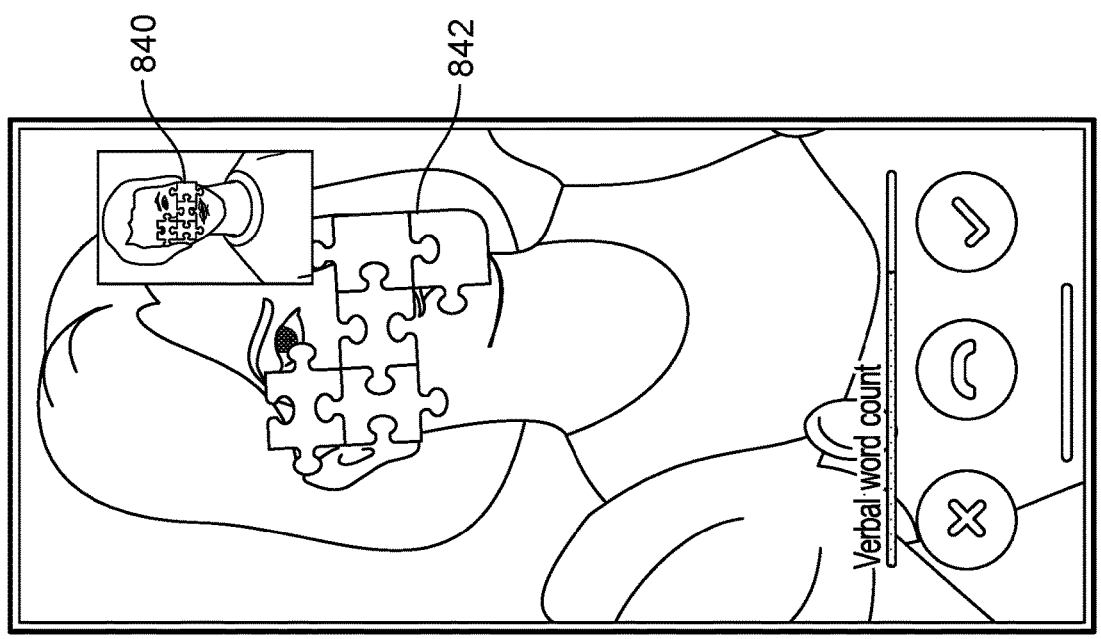
Figure 9A:
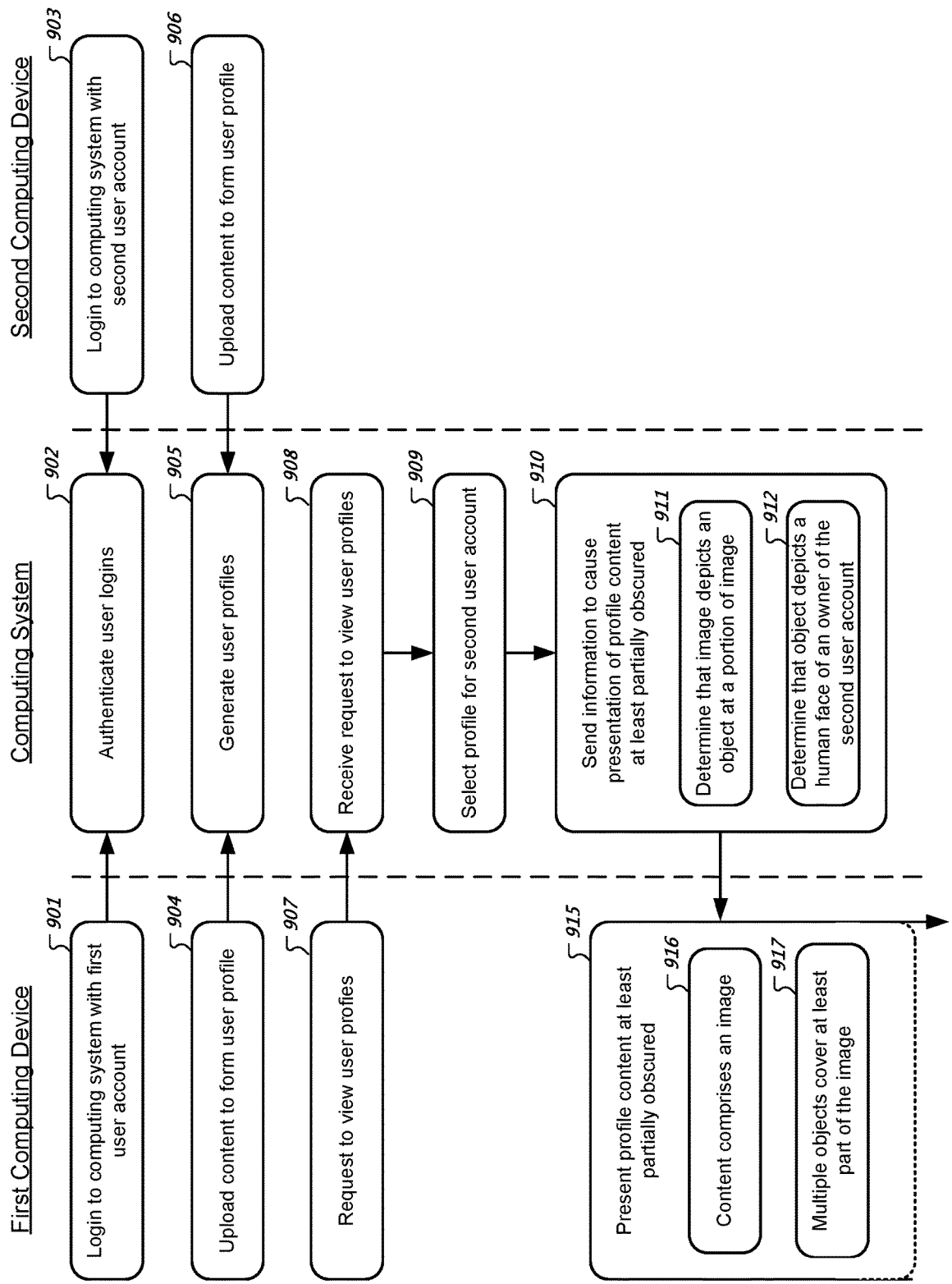
Figure 9B:
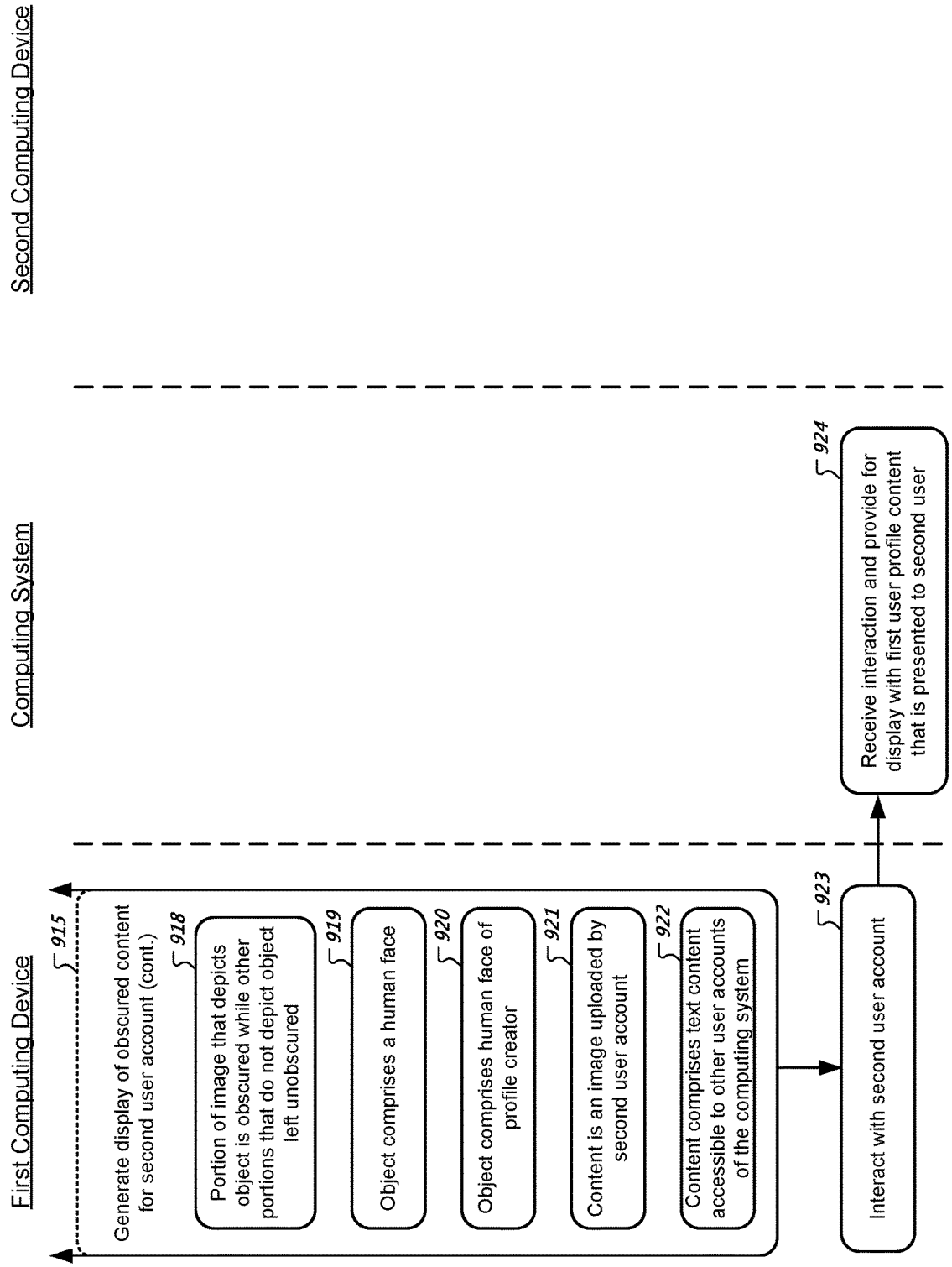
Figure 9C:
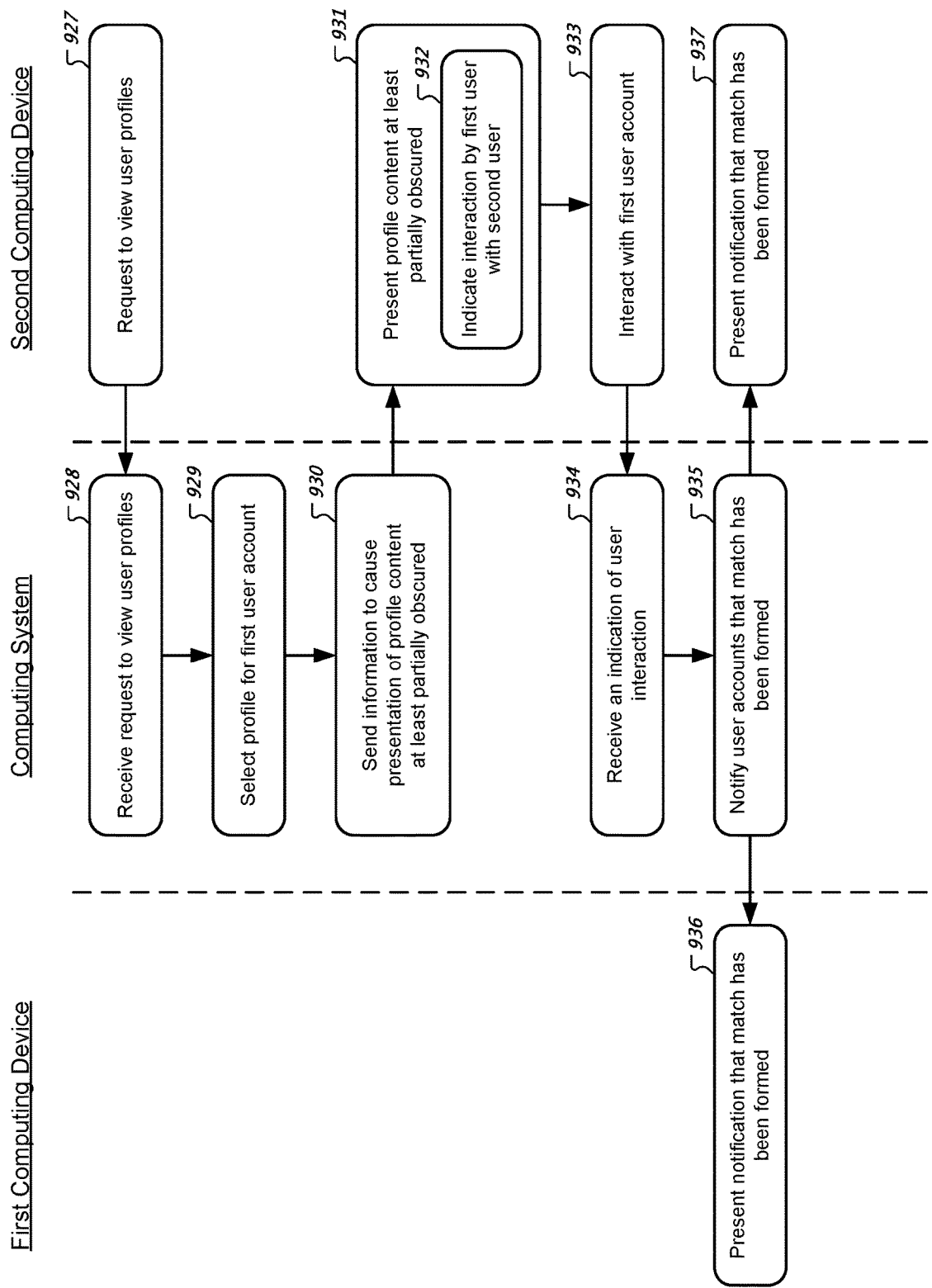
Figure 9D:
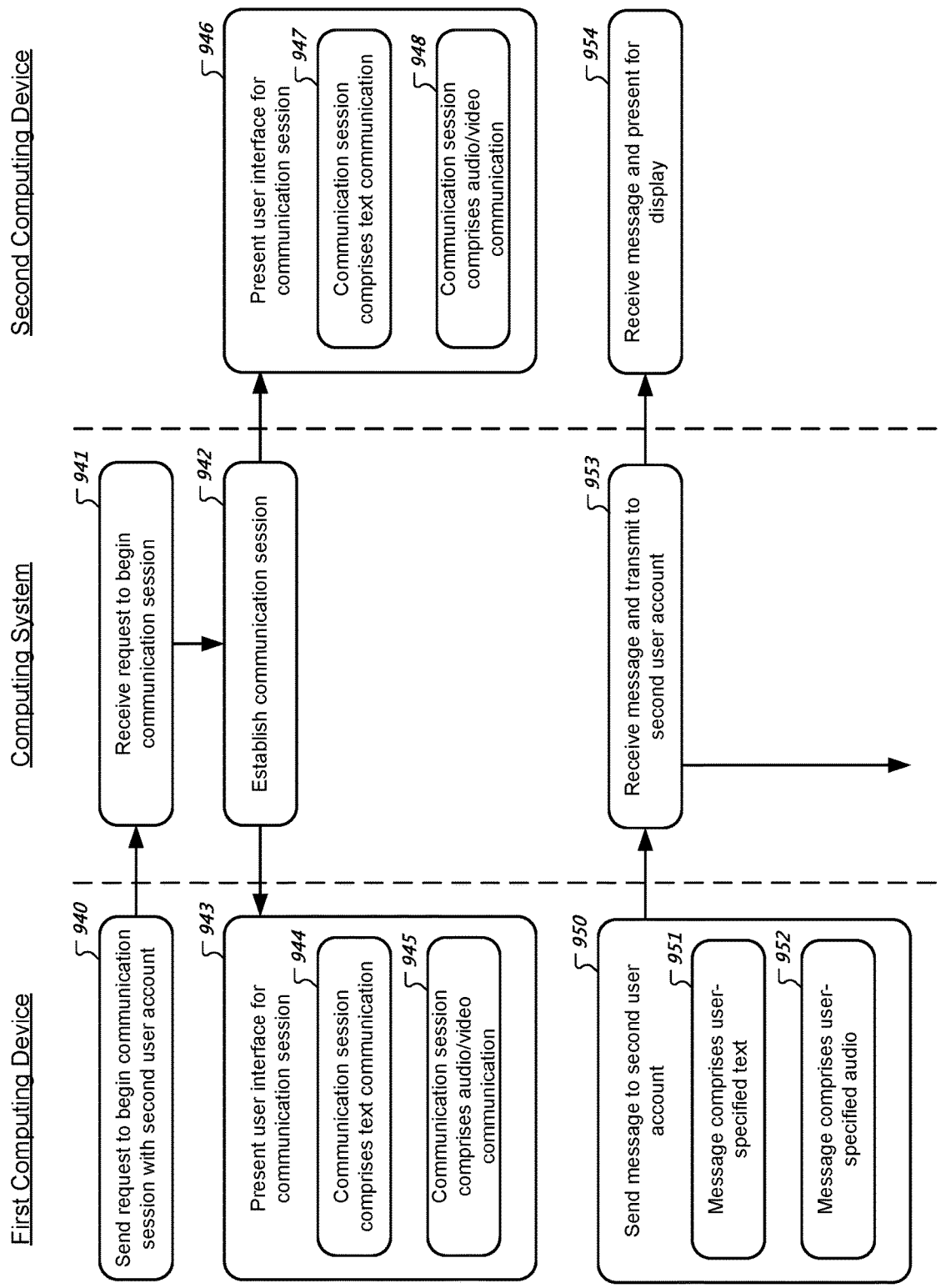
Figure 9E:
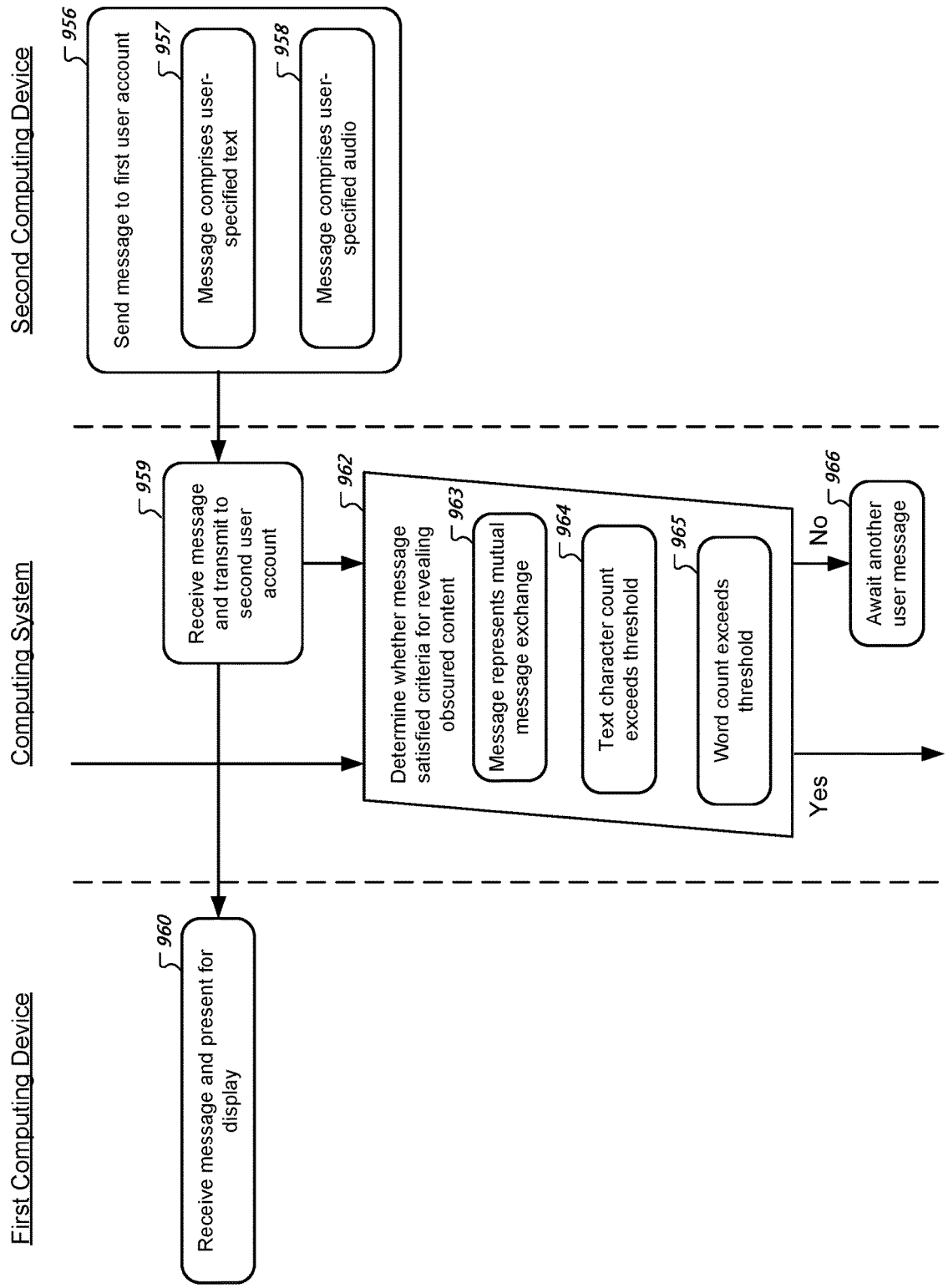
Figure 9G:
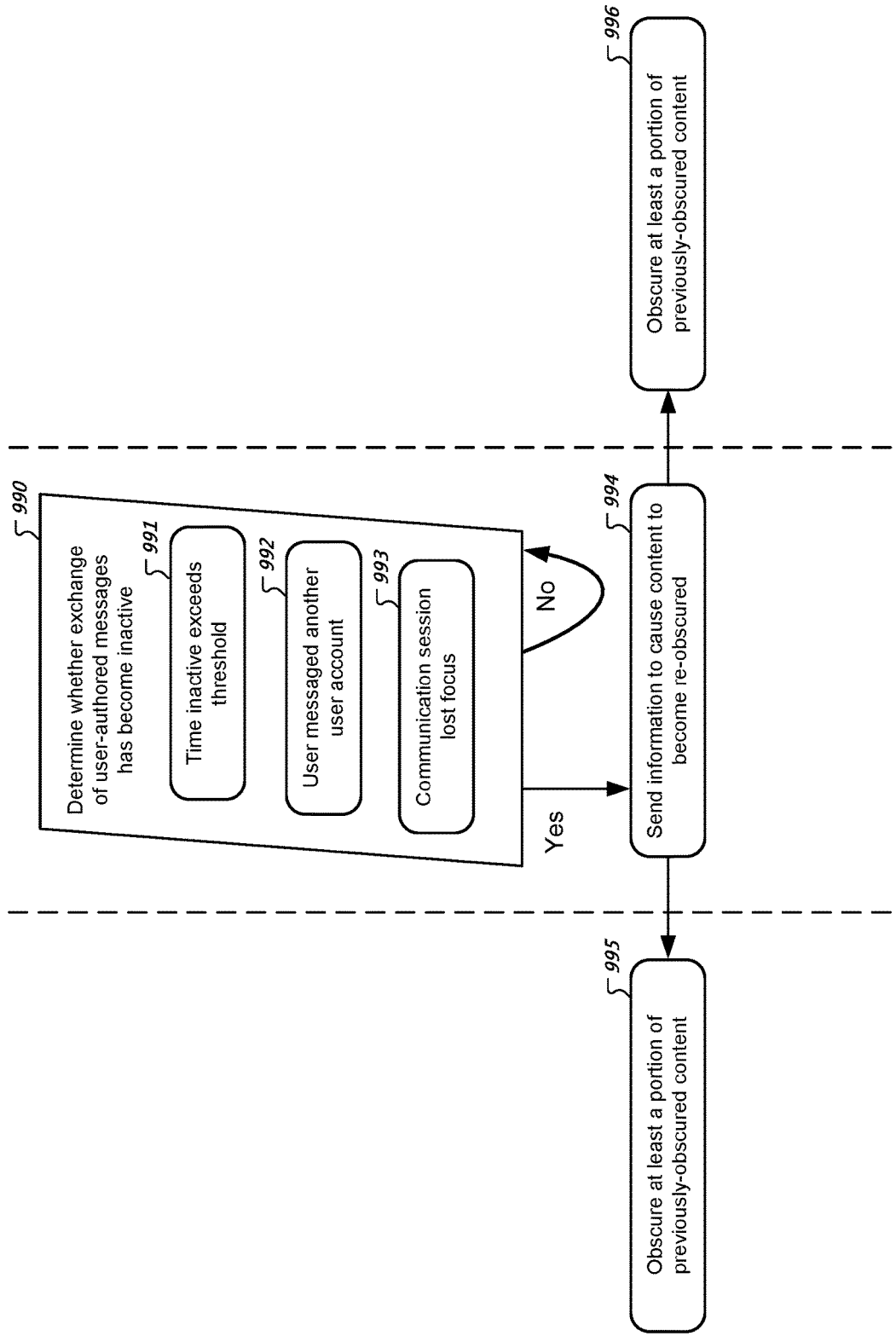

FIG. 8C shows the same video chat user interface after even more puzzle pieces have been removed. In this implementation, the system removes a puzzle piece when the verbal word count from the conversation meets a threshold number of words. For example, the system may monitor and count the number of words collectively spoken by Mark and Mary, and once this number of words satisfies a certain threshold (e.g., fifty words), the system may remove a puzzle piece from each of Mark and Mary's faces. The user interface includes a verbal word count element 830 that visually indicates how close Mark and Mary are to the next reveal of a puzzle piece. In this illustration, the verbal word count element 830 comprises a first bar portion 832 that indicates how many words have been spoken, and a second bar portion 834 that indicates how many words remain to be spoken until another puzzle piece is revealed.

In this illustration, the number and arrangement of puzzle pieces 840 that cover Mark's face are the same as the number and arrangement of puzzle pieces 842 that cover Mary's face. In other implementations, however, the number and arrangement of puzzle pieces may differ. For example, the verbal word count may be independently tallied for Mary and Mark rather than being collective tallied. As such, should Mark speak at length while Mary remains silent, either Mark may see multiple pieces revealed from Mary's face without Mary seeing any pieces revealed from Mark's face, or vice versa depending on the implementation (i.e., whether Mark's extended communications causes Mark to see more of Mary's profile content, or whether Mark's extended communications cause Mary to see more of Mark's profile content). In some implementations, the content reveals must alternate from one user to the other, for example, Mary may need to speak a certain number of words to trigger content reveal (of either her picture, of Mark's, or both), and then Mark must need to speak a certain number of words to trigger content reveal (of either his picture, of Mary's, or both).

FIG. 8D shows the video chat user interface after all puzzle pieces have been removed. Mark and Mary's user profiles may "unlock" after revealing all puzzle pieces, as described previously in this disclosure. As such, the users may now be able to view other previously inaccessible user profile information (e.g., pictures and/or non-photographical profile content on a profile page of each user).

Mark and Mary's images may be revealed based on any of the triggers discussed throughout this disclosure, for example, any of the triggers discussed with respect to FIG. 3. Moreover, the video content shown in the user interface of FIGS. 8A-D may be obscured using any of the obscuring techniques discussed throughout this disclosure, for example, those discussed with respect to FIG. 2. Indeed, in addition to or as an alternative to visual obscuring techniques, profile information such as that illustrated in user interface 250 (FIG. 2) may be obscured and piecewise revealed while users participate in a video chat.

FIGS. 9A-G show a flow chart of various processes used to implement the technologies described in this disclosure. The left column of this swim-lane flowchart represents operations performed by a first computing device 110 (FIG. 1), and the right column represents operations performed by a second computing device 120 (FIG. 1). The center column represents operations performed by a computing system 130 (FIG. 1) that interacts with each of the first and second computing devices 110 and 120 over a network, and which facilitates communications between the computing devices 110 and 120. In this illustration, a user Jenny operates the first computing device 110 (referred to herein as "Jenny's computing device") and a user Jimmy operates the second computing device 120 (referred to herein as "Jimmy's computing device").

At box 901, Jenny's computing device 110 logs into the computing system 130, and at box 902, the computing system 130 authenticates the user login. For example, Jenny may use her computing device 110 to visit a webpage for a dating system or may open an application for the dating system with her computing device 110. Jenny may then enter a username and password that she had previously established with the dating system. Her computing device 110 may send this information to the computing system 130, which may authenticate her credentials. Responsive to the computing system 130 determining that Jenny's computing device 110 has supplied valid credentials, the computing system 130 may send Jenny's computing device 110 information to cause her computing device 110 to present content in various user interfaces of the dating application or dating website.

At box 904, Jenny may interact with a user interface provided by the dating system to specify content that will form her user profile. For example, Jenny may upload one or more images of herself, and she may specify various types of non-photographical, text-entered content that describes herself (e.g., age, profession, geographical location, etc.).

At box 905, the computing system 130 receives this information from Jenny's computing device 110, and uses the information to generate (or update) her user profile.

At box 903, Jimmy's computing device 120 logs into the computing system 130 in a manner that is similar to how Jenny logged into the computing system 130. At box 906, Jimmy interacts with his computing device 120 to specify and upload content for his user profile, similar to how Jenny uploaded user profile content.

At box 907, Jenny's computing device 120 sends to the computing system 130 a request to view user profiles of other users of the dating system. For example, Jenny may have launched the application for the dating system and specified search criteria to view a ranked listing of user profiles that match certain criteria (e.g., males aged 22-30 in New York, N.Y.). In response, Jenny's computing device 110 sends those search criteria to the computing system 130. As another example, Jenny may have used a web browser installed on her computing device 110 to navigate to a website for the dating system, and the first page shown to Jenny after she has logged in may present user profiles that the system has identified as potentially of interest to Jenny. In this example, the request to view the website forms the request to view profiles of other users of the dating system (and therefore a request to view certain profile content, such as a profile picture).

At box 908, the computing system 130 receives, from Jenny's computing device 110 while that computing device 100 is logged into Jenny's user account, the above-described request to view other users' profiles. This request may be considered a request for profile content (e.g., a profile image and/or demographic information).

At box 909, the computing system 130 selects Jimmy's user profile as user profile content to present for presentation to Jenny. In those circumstances in which Jenny specified search criteria, the selection of Jimmy's user profile content from among multiple user profiles 132 is based at least in part on the search criteria specified by Jenny. In those circumstances in which Jenny did not specify search criteria, the selection of Jimmy's user profile content from among the multiple user profiles 132 may be based at least in part on the computing system 130 determining that Jenny is likely to be interested in Jimmy based on content of his user profile.

The determination by the computing system 130 that Jenny is likely to be interested in Jimmy user profile content may be based on one or more of the following criteria: Jenny and Jimmy being geographically located near each other, Jimmy being a gender that Jenny has identified as her preferred gender, Jenny being a gender that Jimmy identified as his preferred gender, Jimmy having an age within an age range that Jenny has specified, Jenny having an age within an age range that Jimmy has specified, Jenny and Jimmy identifying similar interests or activities, and other relevant criteria.

At box 910, the computing system 130 sends information, for receipt by Jenny's computing device 110, to cause her computing device 110 to present Jimmy's profile content with at least part of the content obscured. For example, the computing system 130 may send data files to Jenny's computing device 110 to cause Jenny's computing device 110 to render a webpage that shows content from at least part of Jimmy's user profile (and potentially content from multiple other users' profiles). As another example, the computing system 130 may send data that causes a dating application program on Jenny's computing device 110 to fill a template user profile card with information from Jimmy's user profile (e.g., as illustrated in FIG. 5A).

At box 911, the computing system 130 determines that an image from Jimmy's user profile that is to be displayed to Jenny depicts a particular object at a portion of the image. For example, the computing system 130 may analyze the image to identify whether any portion of the image shows a human face. Responsive to the computing system 130 identifying that the image shows a human face and the region of the image that shows that human face, the computing system 130 may modify the image so that the human face is obscured, or may send information to Jenny's computing device 110 (e.g., image vector information or coordinates) so that her computing device may perform operations to obscure the human face. The analysis by the computing system 130 of Jimmy's image (and potentially other images in Jimmy's profile) need not be performed after Jenny has requested to view user profile content. For example, the analysis may be performed at the time that Jimmy uploads the image to his user profile.

At box 912, the computing system 130 determines that a first human face in a picture depicts a face of an owner of Jimmy's user account (i.e., Jimmy) and that a second human face in the picture does not depict the face of the owner of Jimmy's user account. In other words, Jimmy may have uploaded an image that depicted multiple faces, and the computing system 130 may identify which of the multiple faces is Jimmy's face and perform operations to obscure only Jimmy's face in the image.

A first mechanism for identifying Jimmy's face in the image is for the system to request that specify his face in the image, either by drawing a bounding box or other shape around his face, or by selecting which of multiple faces identified by the system as human faces represents his face. A second mechanism for identifying Jimmy's face is for the computing system to analyze images that Jimmy has uploaded that include only one face (presumed to be Jimmy), and then perform a classification processes to identify which of the faces in the image with multiple faces is Jimmy's face. As with the operations of box 911, these operations need not be performed responsive to Jenny's computing device 110 sending a request to view user profiles.

At box 915, Jenny's computing device 110 presents Jimmy's profile content at least partially obscured. There are various different ways to present profile content at least partially obscured, as described throughout this disclosure and with reference to boxes 916-922, which are described in turn.

At box 916, the presentation of the profile content at least partially obscured comprises presenting an image at least partially obscured. For example, the image 520 in FIG. 5B shows at least part of the image 520 obscured by puzzle pieces. The image may also be fully obscured, for example, by pixilation or by puzzle pieces that cover the entire image.

At box 917, the presentation of the profile content at least partially obscured includes presenting multiple objects covering at least part of an image. For example, images 210, 230, and 240 in FIG. 2 each show multiple objects that cover at least part of an image. Image 210 shows multiple puzzle pieces covering the entire image. Image 230 shows multiple puzzle pieces covering part of the image. Image 240 shows multiple components of a face filter "warping" effect covering part of the image.

At box 918, the presentation of the profile content at least partially obscured includes a portion of an object in an image being obscured while other portions of the image that do not depict the object are left unobscured. For example, in image 230 (FIG. 2) only the portion of the image 230 that represents the person's face is obscured, while portions of the image 230 that do not represent the person's face are left unobscured. In image 240 (FIG. 2), only the portions of the image 240 that represent the person's mouth, nose, and the top of the head are obscured, while other portions of the image 240 that do not represent these features are left unobscured.

At box 919, the presentation of the user content at least partially obscured includes obscuring a human face in an image. In some examples, the content that is obscured represents more than just a person's face and also includes other human features, for example, various combinations of the person's torso, arms, hands, legs, and feet. In some examples, the content that is obscured is background content that excludes a person or a person's face (such that the person is initially viewable, but the context of the image is obscured).

At box 920, the presentation of the user content at least partially obscured includes obscuring a face of an owner of the corresponding user profile in an image while not obscuring other faces in the image. For example, Jenny's computing device 110 may receive information from computing system 130 indicating which face to obscure, responsive to the computing system 130 determining at box 912 which face is Jimmy's.

At box 921, the presentation of the user content at least partially obscured comprises obscuring an image that was uploaded through use of a second user account. For example, Jenny's computer may present an image of Jimmy with his face covered in puzzle pieces, and the computing system 130 may select Jimmy's image for presentation to Jenny because Jimmy uploaded the image to his user profile, per the operations of box 906.

At box 922, the presentation of the profile content at least partially obscured comprises obscuring text content that forms part of Jimmy's user profile, where this text content is accessible to other user accounts of the computing system. For example, the obscured content may include non-photographical profile information, such as the demographic content illustrated in screen 250 (FIG. 2). This demographic information may be available to any user that Jimmy communicates with at length (these communications causing the information to be revealed), in distinction to text that is not part of Jimmy's user profile and that Jimmy sends to users in messages within chat sessions.

At box 923, Jenny may interact with Jimmy's user account. For example, Jenny may swipe Jimmy's profile card 502 (FIG. 5) to the right to indicate that she is interested in Jimmy. In other examples, Jenny may send a message to Jimmy, or may "like" Jimmy's user profile or certain items on Jimmy's user profile (e.g., items of demographic information or pictures).

At box 924, the computing system 130 receives an indication that Jenny interacted with Jimmy's user account. In response, the computing system 130 is configured to provide an indication of that interaction for display to Jimmy when Jimmy views Jenny's profile content. In other words, in some implementations, initial user interactions such as initial messages and initial likes may not be immediately presented to the messaged or liked user as a notification. Rather, as discussed in the following paragraphs, this initial interaction may be displayed to Jimmy when he views Jenny's profile content. Still, some implementations, Jimmy may immediately receive a notification of an initial message or "like" sent by Jenny.

Boxes 927-932 represent operations in which Jimmy views user profile content for multiple users that include Jenny.

At box 927, Jimmy's computing device 120 sends a request to the computing system 130 to view user profile content for multiple users. As discussed with respect to box 907, this request may involve Jimmy specifying search criteria (e.g., an age range and a geographic region), or this request may involve Jimmy's computing device 120 sending a request for a webpage that will include user profile content for one or more users as part of the webpage.

At box 928, the computing system 130 receives the request that was sent by Jimmy's computing device 120.

At box 929, the computing system 130 selects Jenny's user profile content as one of users for which user profile content will be presented to Jimmy. The computing system 130 may select Jenny's user profile content based on the various different types of criteria discussed with respect to box 909 (e.g., user search criteria, geographic location, age, or similar interests and activities). Jenny's interaction with Jimmy's user account is another factor that increases the likelihood (or guarantees) that Jenny's user profile content will be shown to Jimmy.

At box 930, the computing system 130 sends information to Jimmy's computing device 120 to cause his computing device to present Jenny's profile content in an at least partially obscured manner. The sent information includes, as an example, a picture of Jenny and Jenny's demographic information. In some implementations, the information that is sent to Jimmy's computing device 120 may be obscured by the computing system 130 before that information is sent (e.g., Jenny's picture may be modified to include puzzle pieces over Jenny's face, and/or some of Jenny's demographic information may be omitted from the information sent to Jimmy's computing device). In other implementations, the computing system 130 may send the obscured content along with instructions for Jimmy's computing device 120 to obscure the information that was sent (e.g., the computing system 130 may send Jenny's original picture and all of her demographic information, along with instructions for Jimmy's computing device 120 to obscure Jenny's face in her picture and/or portions of demographic information to hide from view to Jimmy).

At box 931, Jimmy's computing device 120 receives the information that was sent by the computing system 130 and, based on receipt of that information, presents Jenny's profile content in an at least partially obscured manner. For example, Jimmy's computing device 120 may present a profile card for Jenny, where the profile card obscures her face and/or obscures some of her non-photographical profile content (e.g., her age and location).

At box 932, Jimmy's computing device 120 may visually indicate, concurrent with the display of Jenny's at least partially-obscured profile content, that Jenny interacted with Jimmy in some manner. For example, Jimmy's computing device 120 may show Jenny's profile card, overlaid with a statement that Jenny "liked" Jimmy or overlaid with text from a message that Jenny sent (at box 923) to Jimmy.

Boxes 933-948 represent Jimmy and Jenny "matching" and then entering a communication session to communicate with each other.

At box 933, Jimmy interacts with Jenny's user account and reciprocates her interaction with him. For example, Jimmy's computing device 120 may show Jenny's profile card and Jimmy may swipe Jenny's profile card to the right to indicate that he is interested in her. In other examples, Jimmy may send a message back to Jenny, or make "like" Jenny's user profile or certain items on Jenny's user profile (e.g., items of demographic information or pictures). Jimmy's computing device 120 may send to the computing system 130 an indication of this interaction.

At box 934, the computing system 130 receives from Jimmy's computing device 120 the indication that Jimmy interacted with Jenny's user account.

At box 935, responsive to the computing system 130 receiving the indication that Jimmy interacted with Jenny's user account, the computing system 130 notifies both Jenny and Jimmy that a match has been formed between the two users, by sending information to Jenny's computing device 110 and Jimmy's computing device 120.

At boxes 936 and 937, Jenny's computing device 110 and Jimmy's computing device 120 receive the information notifying the computing devices that a match has formed between the users. In response, the computing devices 110 and 120 present information indicating that a match has formed between the users. For example, Jenny may be viewing a screen that shows profile content for a different user or may be engaging in a conversation with another user when a popup element appears over that screen to indicate that she has matched with Jimmy. For example, the message "You have matched with Jimmy! Click here to send him a message" may appear in the popup element.

In another example, Jenny's user interface may not immediately present a popup element, but upon her next time navigating to a screen that shows a list of notifications or messages, she may see a notification that she has matched with Jimmy. Such a notification may sit at Jenny's computing device 110 (and Jimmy's computing device 120) until one of those users takes action to further interact with the other user, for example, by starting a text message conversation or requesting a video chat with the other user, as described hereinafter with respect to box 940.

At box 940, Jenny's computing device 110 sends a request to the computing system 130 to begin a communication session with Jimmy. For example, Jenny's computing device 110 may have displayed the message "Click here to send Jimmy a message," and Jenny may have selected the "here" link to join a text messing interface in which she is able to send Jimmy messages, responsive to which Jenny's computing device 110 would send the request.

At box 941, the computing system 130 receives from Jenny's computing device 110 the request to begin the communication session. In response, the computing system 130 may perform operations to establish the communication session (box 942) and may send information to each of Jenny and Jimmy's computing devices 110 and 120 to establish the communication session.

At box 943, Jenny's computing device 110 receives information from the computing system 130 that enables Jenny's computing device 110 to enter the communication session with Jimmy's computing device 120. In response, Jenny's computing device 110 presents a user interface that enables her to communicate with Jimmy. For example, Jenny's computing device 110 may show the text messaging user interface that is illustrated in FIG. 5B (box 944).

At box 946, Jimmy's computing device 120 receives information from the computing system 130 that enables Jimmy's computing device 120 to enter the communication session with Jenny's computing device 110. In response, Jimmy's computing device 120 presents a user interface that enables him to communicate with Jenny. For example, Jimmy's computing device 120 may show the text messaging user interface illustrated in FIG. 6A (box 947).

The above-described boxes 935 through 947 describe implementations in which users respond to a match by initiating a text communication session, although other implementations may treat a match differently. For example, rather than the computing system 130 sending users a notification that they matched and then requiring those users to take additional actions to establish a communication session, the computing system may simply establish the communication session upon the users matching. For example, Jenny and Jimmy's computing devices 110 and 120 may change to present the text messaging user interfaces that are illustrated in FIGS. 5B and 6A, responsive to those users matching. The text messaging user interfaces may present obscured user profile content, for example, images of the users that obscure their faces (as illustrated in images 520 and 610).

While the above examples describe the system establishing a text messaging communication session in response to users matching, the system may be designed to alternatively begin an audio and/or video communication session in response to users matching. This audio/video communication session may begin automatically when the users match, or the audio/video communication session may be an option that one or both of the users can select after being notified that the users have matched.

For example, rather than Jenny and Jimmy being presented with the text messaging user interfaces of FIGS. 5B and 6A after the users match, Jenny and Jimmy may be presented with a video chat user interface that is similar to the interface shown in FIGS. 8A-D. In such an implementation, the frames of the videos that show each user may obscure each user's face, even as the users move around in their respective scenes. As such, the system (e.g., the computing system 130 and/or the computing devices 110 and 120) may track the location of each user's face in the video and obscure only the portion of each video frame that represents a user face. Alternatively, the communication session may be audio only, and the user interface at each user's computing device may include controls for ending and muting the audio communication (as with a typical telephone call).

Although the flowchart shows (at box 940) that Jenny requested the communication session, Jimmy may alternatively request the communication session. Jenny's initiation of the communication session is presented here for illustrative purposes only. Once the communication session has been established, the computing system 130 may await receipt of a message authored by one of the users through use of the communication session. The following paragraphs discuss how Jenny initially sends a message to Jimmy (see boxes 950-954), but Jimmy may alternatively be the first user to send a message (see boxes 956-960).

Boxes 950-954 represent operations that occur each time Jenny sends a message to Jimmy, while boxes 956-960 represent operations that occur each time Jimmy sends a message to Jenny. The execution of these operations depends on user initiative, as illustrated by boxes 950 and 956 not being directed to by a flowchart arrow.

At box 950, Jenny's computing device 110 sends a message for receipt by Jimmy's computing device 120. The message may comprise user-specified text that Jenny authored, for example, text that she typed with a virtual or physical keyboard (box 951). Alternatively, her message may comprise user-specified audio that Jenny spoke and that her computing device 110 recorded with a microphone (box 952). The user-specified audio may be recorded as part of an audio-only conversation or as part of a video conversation that includes the recording of audio.

At box 953, the computing system 130 receives from Jenny's computing device 110 the message that she authored, and the computing system 130 sends her message to Jimmy's computing device 120 (i.e., the computing device at which Jimmy is currently authenticated with the computing system 130, which can change over time as Jimmy logs in using different computing devices).

At box 954, Jimmy's computing device 120 receives the message authored by Jenny and presents her message for display. For example, Jimmy's computing device 120 may present a user interface similar to that shown in FIG. 6B, with message 630 in FIG. 6B illustrating the message that Jenny typed at her computing device 110.

Boxes 956-960 represent operations that occur when Jimmy sends a message to Jenny.

At box 956, Jimmy's computing device 120 sends a message for receipt by Jenny's computing device 110. The message may comprise user-specified text that Jimmy authored, for example, text that he typed with a virtual or physical keyboard (box 957). Alternatively, his message may comprise user-specified audio that Jimmy spoke and that his computing device 120 recorded with a microphone (box 958). The user-specified audio may be recorded as part of an audio-only conversation or as part of a video conversation that involves the recording of audio.

At box 959, the computing system 130 receives from Jimmy's computing device 120 the message that he authored, and the computing system 130 sends his message to Jenny's computing device 110 (i.e., the computing device at which Jenny is currently authenticated with the computing system 130, which can change over time as Jenny logs in using different computing devices).

At box 960, Jenny's computing device 110 receives the message authored by Jimmy and presents his message for display. For example, Jenny's computing device 110 may present a user interface similar to that shown in FIG. 5C, with message 534 in FIG. 5C illustrating the message that Jimmy typed at his computing device 120.

At box 962, responsive to the computing system 130 receiving a user-authored message from Jenny's computing device 110 or from Jimmy's computing device 120, the computing system 130 determines whether the sending of the message satisfies criteria for revealing previously-obscured profile content. While FIG. 3 describes various different mechanisms for determining whether a message or other type of interaction between two users satisfies criteria for triggering a reveal, a few example techniques for determining whether the messages satisfied criteria for revealing previously-obscured content are described below with respect to boxes 963-965.

At box 963, a message is determined to satisfy criteria for revealing obscured content if the message completes a mutual message exchange. A mutual message exchange may exist when a first user sends a message that is directly responsive to a message sent by a second user. A message may satisfy such criteria so long as the message is not the first message to a conversation, or the message is not directly responsive to another message sent by the same user (e.g., as would be the case when the first user sends multiple messages in a row without the second user sending intervening messages).

For text conversations, a message may comprise a collection of text that is simultaneously presented for display on a screen of a viewing user (e.g., responsive to the authoring user pressing the "Enter" button on a keyboard to send the message). For audio and/or video conversations, the system may determine that a message has been spoken when a user has been determined to have finished talking for a determined amount of time, and/or when an analysis of content spoken by the user is determined to represent completion of a sentence.

At box 964, a message is determined to satisfy criteria for revealing obscured content if a count of text characters exceeds a threshold. The computing system 130 may monitor the collective number of characters typed by both users, and once that collective number of characters exceeds a threshold value (e.g., 300 characters), the criteria for revealing obscured content may be satisfied. In some examples, the criteria for revealing obscured content is not satisfied by a collective number of characters reaching a threshold value, because each user in the conversation may need to type a threshold number of characters (e.g., 150 characters each) for the criteria to be satisfied. In some examples, the criteria is satisfied on an individual, per-person basis, such that each 150 characters that Jenny types causes some of her profile content to be revealed to Jimmy, potentially through several reveals. Over the same period of time, Jimmy may not type much and therefore Jenny may not see much or any of Jimmy's content become revealed.

At box 965, a message is determined to satisfy criteria for revealing obscured content if the word count (verbal or typed) exceeds a threshold. For example, the computing system may count the number of spoken words within audio spoken by Jenny, Jimmy, or both, and determine whether that number of individually-spoken or collectively-spoken words exceeds an individual or collective threshold value, depending on the implementation. As discussed above with respect to the counting of text characters (box 964), the criteria may require that a collective number of words be spoken (e.g., 40 words) for content to be revealed, may require that each user speak a certain number of words (e.g., 20 each) for content to be revealed, or may require only that a single user speak a certain number of words (e.g., 20 words) for content to be revealed (e.g., either content uploaded by that user or that is viewed by that user, depending on the implementation).

At box 966, responsive to the criteria for revealing obscured content not being satisfied, the computing system 130 continues to await another message sent by one of the users to the conversation, upon receipt of which the computing system again performs the operations of box 962 to determine whether the newly-received message causes the interaction between the users to satisfy criteria for revealing obscured content.

At box 968, responsive to the computing system 130 determining that the message satisfied criteria for revealing obscured content, the computing system 130 sends information to Jenny's computing device 110 and/or Jimmy's computing device 120 to cause the respective computing device(s) to reveal at least part of the previously-obscured content. For example, the computing system 130 may send to Jenny's computing device 110: (1) an updated image of Jimmy that has been modified to remove one of the puzzle pieces from his face, (2) instructions to cause Jenny's computing device 110 to perform operations to remove one of the puzzle pieces from Jimmy's face, (3) demographic information that had not been previously sent to Jenny's computing device 110, and/or (4) instructions to cause Jenny's computing device 110 to display demographic information that her computing device 110 had previously received from computing system 130 but had obscured.

The operations of box 968 may be performed with respect to just Jenny, just Jimmy, or both Jenny and Jimmy depending on the implementation of the system (e.g., whether the criteria for a content reveal is associated with a simultaneous content reveal, or content reveal for just a single user at a time).

At box 969, Jenny's computing device 110 receives from the computing system 130 information that is configured to cause her computing device 110 to reveal at least a portion of previously-obscured profile content. There are multiple different manners in which content may be revealed, based on the implementation of the system, as described with respect to FIGS. 2-4B and the following boxes 970-973.

At box 970, the revealed profile content includes revealing content that is obscuring a moving human face in video. For example, Jimmy and Jenny's faces may move in video as they communicate with each other, as illustrated by the video chat of FIGS. 8A-D. In implementations in which the obscured portion of the video is only each other's face (as opposed to obscuring the entire video), the portion of the video that obscures content may move as the video is played in order to track a position of the human face as it moves from frame to frame. As such, this moving, obscured portion of the video may update with the reveal, for example, so that a previously-moving puzzle piece or other type of object that covered the user's moving face is no longer shown as covering the user's face.

At box 971, revealing profile content includes removing the presentation of one of multiple objects that had obscured part of an image. For example, an image or video feed may be covered with multiple different interface elements (e.g., puzzle pieces, blocks, or animated animal features), and revealing that image or video feed may include removing one or more of those different interface elements so that the image is covered with only a subset of the multiple different interface elements (or none of the multiple different interface elements).

At box 972, revealing profile content includes revealing profile content across multiple different images uploaded by the other user's account. For example, Jenny's computing device 110 may currently display multiple images from Jimmy's user profile that were uploaded using Jimmy's account, or be capable of switching from one image of Jimmy to another image of Jimmy upon receipt of user input by Jenny. Jenny's computing device 110 may be configured to obscure all of these images. As such, upon receiving from the computing system 130 information that is configured to cause a reveal in such content, Jenny's computing device 110 may update each of the images to reveal more profile content. For example, Jenny's computing device 110 may remove from each image an object previously presented over Jimmy's face, or increase the resolution of each of the multiple images. In some examples, each of the multiple images of Jimmy were obscured in the same manner and the images are revealed in the same manner. For example, each picture of Jimmy that Jenny is able to view may be viewable with the same puzzle piece having been removed.

It should be noted that this disclosure refers to items being "removed" from an image from a visual and conceptual perspective for convenience, but physical features are not actually removed from digitally-rendered images. For example, discussion in this disclosure of placing objects "over" a user's face in an image references modifying a presentation of the image so that a portion of the image at which the user's face was displayed now displays the objects. Removing one of those objects includes modifying the presentation of the image to conceptually remove an object and show part of the user's face at a location at which the object had previously been displayed. The addition and removal of objects can involve generating a new image file for each stage of the obscuring/removal process, or by displaying the same image file but with the client computing device rendering or drawing different graphical objects onto the image during processing.

At box 973, the profile content that is revealed comprises text. For example, the content that is obscured can include text that comprises part of the user profile, such as the demographic information 252-262 that is illustrated in FIG. 2. Text content that comprises part of the user profile can include one or more of the following: a height of the user, an age of the user, a geographic location of the user, a profession of the user, a relationship status of the user, a sexual orientation of the user, a religion of the user, a biographical description of the user, an ethnicity of the user, a body type of the user, whether the user smokes, whether the user drinks alcohol, whether the user does drugs, an educational level of the user, or a language spoken by the user.

At box 974, Jimmy's computing device 120 receives from the computing system 130 information that is configured to cause his computing device 120 to reveal at least a portion of previously-obscured content. There are multiple different manners in which content may be revealed based on the implementation of the system, as described with respect to FIGS. 2-4B and boxes 970-973, which describe similar revealing operations that are performed at Jenny's computing device 110.

At box 976, the computing system 130 determines whether profile content has been fully revealed, and therefore satisfies criteria for unlocking user profile(s). If not, the computing system awaits another user message (box 977). If profile content has been fully revealed, the computing system performs the operations of box 980 and unlocks each user's account so that the other user has access to content that may have been previously unavailable. User profile content may be considered fully revealed for the purposes of box 976: (1) once all objects (e.g., puzzle pieces) have been removed from initially-obscured images, (2) once initially-obscured images are displayed in their original resolution (or at least the highest resolution with which the client devices are configured to display the images), and/or (3) once initially-obscured user profile text content has been revealed. In some implementations, the amount of content revealed through user conversations is a subset of all information that is part of a user profile and the remaining content that comprises the user profile becomes available once the user profile is unlocked, as described below.

In some implementations, each user account reveals content at the same time and Jenny and Jimmy see their images and/or demographic information become fully revealed at the same time. In such implementations, the determination at box 976 regarding whether content is fully revealed is straightforward because both users experience the same level of obscurity during their conversation. In other implementations, each user may see content of the other participant to the conversation be revealed at different times, and it is therefore possible that a first user views completely unobscured content from the second user's profile, while the second user still views partially-obscured content from the first user's profile. In such implementations, the system may be configured to wait to perform the "unlock" operations of box 980 until content has been fully revealed to both users, or the system may unlock the user profiles at different times.

As an example, suppose that the system is configured to cover each user's face with puzzle pieces, and so that every thirty words spoken by a user during a video chat causes one of those puzzle pieces to be removed from their own profile image. With such an implementation, it is possible that Jimmy is doing most of the talking during the video chat and therefore Jenny keeps seeing puzzle pieces disappear from Jimmy's face. Because Jenny is not talking much, Jimmy may only see a limited amount of puzzle pieces disappear from Jenny's face. Once all puzzle pieces have disappeared from Jimmy's face, the system may perform the operations of box 980 for Jenny and unlocks Jimmy's user profile so that she has unlocked access to his user profile. Jimmy may not obtain unlocked access to Jenny's user profile until she speaks enough words to cause all of the puzzle pieces covering her face to disappear.

At box 980, the computing system 130 performs operations to unlock one or both user profiles, based on whether the unlock is performed simultaneously or one-at a time, as discussed above. In those implementations in which the system is configured to step-wise reveal content to both users at the same time, the computing system may unlock both user profiles at the same time. In those implementations in which users may view profile content with different levels of obscurity, the computing system 130 may provide only one of the users with unlocked access to the other user's profile.

Unlocking another user's profile can provide a viewing user with multiple benefits. A first benefit is that the computing system 130 and/or the client computing devices 110 and 120 may stop monitoring whether the conversation has become inactive (box 981). For example, the computing system may stop performing the operations of yet-to-be described boxes 990-996, which determine whether the conversation has become inactive, and if so cause user profile content to become re-obscured or the user match to disappear.

A second benefit to unlocking another user's profile is that a viewing user may have access to additional content and/or functionality. In a first example, only a profile picture is obscured before a user profile is unlocked. Upon the user profile being unlocked, a viewing user may have access to other pictures and/or demographic information. In a second example, the content that is obscured before a user profile is unlocked includes only demographic information. Upon the user profile being unlocked, the viewing user may have access to pictures that were not previously visible to the viewing user before the user profile was unlocked.

In a third example, functionality becomes available to a viewing user after he or she has unlocked another user's profile. For example, the viewing user may not be able to initiate a video chat with another user until the viewing user has unlocked that other user's profile. Or the viewing user may not be able to send pictures, "stickers," and/or GIFs in a text messaging session until the viewing user has unlocked the other user's profile. Or the viewing user may not be able to "bookmark" another user or otherwise add that other user to a list of saved users until the viewing user has unlocked the other user's profile. In another example, the viewing user is able to see the online status (e.g., online or offline) of another user once the viewing user has unlocked the other user's profile.

At box 983, Jenny's computing device 110 receives, from the computing system 130, information that prompts her computing device 110 to present content or enable functionality that was previously unavailable, as a result of her receiving unlocked access to Jimmy's user profile. Jenny's computing device 110 may receive the previously-unavailable content from the computing system 130 if the content had not been previously sent to her computing device 110, or her computing device 110 may receive from the computing system 130 instructions to provide Jenny with access to such content if the computing system 130 had previously sent the content but it had not been presented to Jenny. In an example in which the unlocked content includes additional functionality, Jenny's computing device 110 may add interface elements that enable her to engage in the above-described functions (e.g., engage in video chat, engage in rich messaging sessions, bookmark users, or see the online status of users).

At box 984, Jimmy's computing device 120 receives, from the computing system 130, information that prompts his computing device 120 to present content or enable functionality that was previously unavailable, as a result of him receiving unlocked access to Jenny's profile. The operation of Jimmy's computing device 120 at box 984 is similar to that of Jenny's computing device 110 at box 983.

Boxes 990-996 represent actions taken by the system to re-obscure content if a conversation becomes inactive. Re-obscuring content if a conversation becomes inactive can incentivize users to regularly communicate or to focus on a currently-active conversation, because user profile content may become obscured if the conversation becomes inactive.

At box 990, the computing system 130 determines whether the exchange of user-authored messages has become inactive. The computing system 130 may monitor text-based conversations for inactivity, audio-based conversations for inactivity, and/or video-based conversations for inactivity. There are various different criteria for determining whether a conversation has become inactive, depending on the implementation, as described throughout this disclosure and as described below with respect to boxes 991-993.

At box 991, the computing system 130 determines that a conversation has become inactive responsive to the computing system 130 determining that two participants in a conversation have not exchanged messages for a threshold amount of time. This threshold amount of time may be thirty seconds, one minute, ten minutes, one hour, twenty-four hours, or forty-eight hours, for example. FIG. 5B includes an example timer element 528 that shows an amount of time before the computing system 130 may determine that a conversation has become inactive. The timer element 528 may include a bar that shrinks as the amount of time remaining to message the other user decreases. The user interface may also include a numerical time remaining element 529 that shows a numerical amount of time remaining before the conversation will be deemed inactive.

In some examples, inactivity is determined to cease when a message is sent from one user to another user. In another example, inactivity is determined to cease when one user has begun to type content, regardless whether that typed content is sent. In some examples, inactivity is determined to cease during an audio conversation when one user speaks content. In some examples, inactivity is determined to cease during a video conversation when the video includes motion (e.g., any type of motion, or motion of a person).

At box 992, the computing system 130 determines that a conversation has become inactive responsive to the computing system 130 determining that a participant in the conversation has messaged another user. For example, Jenny may be chatting with Jimmy and may then remember that she forgot to message a user Mark. Jenny may switch to a different chat interface and send a message to Mark. Responsive to Jenny sending a message to Mark, the computing system 130 may determine that the conversation with Jimmy has become inactive.

At box 993, the computing system 130 determines that a conversation has become inactive responsive to the computing system 130 determining that the communication session lost focus on the computing device of one of the participants to the conversation. For example, Jenny may be chatting with Jimmy and then decide to change to a different screen to browse profiles of other users. Responsive to Jenny switching to the different screen (thereby causing the screen hosting the conversation to lose priority of display on Jenny's computing device 110), the computing system 130 may determine that the conversation with Jimmy has become inactive.

Should a conversation between two users be determined to have not become inactive (as illustrated by the "No" arrow), the computing system may continue to monitor whether the conversation has become inactive. Should the conversation be determined to have become inactive, the computing system 130 may perform the operations of box 994, which are discussed below.

Although the flowchart illustrates an implementation in which the computing system 130 regularly determines whether an exchange of user-authored messages has become inactive (box 990), the criteria of the determination may be satisfied instead by a timer expiring, at least for the timer-based inactivity of box 991 (e.g., in distinction to repeated determinations). The timer may be reset every time a participant to the conversation sends a message to another participant of the conversation.

At box 994, responsive to the computing system 130 determining that the exchange of user-authored messages has become inactive, the computing system 130 sends information to one or both of Jenny and Jimmy's computing devices 110 and 120 to cause content that had previously been revealed to be re-obscured.

At boxes 995 and 996, each of Jenny and Jimmy's computing devices 110 and 120 receive the information from the computing system 130 and, in response, modify a display of profile content to obscure at least a portion of previously-obscured profile content. For example, Jimmy's picture (as viewed by Jenny) may transition from a state in which only two puzzle pieces cover Jimmy's face to a state in which four puzzle pieces cover Jimmy's face, as illustrated by screens 410e and 410f in FIG. 4B.

In some implementations, rather than re-obscuring profile content, a match between two users may disappear or end when a conversation is determined to have gone inactive. When a match disappears, the user interface with which users interact may disappear. In some examples, this means that the users are unable to communicate, or at least need to start a new communication session (potentially with that new communication session not including messages from the previous communication session). In some implementations, profile content is step-wise re-obscured due to inactivity until the profile content is fully obscured. At this point, the computing system may terminate the match between the users, since there are no more steps available to re-obscure the profile content.

In some implementations, users may begin communicating with all or most profile content un-obscured and, responsive to inactivity or simply the passage of time, profile content may become obscured. For example, users may start out with full access to each other's profile content, but every 30 seconds some of the profile content that each user originally was able to view becomes obscured (e.g., pictures become less clear, pictures are removed, and/or demographic information disappears). The users may need to communicate a certain amount (e.g., meet a criteria described with respect to FIG. 3) to keep profile content from becoming fully obscured, otherwise the match may disappear. In other words, rather than users having to communicate to reveal content, the content is already presented and that content may disappear or otherwise become obscured during the conversation. Users may have to maintain a certain level of activity in order to prevent convent from disappearing, or to reach a state in which the users unlock each other's profiles.

In some implementations, users of the system described herein are able to select the manner in which their profile content is obscured. For example, a user may be able to select whether that user wants their entire profile picture obscured or just the portion of the profile picture that represents that user's face. A user may be able to select whether to obscure their face with puzzle pieces, blurring, or pixelating. A user may be able to select which profile content is displayed to another user before that other users "unlocks" their profile. For example, Jenny may choose for only two of her images to be displayed to any other user before that other user unlocks her profile (and may choose for those two images to be obscured with puzzle pieces), after which that other user may be able to see six pictures of Jenny from her complete user profile.

A user may also be able to select which text profile content is obscured from another user and is revealed during a conversation. For example, Jenny may be able to specify that her full name, age, location, a job are stepwise revealed to any other user with whom she is communicating (and the order in which these items are revealed). Jenny may also be able to specify that her height, religion, and body type are accessible once a user unlocks her profile. As such, a user may be able to specify which information is obscured and then revealed during a conversation, and which information is not shown until another user unlocks their profile.

In some implementations, the techniques described herein are applied to conversations with more than two users. For example, four users may participate in a text-based conversation, with profile content that is obscured (e.g., pictures or demographic information) being revealed as the users communicate with each other.

In some implementations, operations that are described as being performed at the computing system 130 may be performed at one or both of the computing devices 110 and 120. In some implementations, the computing devices 110 and 120 communicate with each other directly during a conversation, without messages being routed through the computing system 130. The computing devices 110 and 120 may monitor whether and how to reveal content in such implementations.

Figure 10:
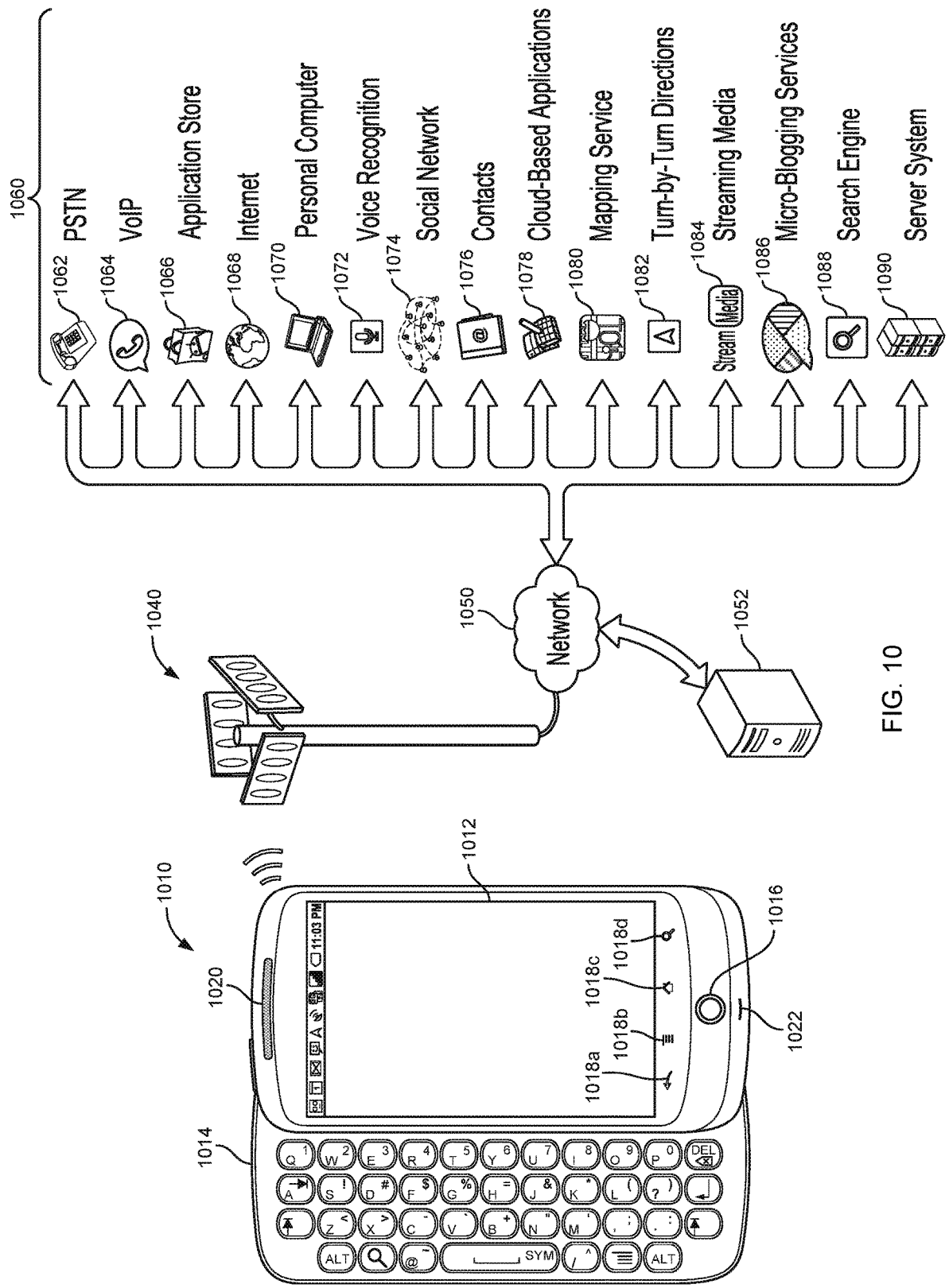
FIG. 10 is a conceptual diagram of a system that may be used to implement the systems and methods described in this document.

Referring now to FIG. 10, a conceptual diagram of a system that may be used to implement the systems and methods described in this document is illustrated. In the system, mobile computing device 1010 can wirelessly communicate with base station 1040, which can provide the mobile computing device wireless access to numerous hosted services 1060 through a network 1050.

In this illustration, the mobile computing device 1010 is depicted as a handheld mobile telephone (e.g., a smartphone, or an application telephone) that includes a touchscreen display device 1012 for presenting content to a user of the mobile computing device 1010 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 1014, physical buttons, trackballs, accelerometers, gyroscopes, and magnetometers).

Example visual output mechanism in the form of display device 1012 may take the form of a display with resistive or capacitive touch capabilities. The display device may be for displaying video, graphics, images, and text, and for coordinating user touch input locations with the location of displayed information so that the device 1010 can associate user contact at a location of a displayed item with the item. The mobile computing device 1010 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 1014, which may be a full qwerty keyboard or a traditional keypad that includes keys for the digits '0-9', '*', and '#.' The keyboard 1014 receives input when a user physically contacts or depresses a keyboard key. User manipulation of a trackball 1016 or interaction with a track pad enables the user to supply directional and rate of movement information to the mobile computing device 1010 (e.g., to manipulate a position of a cursor on the display device 1012).

The mobile computing device 1010 may be able to determine a position of physical contact with the touchscreen display device 1012 (e.g., a position of contact by a finger or a stylus). Using the touchscreen 1012, various "virtual" input mechanisms may be produced, where a user interacts with a graphical user interface element depicted on the touchscreen 1012 by contacting the graphical user interface element. An example of a "virtual" input mechanism is a "software keyboard," where a keyboard is displayed on the touchscreen and a user selects keys by pressing a region of the touchscreen 1012 that corresponds to each key.

The mobile computing device 1010 may include mechanical or touch sensitive buttons 1018a-d. Additionally, the mobile computing device may include buttons for adjusting volume output by the one or more speakers 1020, and a button for turning the mobile computing device on or off. A microphone 1022 allows the mobile computing device 1010 to convert audible sounds into an electrical signal that may be digitally encoded and stored in computer-readable memory, or transmitted to another computing device. The mobile computing device 1010 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME, 10S, MAC OS X, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 1010 may present a graphical user interface with the touchscreen 1012. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 1014. User-selection of the button may invoke the pre-defined action.

In some examples, the operating system provides a "desktop" graphical user interface that is displayed after turning on the mobile computing device 1010, after activating the mobile computing device 1010 from a sleep state, after "unlocking" the mobile computing device 1010, or after receiving user-selection of the "home" button 1018c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 1010 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 1012 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 1010 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 1010 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 1010. The mobile computing device 1010 may include a digital camera sensor, and corresponding image and video capture and editing software. An internet browser may enable the user to view content from a web page by typing in an addresses corresponding to the web page or selecting a link to the web page.

The mobile computing device 1010 may include an antenna to wirelessly communicate information with the base station 1040. The base station 1040 may be one of many base stations in a collection of base stations (e.g., a mobile telephone cellular network) that enables the mobile computing device 1010 to maintain communication with a network 1050 as the mobile computing device is geographically moved. The computing device 1010 may alternatively or additionally communicate with the network 1050 through a Wi-Fi router or a wired connection (e.g., ETHERNET, USB, or FIREWIRE). The computing device 1010 may also wirelessly communicate with other computing devices using BLUETOOTH protocols, or may employ an ad-hoc wireless network.

A service provider that operates the network of base stations may connect the mobile computing device 1010 to the network 1050 to enable communication between the mobile computing device 1010 and other computing systems that provide services 1060. Although the services 1060 may be provided over different networks (e.g., the service provider's internal network, the Public Switched Telephone Network, and the Internet), network 1050 is illustrated as a single network. The service provider may operate a server system 1052 that routes information packets and voice data between the mobile computing device 1010 and computing systems associated with the services 1060.

The network 1050 may connect the mobile computing device 1010 to the Public Switched Telephone Network (PSTN) 1062 in order to establish voice or fax communication between the mobile computing device 1010 and another computing device. For example, the service provider server system 1052 may receive an indication from the PSTN 1062 of an incoming call for the mobile computing device 1010. Conversely, the mobile computing device 1010 may send a communication to the service provider server system 1052 initiating a telephone call using a telephone number that is associated with a device accessible through the PSTN 1062.

The network 1050 may connect the mobile computing device 1010 with a Voice over Internet Protocol (VoIP) service 1064 that routes voice communications over an IP network, as opposed to the PSTN. For example, a user of the mobile computing device 1010 may invoke a VoIP application and initiate a call using the program. The service provider server system 1052 may forward voice data from the call to a VoIP service, which may route the call over the internet to a corresponding computing device, potentially using the PSTN for a final leg of the connection.

An application store 1066 may provide a user of the mobile computing device 1010 the ability to browse a list of remotely stored application programs that the user may download over the network 1050 and install on the mobile computing device 1010. The application store 1066 may serve as a repository of applications developed by third-party application developers. An application program that is installed on the mobile computing device 1010 may be able to communicate over the network 1050 with server systems that are designated for the application program. For example, a VoIP application program may be downloaded from the Application Store 1066, enabling the user to communicate with the VoIP service 1064.

The mobile computing device 1010 may access content on the internet 1068 through network 1050. For example, a user of the mobile computing device 1010 may invoke a web browser application that requests data from remote computing devices that are accessible at designated universal resource locations. In various examples, some of the services 1060 are accessible over the internet.

The mobile computing device may communicate with a personal computer 1070. For example, the personal computer 1070 may be the home computer for a user of the mobile computing device 1010. Thus, the user may be able to stream media from his personal computer 1070. The user may also view the file structure of his personal computer 1070, and transmit selected documents between the computerized devices.

A voice recognition service 1072 may receive voice communication data recorded with the mobile computing device's microphone 1022, and translate the voice communication into corresponding textual data. In some examples, the translated text is provided to a search engine as a web query, and responsive search engine search results are transmitted to the mobile computing device 1010.

The mobile computing device 1010 may communicate with a social network 1074. The social network may include numerous members, some of which have agreed to be related as acquaintances. Application programs on the mobile computing device 1010 may access the social network 1074 to retrieve information based on the acquaintances of the user of the mobile computing device. For example, an "address book" application program may retrieve telephone numbers for the user's acquaintances. In various examples, content may be delivered to the mobile computing device 1010 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 1010 may access a personal set of contacts 1076 through network 1050. Each contact may identify an individual and include information about that individual (e.g., a phone number, an email address, and a birthday). Because the set of contacts is hosted remotely to the mobile computing device 1010, the user may access and maintain the contacts 1076 across several devices as a common set of contacts.

The mobile computing device 1010 may access cloud-based application programs 1078. Cloud-computing provides application programs (e.g., a word processor or an email program) that are hosted remotely from the mobile computing device 1010, and may be accessed by the device 1010 using a web browser or a dedicated program. Example cloud-based application programs include GOOGLE DOCS word processor and spreadsheet service, GOOGLE GMAIL webmail service, and PICASA picture manager.

Mapping service 1080 can provide the mobile computing device 1010 with street maps, route planning information, and satellite images. An example mapping service is GOOGLE MAPS. The mapping service 1080 may also receive queries and return location-specific results. For example, the mobile computing device 1010 may send an estimated location of the mobile computing device and a user-entered query for "pizza places" to the mapping service 1080. The mapping service 1080 may return a street map with "markers" superimposed on the map that identify geographical locations of nearby "pizza places."

Turn-by-turn service 1082 may provide the mobile computing device 1010 with turn-by-turn directions to a user-supplied destination. For example, the turn-by-turn service 1082 may stream to device 1010 a street-level view of an estimated location of the device, along with data for providing audio commands and superimposing arrows that direct a user of the device 1010 to the destination.

Various forms of streaming media 1084 may be requested by the mobile computing device 1010. For example, computing device 1010 may request a stream for a pre-recorded video file, a live television program, or a live radio program. Example services that provide streaming media include YOUTUBE and PANDORA.

A micro-blogging service 1086 may receive from the mobile computing device 1010 a user-input post that does not identify recipients of the post. The micro-blogging service 1086 may disseminate the post to other members of the micro-blogging service 1086 that agreed to subscribe to the user.

A search engine 1088 may receive user-entered textual or verbal queries from the mobile computing device 1010, determine a set of internet-accessible documents that are responsive to the query, and provide to the device 1010 information to display a list of search results for the responsive documents. In examples where a verbal query is received, the voice recognition service 1072 may translate the received audio into a textual query that is sent to the search engine.

These and other services may be implemented in a server system 1090. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 11:
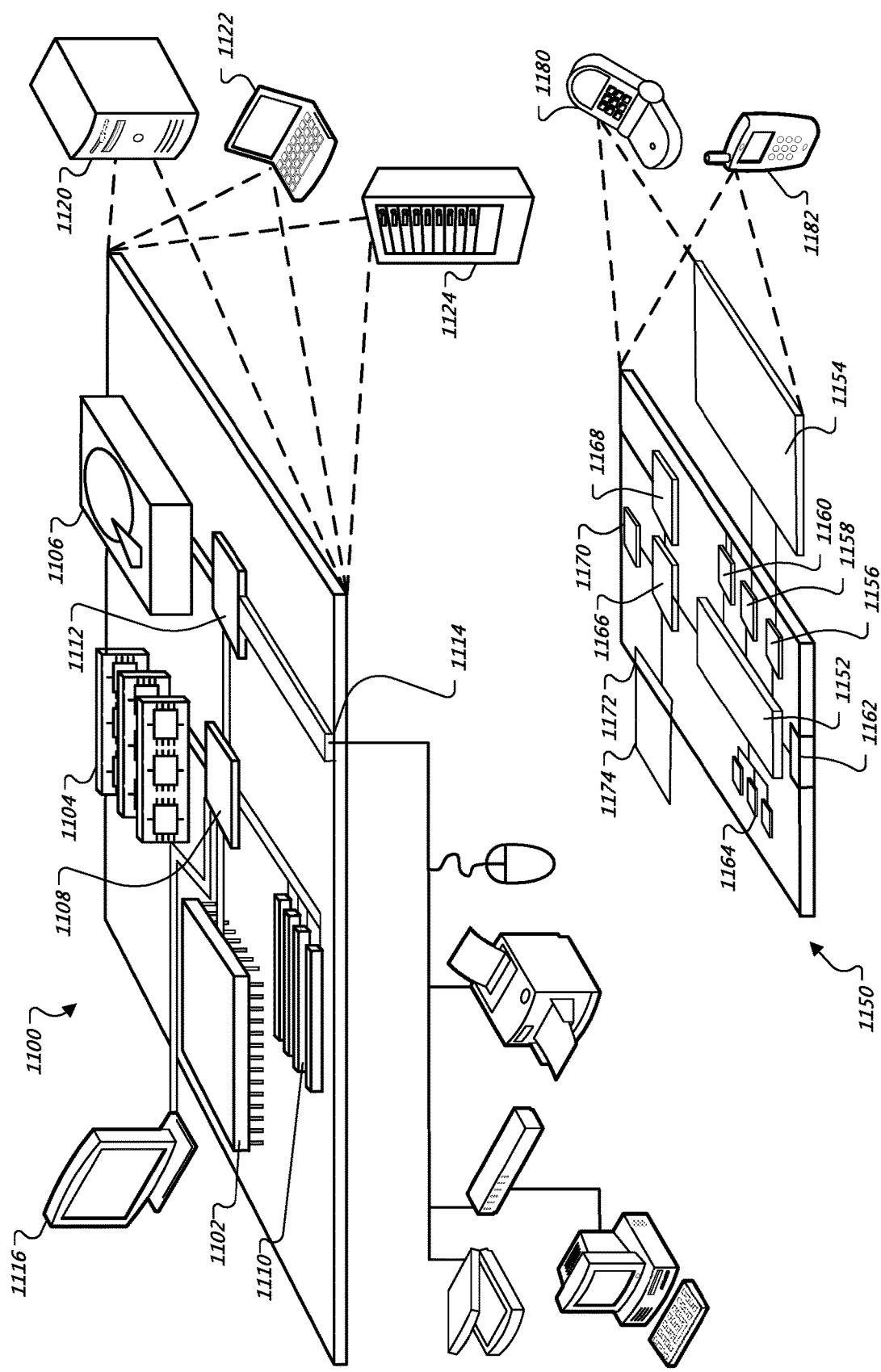
FIG. 11 is a block diagram of computing devices that may be used to implement the systems and methods described in this document, as either a client or as a server or plurality of servers.

FIG. 11 is a block diagram of computing devices 1100, 1150 that may be used to implement the systems and methods described in this document, as either a client or as a server or plurality of servers. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 1100 includes a processor 1102, memory 1104, a storage device 1106, a high-speed controller 1108 connecting to memory 1104 and high-speed expansion ports 1110, and a low speed controller 1112 connecting to low speed expansion port 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high-speed controller 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high-speed controller 1108 manages bandwidth-intensive operations for the computing device 1100, while the low speed controller 1112 manages lower bandwidth-intensive operations. Such allocation of functions is an example only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT (Thin-Film-Transistor Liquid Crystal Display) display or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, so as to enable near area communication of device 1150 with other devices. External interface 1162 may provided, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152 that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, WiFi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smartphone 1182, personal digital assistant, or other similar mobile device.

Additionally computing device 1100 or 1150 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/ or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method for revealing obscured image content as users communicate, comprising:

receiving, by a computing system and from a first computing device logged into a first user account of the computing system, a request to view image content that was provided by a second user account of the computing system, the image content depicting a particular object at a particular portion of the image content;

providing, by the computing system and for receipt by the first computing device, first information to cause the first computing device to present the image content with the particular object at the particular portion of the image content obscured while other portions of the image content that do not depict the particular object are left unobscured;

receiving, by the computing system after the computing system provides the first information for receipt by the first computing device, a first indication that the first user account and the second user account interacted;

providing, by the computing system and for receipt by the first computing device, second information to cause the first computing device to present the image content with the particular object partially obscured while other portions of the image content that do not depict the particular object are left unobscured, responsive to the computing system having received the first indication that the first user account and the second user account interacted;

receiving, by the computing system after the computing system provides the second information for receipt by the first computing device, a second indication that the first user account and the second user account interacted; and providing, by the computing system and for receipt by the first computing device, third information to cause the first computing device to present the image content with the particular object unobscured, responsive to the computing system having received the second indication that the first user account and the second user account interacted.

2. The computer-implemented method of claim 1, wherein:

the particular object comprises a human face;

providing the first information includes providing information to cause the first computing device to present the image content with the human face obscured while other portions of the image content that do not depict the human face are left unobscured;

receiving the second indication that the first user account and the second user account interacted comprises receiving an indication that a user-authored message was sent from the first user account to the second user account or from the second user account to the first user account; and providing the third information includes providing information to cause the first computing device to present the image content with the human face unobscured as a result of the computing system receiving the indication that the user-authored message was sent from the first user account to the second user account or from the second user account to the first user account.

3. The computer-implemented method of claim 1, wherein:

the image content depicts a first human face and a second human face;

the particular object comprises the first human face;

the method further comprises determining, by the computing system, that the first human face depicts a face of a creator of the second user account and that the second human face does not depict the face of the creator of the second user account; and providing the first information includes providing information to cause the first computing device to present the image content with the first human face obscured while other portions of the image content that do not depict the first human face, including a portion of the image content that depicts the second human face, are left unobscured.

4. The computer-implemented method of claim 1, wherein:

the image content comprises frames of a video captured by a second computing device logged into the second user account; and the method further comprises providing, by the computing system and for receipt by the first computing device, information to cause the first computing device to present the frames of the video with the particular object obscured as the video plays while other portions of the frames of the video that do not depict the particular object are left unobscured, the particular object moving among the frames of the video such that a portion of the video at which the video is obscured moves among the frames of the video.

5. The computer-implemented method of claim 1, further comprising, after the computing system provides the second information to cause the first computing device to present the image content with the particular object partially obscured and before the computing system receives the second indication that the first user account and the second user account interacted:

receiving, by the computing system and from the first computing device, a request to view second image content that was provided by the second user account, wherein the second image content depicts the particular object; and providing, by the computing system and for receipt by the first computing device, information to cause the first computing device to present the second image content with the particular object partially obscured while other portions of the second image content that do not depict the particular object are left unobscured.

6. The computer-implemented method of claim 5, wherein:

presenting the image content with the particular object partially obscured comprises presenting the image content with a region of the particular object being unobscured in the image content; and presenting the second image content with the particular object partially obscured comprises presenting the second image content with same said region of the particular object being unobscured in the second image content.

7. The computer-implemented method of claim 1, wherein:

the particular object being obscured includes the particular object being covered with multiple different interface elements;

the particular object being partially obscured includes the particular object being covered with a subset of the multiple different interface elements such that the particular object is no longer covered with removed interface elements of the multiple different interface elements, resulting in newly-revealed portions of the image content that were previously not visible becoming visible due to the newly-revealed portions of the image content no longer being covered with the removed interface elements; and the particular object being unobscured includes the particular object being covered with none of the multiple different interface elements.

8. The computer-implemented method of claim 1, comprising, after the computing system provides the first information to cause the first computing device to present the image content with the particular object obscured and before the computing system receives the second indication that the first user account and the second user account interacted:

receiving, by the computing system, multiple intermediary indications that the first user account and the second user account interacted; and providing, by the computing system and for receipt by the first computing device, intermediary information to cause the first computing device to present at least three iterations of the particular object becoming less obscured, each iteration revealing more detail of the particular object than the first computing device previously presented and being responsive to the computing system receiving an indication that a user authored message was sent from the first user account to the second user account or from the second user account to the first user account.

9. The computer-implemented method of claim 1, receiving, by the computing system and from a second computing device while the second computing device is logged into the second user account, a request to view different image content that was provided by the first user account, the different image content depicting a different object;

providing, by the computing system and for receipt by the second computing device, fourth information to cause the second computing device to present the different image content with the different object obscured while other portions of the different image content that do not depict the different object are left unobscured; and providing, by the computing system and for receipt by the second computing device as a result of the computing system having received the second indication that the first user account and the second user account interacted, fifth information to cause the second computing device to present the different image content with the different object unobscured.

10. The computer-implemented method of claim 1, wherein the second indication that the first user account and the second user account interacted comprises an indication that the first user account sent a user-authored message to the second user account, and the second user account replied by sending a user-authored message to the first user account.

11. The computer-implemented method of claim 10, wherein:

the user-authored message that the first user account sent to the second user account comprises user-typed text that was typed at the first computing device; and the user-authored message that the second user account sent to the first user account comprises user-typed text that was typed at a second computing device logged into the second user account.

12. The computer-implemented method of claim 1, wherein:

the image content was captured by a camera of a second computing device that is logged into the second user account; and the second computing device is different from the first computing device at which the image content is to be presented with the particular object obscured.

13. The computer-implemented method of claim 1, further comprising determining that the image content depicts the particular object at the particular portion of the image content, including by analyzing the image content using facial recognition processes to determine that the image content includes a human face at the particular portion of the image content.

14. A computer-implemented method for revealing obscured image content as users communicate, comprising:

receiving, by a computing system and from a first computing device, a request to view image content provided by a second computing device, the image content having been captured by a camera of the second computing device, the image content depicting a human face;

providing, by the computing system and for receipt by the first computing device, first information to cause the first computing device to present the image content that was captured by the camera of the second computing device with the human face obscured while other portions of the image content that do not depict the human face are left unobscured;

receiving, by the computing system, a first indication that a first user-authored message was sent from the first computing device to the second computing device or from the second computing device to the first computing device;

providing, by the computing system and for receipt by the first computing device, second information to cause the first computing device to present the image content that was captured by the camera of the second computing device with the human face partially obscured, as a result of the computing system receiving the first indication that the first user-authored message was sent from the first computing device to the second computing device or from the second computing device to the first computing device;

receiving, by the computing system after the computing system provided the second information for receipt by the first computing device, a second indication that a second user-authored message was sent from the first computing device to the second computing device or from the second computing device to the first computing device; and providing, by the computing system and for receipt by the first computing device, third information to cause the first computing device to present the image content that was captured by the camera of the second computing device with the human face unobscured, as a result of the computing system receiving the second indication that the second user-authored message was sent from the first computing device to the second computing device or from the second computing device to the first computing device.

15. The computer-implemented method of claim 14, wherein:

the presentation of the image content with the human face obscured includes the human face being covered by multiple interface elements concurrently displayed by the first computing device;

the presentation of the image content with the human face partially obscured includes the human face being covered by a subset of the multiple interface elements and no longer being covered by removed interface elements of the multiple interface elements, such that the first computing device concurrently displays the subset of the multiple interface elements and displays portions of the human face that were previously covered by the removed interface elements when the image content was presented with the human face obscured; and the presentation of the image content with the human face unobscured includes the human face being no longer covered with any of the multiple interface elements.

16. A computing system, comprising:
one or more processors; and
one or more computer-readable devices that include therein instructions that, when executed by the one or more processors, perform operations that comprise:

receiving, by a computing system and from a first computing device logged into a first user account of the computing system, a request to view image content that was provided by a second user account of the computing system, the image content depicting a particular object at a particular portion of the image content;

providing, by the computing system and for receipt by the first computing device, first information to cause the first computing device to present the image content with the particular object at the particular portion of the image content obscured while other portions of the image content that do not depict the particular object are left unobscured;

receiving, by the computing system after the computing system provides the first information for receipt by the first computing device, a first indication that the first user account and the second user account interacted;

providing, by the computing system and for receipt by the first computing device, second information to cause the first computing device to present the image content with the particular object partially obscured while other portions of the image content that do not depict the particular object are left unobscured, responsive to the computing system having received the first indication that the first user account and the second user account interacted;

receiving, by the computing system after the computing system provides the second information for receipt by the first computing device, a second indication that the first user account and the second user account interacted; and providing, by the computing system and for receipt by the first computing device, third information to cause the first computing device to present the image content with the particular object unobscured, responsive to the computing system having received the second indication that the first user account and the second user account interacted.

17. The computing system of claim 16, wherein:
the particular object comprises a human face;
providing the first information includes providing information to cause the first computing device to present the image content with the human face obscured while other portions of the image content that do not depict the human face are left unobscured;

receiving the second indication that the first user account and the second user account interacted comprises receiving an indication that a user-authored message was sent from the first user account to the second user account or from the second user account to the first user account; and providing the third information includes providing information to cause the first computing device to present the image content with the human face unobscured as a result of the computing system receiving the indication that the user-authored message was sent from the first user account to the second user account or from the second user account to the first user account.

18. The computing system of claim 16, wherein:
the image content comprises frames of a video captured by a second computing device logged into the second user account; and
the operations further include providing, by the computing system and for receipt by the first computing device, information to cause the first computing device to present the frames of the video with the particular object obscured as the video plays while other portions of the frames of the video that do not depict the particular object are left unobscured, the particular object moving among the frames of the video such that a portion of the video at which the video is obscured moves among the frames of the video.

19. The computing system of claim 16, wherein:

the particular object being obscured includes the particular object being covered with multiple different interface elements;

the particular object being partially obscured includes the particular object being covered with a subset of the multiple different interface elements such that the particular object is no longer covered with removed interface elements of the multiple different interface elements, resulting in newly-revealed portions of the image content that were previously not visible becoming visible due to the newly-revealed portions of the image content no longer being covered with the removed interface elements; and the particular object being unobscured includes the particular object being covered with none of the multiple different interface elements.

20. The computing system of claim 16, wherein:

the second indication that the first user account and the second user account interacted comprises an indication that the first user account sent a user-authored message to the second user account, and the second user account replied by sending a user-authored message to the first user account;

the image content was captured by a camera of a second computing device that is logged into the second user account; and the second computing device is different from the first computing device at which the image content is to be presented with the particular object obscured.

* * * * *